US011070372B2

(12) United States Patent
Almeida

(10) Patent No.: US 11,070,372 B2
(45) Date of Patent: *Jul. 20, 2021

(54) STORING AND USING MULTIPURPOSE SECRET DATA

(71) Applicant: John Almeida, Plano, TX (US)

(72) Inventor: John Almeida, Plano, TX (US)

(73) Assignee: Atense, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,859

(22) Filed: Dec. 7, 2020

(65) Prior Publication Data

US 2021/0119782 A1    Apr. 22, 2021

Related U.S. Application Data

(63) Continuation of application No. 16/767,580, filed as application No. PCT/US2019/047743 on Aug. 22, (Continued)

(51) Int. Cl.
*G06F 11/30* (2006.01)
*H04L 9/08* (2006.01)
(Continued)

(52) U.S. Cl.
CPC ............ *H04L 9/088* (2013.01); *G06F 8/61* (2013.01); *G06F 21/602* (2013.01);
(Continued)

(58) Field of Classification Search
CPC .... G06F 21/602; G06F 21/6209; G06F 21/79; G06F 8/61; H04L 9/088; H04L 9/0897
See application file for complete search history.

(56) References Cited

U.S. PATENT DOCUMENTS 4,757,534 A * 7/1988 Matyas ............... G06F 12/1408
380/281
4,847,902 A * 7/1989 Hampson ............ G06F 12/0875
713/190
(Continued)

FOREIGN PATENT DOCUMENTS

EP     0816967 B1     9/2007

OTHER PUBLICATIONS

Korean Intellectual Property Office, Written Opinion of the International Searching Authority, PCT/US2019/047743, Filing Date: Aug. 22, 2019, PCT/ISA/237, published Dec. 6, 2019, Daejeon, Republic of Korea.

(Continued)

*Primary Examiner* — Gary S Gracia
(74) *Attorney, Agent, or Firm* — Louis Ventre, Jr.

(57) ABSTRACT

A system and method improves operational performance of a computer by enhancing digital security with an added electronic circuit. The electronic circuit stores sensitive data in an un-erasable state such that the sensitive data may not be altered. The electronic circuit limits transfer of the sensitive data only once after each power-up or after each reset of the computer. The electronic circuit prevents access to the sensitive data by an authorized program. The electronic circuit utilizes its own storage medium and a random access memory, the latter of which can receive and store the sensitive data from the non-transitory computer storage medium. The method uses a software driver and a copy-of-copy of first security key obtained from the sensitive data stored on the electronic circuit. The software driver installs a software module on the computer using the copy-of-copy of first security key to encrypt each installed file.

2 Claims, 19 Drawing Sheets

Related U.S. Application Data 2019, now Pat. No. 10,892,895, which is a continuation-in-part of application No. 16/126,204, filed on Sep. 10, 2018, now Pat. No. 10,614,232.

(51) Int. Cl.
| | |
|---|---|
| *G06F 8/61* | (2018.01) |
| *G06F 21/79* | (2013.01) |
| *G06F 21/60* | (2013.01) |
| *G06F 21/62* | (2013.01) |
| *G06F 12/14* | (2006.01) |

(52) U.S. Cl.
CPC .......... *G06F 21/6209* (2013.01); *G06F 21/79* (2013.01); *H04L 9/0897* (2013.01)

(56) References Cited

U.S. PATENT DOCUMENTS

| | | | | |
|---|---|---|---|---|
| 6,151,678 | A * | 11/2000 | Davis | G06F 21/305 |
| | | | | 714/36 |
| 6,209,098 | B1 * | 3/2001 | Davis | G06F 12/1408 |
| | | | | 713/194 |
| 6,262,915 | B1 * | 7/2001 | Kihara | G11B 20/00507 |
| | | | | 365/185.11 |
| 6,941,284 | B2 * | 9/2005 | DeFilippo | G07B 17/00733 |
| | | | | 380/28 |
| 7,228,436 | B2 * | 6/2007 | Kawaguchi | G06F 12/1433 |
| | | | | 380/277 |
| 8,893,299 | B1 * | 11/2014 | Diamond | G06F 21/10 |
| | | | | 726/28 |
| 9,342,705 | B1 * | 5/2016 | Schneider | H04L 9/0822 |
| 2001/0005682 | A1 * | 6/2001 | Terao | H04M 1/66 |
| | | | | 455/557 |
| 2007/0088914 | A1 * | 4/2007 | Soman | G06F 12/08 |
| | | | | 711/115 |
| 2009/0327720 | A1 * | 12/2009 | Cathro | G06F 17/00 |
| | | | | 713/168 |
| 2010/0017623 | A1 * | 1/2010 | Ogram | G06F 12/14 |
| | | | | 713/189 |
| 2010/0037063 | A1 * | 2/2010 | Chontos | H04L 9/0894 |
| | | | | 713/185 |
| 2010/0217970 | A1 * | 8/2010 | Carter | G06F 21/6218 |
| | | | | 713/150 |
| 2011/0035813 | A1 * | 2/2011 | Trantham | G06F 21/78 |
| | | | | 726/34 |
| 2011/0083197 | A1 * | 4/2011 | Claudatos | G06Q 30/0609 |
| | | | | 726/28 |
| 2011/0219241 | A1 * | 9/2011 | Takeda | G06F 21/80 |
| | | | | 713/193 |
| 2013/0339739 | A1 * | 12/2013 | Hueber | G06F 21/85 |
| | | | | 713/171 |
| 2014/0052999 | A1 * | 2/2014 | Aissi | H04L 9/08 |
| | | | | 713/189 |
| 2015/0237025 | A1 * | 8/2015 | Pal | H04L 63/08 |
| | | | | 713/165 |
| 2019/0028488 | A1 * | 1/2019 | Woo | H04L 63/0245 |
| 2019/0042781 | A1 * | 2/2019 | Lukacs | G06F 21/80 |
| 2019/0205533 | A1 * | 7/2019 | Diehl | H04L 9/3268 |

OTHER PUBLICATIONS

Korean Intellectual Property Office, International Search Report of the International Searching Authority, PCT/US2019/047743, Filing Date: Aug. 22, 2019, PCT/ISA/210, published Dec. 6, 2019, Daejeon, Republic of Korea.

* cited by examiner

|   | 1 | 2 | 3 | 4 | 5 | 6 | 7 | 8 |
|---|---|---|---|---|---|---|---|---|
| 1 | 150 | Register | | | 148 | | 163 | |
| 2 | R/W | A | B | C | D | E | A1 | A0 |
| 3 | 0 | 1 | 0 | 1 | 0 | 1 | 0 | 0 |
| 4 | 1 | - | - | - | - | - | - | - |
| 5 | 0 | 1 | 0 | 1 | 0 | 1 | 0 | 1 |
| 6 | 1 | - | - | - | - | - | - | - |
| 7 | 0 | 1 | 0 | 1 | 0 | 1 | 1 | 0 |
| 8 | 1 | - | - | - | - | - | - | - |
| 9 | 0 | 1 | 0 | 1 | 0 | 1 | 1 | 1 |
| 10 | 1 | - | - | - | - | - | - | - |
| 11 | 0 | - | - | - | 1 | - | - | - |
| 12 | 0 | - | 1 | - | - | - | - | - |
|   |   | 7 | 6 | 5 | 4 | 3 | 2 | 1 |

FIG.1A

First Metadata 514

| | | | |
|---|---|---|---|
| Module Name | 516 | ProgramA  516A | ←entry1 |
| Class | 518 | Safe  518A | ←entry2 |
| Encrypted Installation Identification | 520 | 12345  520A | ←entry3 |
| Encrypted Checksum | 522 | 123876  522A | ←entry4 |
| Encrypted Non-Encrypted Flag | 524 | Yes  524A | ←entry5 |
| Confirmatory Predefined Encrypted Value | 525 | AB7ZTB  525A | ←entry6 |

Third Metadata 550

| | | | |
|---|---|---|---|
| Module Name | 516 | FileA  516B | ←entry7 |
| Class | 518 | Safe  518B | ←entry8 |
| Encrypted Installation Identification | 520 | 12345  520B | ←entry9 |
| Encrypted Checksum | 522 | 1236  522B | ←entry10 |
| Encrypted Non-Encrypted Flag | 524 | Yes  524B | ←entry11 |
| Confirmatory Predefined Encrypted Value | 525 | AB7ZTB  525B | ←entry12 |

FIG.5B

Second Metadata 510

| | | | | |
|---|---|---|---|---|
| Module Name | 516 | ProgramB | 516C | ←entry13 |
| Class | 518 | Risk | 518C | ←entry14 |
| Encrypted Installation Identification | 520 | ABCDE | 520C | ←entry15 |
| Encrypted Checksum | 522 | 876 | 522C | ←entry16 |
| Encrypted Non-Encrypted Flag | 524 | No | 524C | ←entry17 |
| Confirmatory Predefined Encrypted Value | 525 | AB7ZTB | 525C | ←entry18 |

Fourth Metadata 560

| | | | | |
|---|---|---|---|---|
| Module Name | 516 | FileB | 516D | ←entry19 |
| Class | 518 | Risk | 518D | ←entry20 |
| Encrypted Installation Identification | 520 | ABCDE | 520D | ←entry21 |
| Encrypted Checksum | 522 | 1876 | 522D | ←entry22 |
| Encrypted Non-Encrypted Flag | 524 | No | 524D | ←entry23 |
| Confirmatory Predefined Encrypted Value | 525 | AB7ZTB | 525D | ←entry24 |

FIG.5C

STORING AND USING MULTIPURPOSE SECRET DATA

CROSS-REFERENCE TO RELATED APPLICATIONS

This application is a continuation of prior U.S. application Ser. No. 16/767,580, filed 27 May 2020, which is a national stage, 371 of international PCT/US19/47743, filed 22 Aug. 2019, which is a continuation-in-part of U.S. application Ser. No. 16/126,204, filed 10 Sep. 2018, now U.S. patent Ser. No. 10/614,232, issued 7 Apr. 2020, all of which are hereby incorporated by reference herein in their entireties.

TECHNICAL FIELD

In the field digital security, a device and method of using the device to protect and use multipurpose secret data and/or a security key in combination with any program running on a computer where the device is attached to the computer and the data or key is made available to any one such program a single time after startup or a reset of the computer.

BACKGROUND ART

Embedded data stored in electronic circuitry is typically available for reading at any time as needed when using a computer. A good example is the basic input output system code and data stored in permanent read only memory used by the computer. Another example is permanent data stored in a dongle attached to a computer. When the security data is repeatedly accessible to more than one program running on the computer, authorized or not, the security of the computer can be more easily compromised.

There are some devices used for security purpose. For example, YUBIKEY is a dongle connected into the computer/device's universal serial bus and used to generate a six or eight characters time-based one-time password (OTP) (in conjunction with a helper application) for logging into some third-party websites using a strong authentication standard with the use of encryption. A new password is generated at a set time interval, typically every thirty seconds.

SUMMARY

A system and method improve digital security on a computer. The system includes an electronic circuit, a non-transitory computer storage medium, a random access memory and a register. The electronic circuit is operably connected to the computer to enable interaction. The electronic circuit stores sensitive data in an un-erasable state such that the sensitive data may not be altered and to permit transfer of the sensitive data to the computer only once after each power-up or after each reset of the computer. The electronic circuit limits access to the sensitive data only by an authorized program running on the computer.

The non-transitory computer storage medium is a physical memory device accessible for storage by the electronic circuit. The random access memory is operable to receive and store the sensitive data and to receive and store data from the physical memory device.

The register holds instructions that include when to allow the transfer of the sensitive data from the random access memory to the computer, and optionally on when and how to implement clearing of data from the random access memory, when to disable the random access memory, and when to prevent the data from being read by an unauthorized program running on the computer.

The electronic circuit may include a digital counter to count the interactions with the non-transitory computer storage medium and the random access memory. When present, the system may also include a timer trigger that can enable and disable access to the non-transitory computer storage medium and also enable and disable the digital counter. The timer trigger may also be operable to reset the register. The register may further be configured to control data transfer to and from the random access memory to a driver running on the computer.

The system may require the computer to have features including a read/write line, a data bus, a central processing unit and an address bus of the central processing unit. When such features are present, the electronic circuit is preferably integrated into the computer at the read/write line, the data bus, and the address bus of the central processing unit.

The system may require the random access memory to have first address lines. When present, the system preferably further includes a latch at the first address lines. The system may require the random access memory to have data lines. When present, the system preferably further includes a latch at the data lines.

The system optionally includes a digital counter in the electronic circuit. When present, the output of the digital counter is preferably delivered to second address lines for the non-transitory computer storage medium and is further preferably delivered to the first address lines of the random access memory.

Twelve variations of similar methods are disclosed with variations that each enable improvement to the operational performance of a computer by protecting the computer from being hacked. A first method uses an Encrypted Input List holding predefined parameters. A second method uses a confirmatory predefined encrypted value stored in metadata of a plurality of computer files. A third method uses a device that is independent of the computer and that stores a digital security key usable for encrypting and decrypting data in the computer. A fourth method uses an encrypted input list holding predefined parameters. A fifth method uses encrypted predefined parameters stored as metadata of authorized computer files. A sixth method uses an encrypted date and timeframe stored as metadata of computer files. A seventh method uses an encrypted checksum stored in metadata of one or more computer files. An eighth method uses multiple checksums, including an encrypted checksum stored in metadata of one or more computer files. A ninth method uses an encrypted installation identification stored in metadata of computer files. A tenth method uses an encrypted installation identification stored in metadata of computer files. An eleventh method uses at least three checkums. A twelfth method prevents the computer from installing non-certified software.

Technical Problem

By the very nature of electronic devices, data embedded into electronic devices are available to be read by any program running in the computer to which the device is attached there to, thus, if the data is used for security purpose, the security is compromised.

Solution to Problem

An electronic circuitry usable to transfer data only once at the start or reset of a computer and making the data available only to authorized software programs running in the computer. After an authorized program reads the data from the electronic device at the start or reset of the computer, the device is electronically turned off, thus disabling the transfer of the data a second time while the computer is on.

Advantageous Effects

The devices and methods disclosed herein involve an electronic microchip having data that is unalterable and is stored in a physical storage medium on the electronic microchip. The electronic circuitry of the microchip automatically transfers the data to a temporary holding memory and disables access to the physical storage medium so as not to permit transfer the data a second time while the computer is powered up, except for subsequent transfers occurring when the computer is reset or restarted.

After the computer loads and executes an authorized program, the authorized program reads data from the holding memory and issues a series of command-signals to electronic circuitry. The electronic circuitry then transfers the data to the authorized program. Once the data is retrieved from the memory, the authorized program sends a series of command-signals to the electronic circuitry instructing the electronic circuitry to clear the memory so as prevent the availability of data a second time to any program on the computer for the duration of the time the computer is turned on, except if a reset occurs, in which case, the process re-starts from beginning.

The electronic circuitry described herein will enable sensitive data, like an encryption and decryption key or any other secure data to be stored permanently in the electronic microchip and available to an authorized program running in the computer where the electronic device is integrated therein, without compromising the security of the computer or revealing the secure data.

One of the many uses for the microchip with security key involves encrypting software program before the installation of a program and decryption before the execution of the same, or to encrypt and decrypt metadata (information about the file) information of files stored in the computer, or to encrypt and decrypt any kind of data which may be required to be secured anywhere in the computer.

BRIEF DESCRIPTION OF DRAWINGS

The drawings illustrate preferred embodiments of the Virus immune computer system and method according to the disclosure. The reference numbers in the drawings are used consistently throughout. New reference numbers in FIG. 1 are given the 100 series numbers. Similarly, new reference numbers in each succeeding drawing are given a corresponding series number beginning with the figure number.

FIG. 1A illustrates a table with signal-values-commands to manage the electronic circuitry of FIG. 1 and FIG. 2.

DESCRIPTION OF EMBODIMENTS

In the following description, reference is made to the accompanying drawings, which form a part hereof and which illustrate several embodiments of the present invention. The drawings and preferred embodiments of the invention are presented with the understanding that the present invention is susceptible of embodiments in many different forms and, therefore, other embodiments may be utilized and structural, and operational changes may be made, without departing from the scope of the present invention.

If a single security key is to be available only to authorized programs and only available at the start up or reset of the computer, then an electronic circuitry must enable the security key, also referred to herein as the digital security key, to be available only once and thereafter be disabled.

Figure 4:
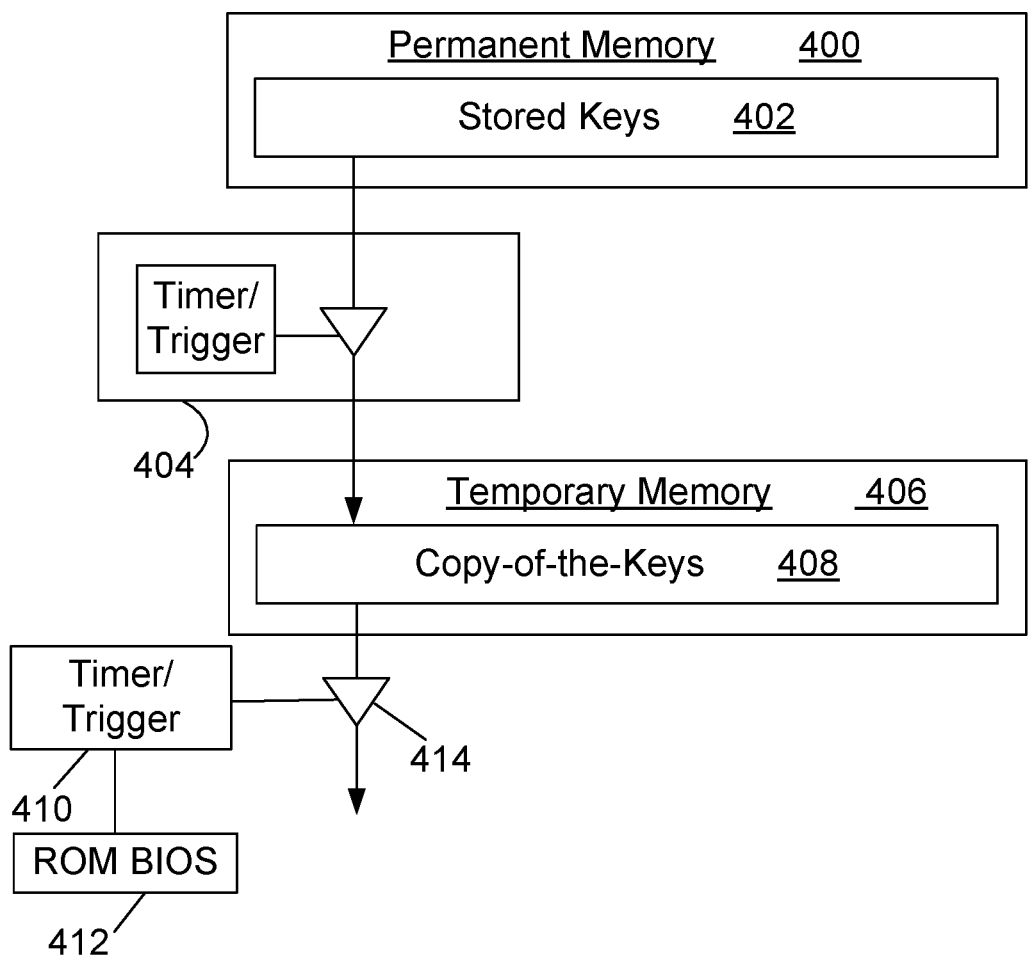
FIG. 4 illustrates electronic circuitry being improved upon.

FIG. 4 illustrates related technology from applicant's disclosures in U.S. patent application Ser. No. 15/839,450 (the '450 application). The present disclosure utilizes these disclosures and presents unique improvements thereto. The '450 application teaches using permanent memory (400) in an electronic device to hold stored keys (402). It further discloses that at power-up of the computer a transfer of the stored keys (402) through a timer/trigger and tri-state gate combination (404) to a temporary memory (406). It further teaches that a copy-of-the-keys (408) is made from the stored keys (402). After a time-threshold has elapsed, the timer/trigger and tri-state gate combination (404) is turned off and the stored keys (402) cannot be transferred (i.e. copied) a second time to the temporary memory (406).

The '450 application also teaches transferring the copy-of-the-keys (408) to a driver in the computer. The driver then deletes the copy-of-the-keys (408) from the temporary memory (406). The '450 application further teaches a combination of FIG. 4—timer/trigger (410) and a Read Only Basic Input and Output System (412) working together to disable the tri-state gate (414) when necessary to prevent the copy-of-the-keys (408) from being read by an unauthorized program at power-up of the computer and before the driver is loaded into the computer's memory.

Figure 5A:
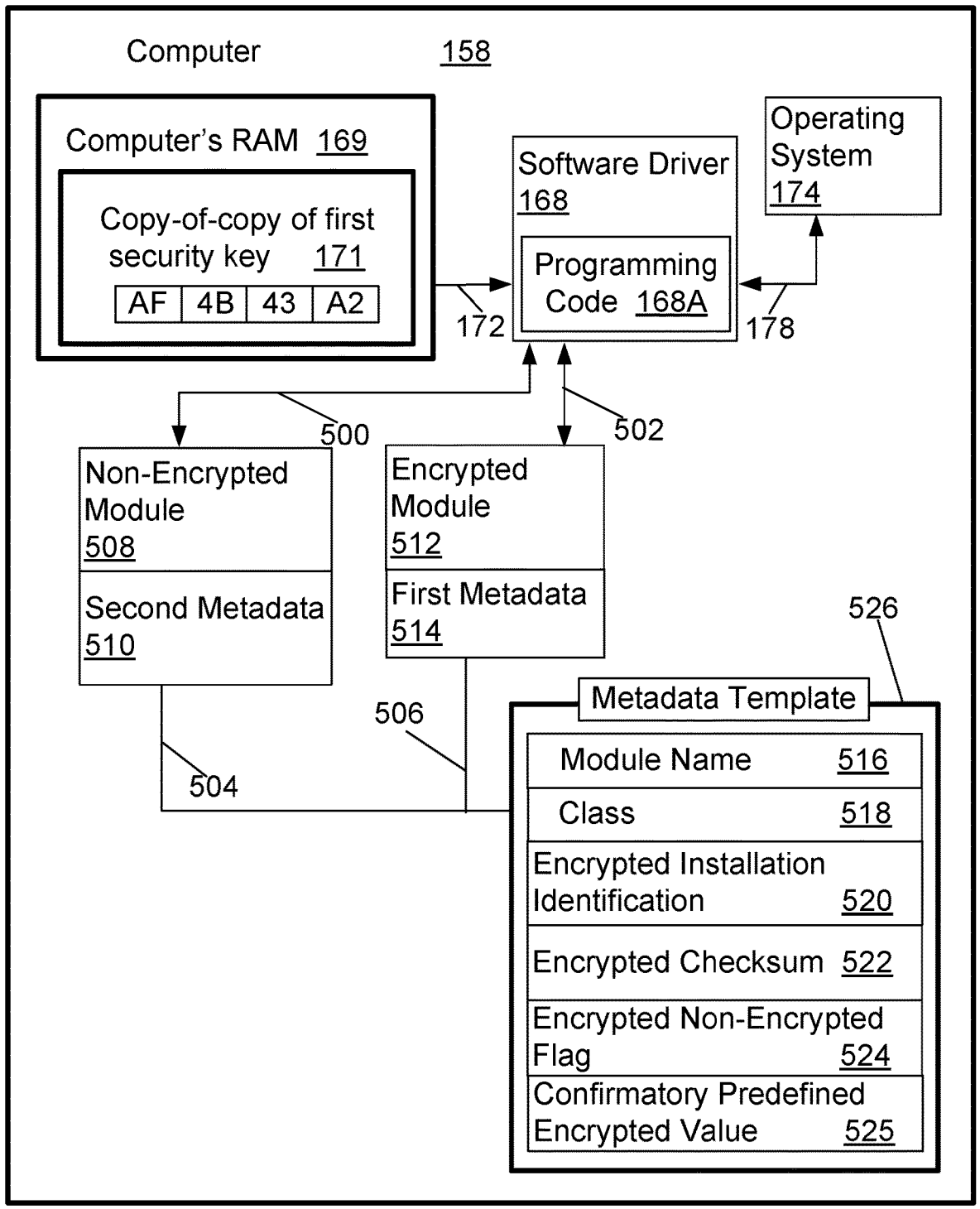
FIG. 5A illustrates uses of the microchip with security key of FIG. 1.
Figure 5D:
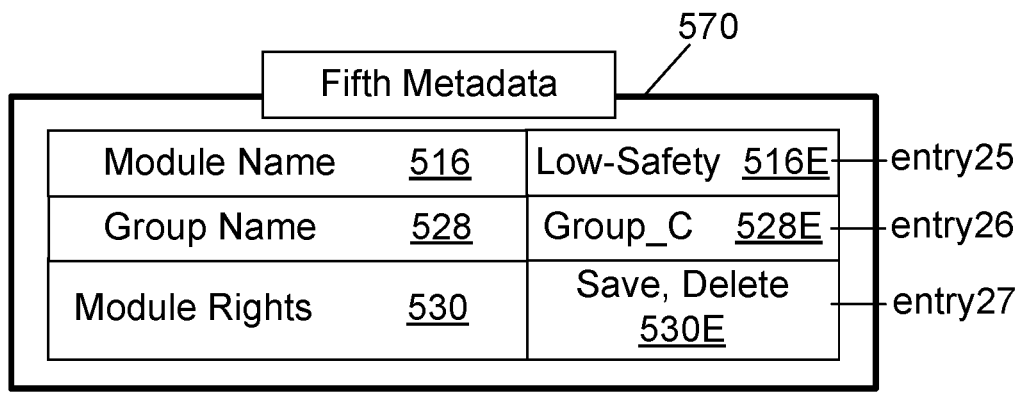
FIG. 5B illustrates file metadata.
FIG. 5C further illustrates file metadata.
Figure 5E:
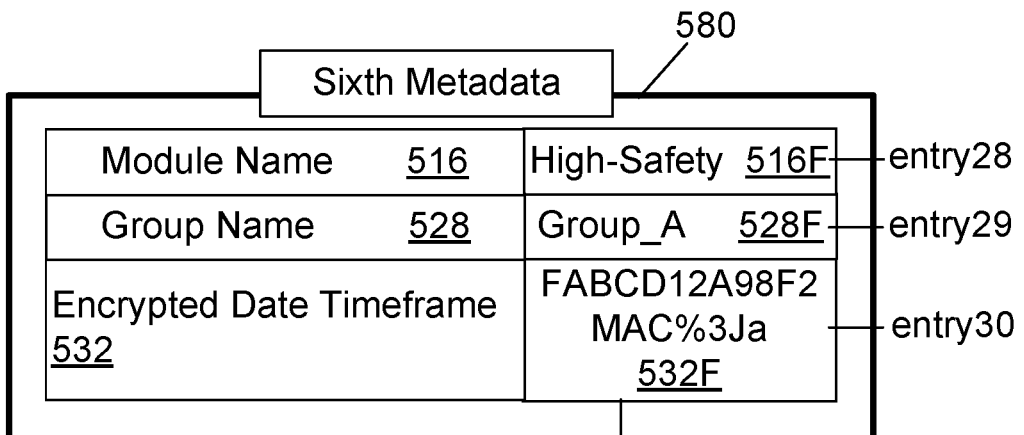
Figure 5E:
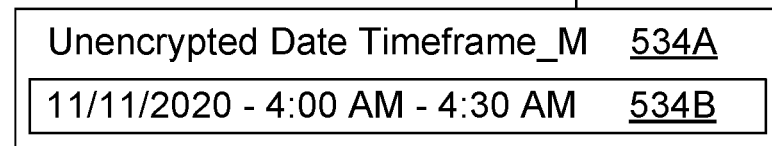
Figure 5F:
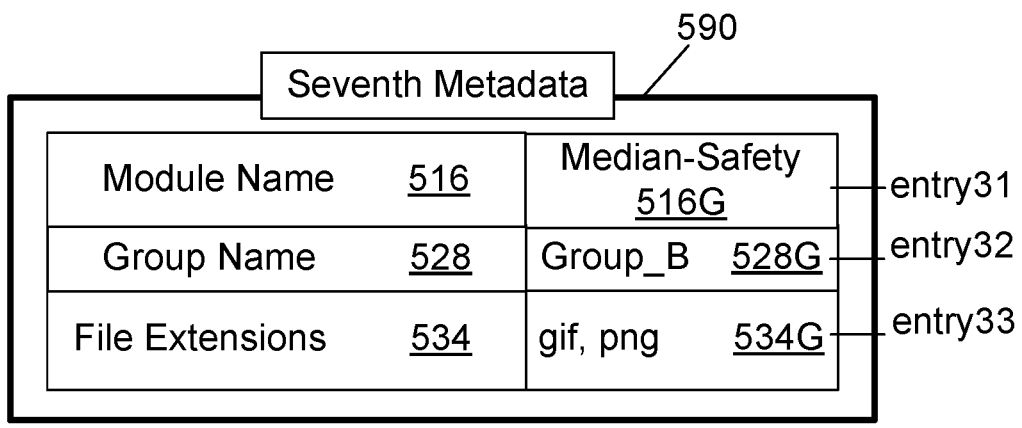
Figure 5G:
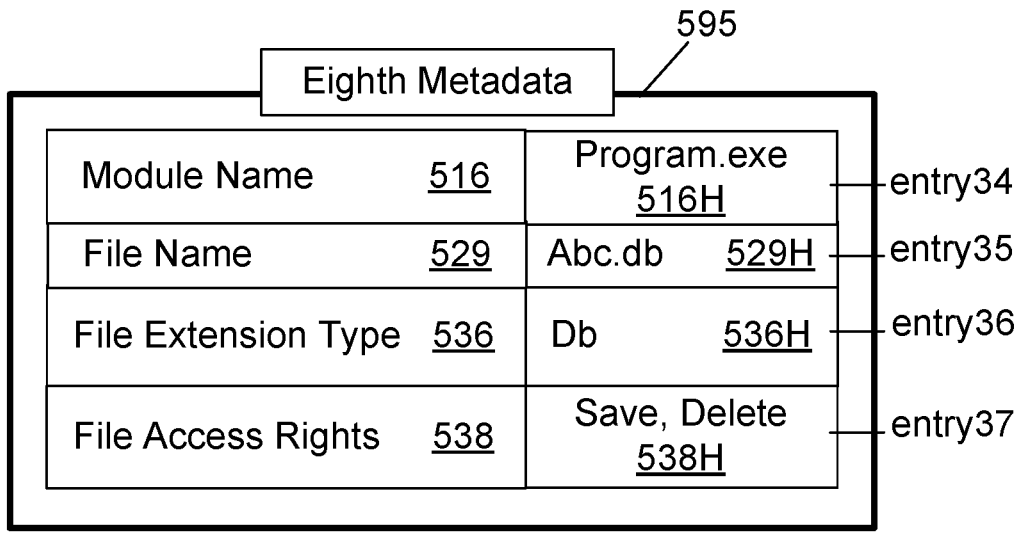
Figure 5H:
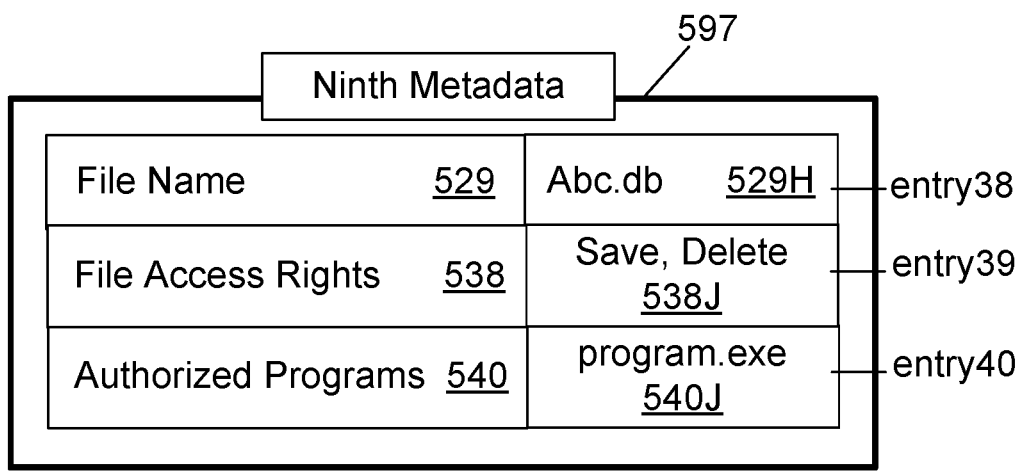

FIG. 5A, FIG. 5B and FIG. 5C illustrate an embodiment where one or more elements of the file metadata is encrypted to enable the identification of computer virus executable file without even performing a decryption of the computer malware software code.

Figure 1:
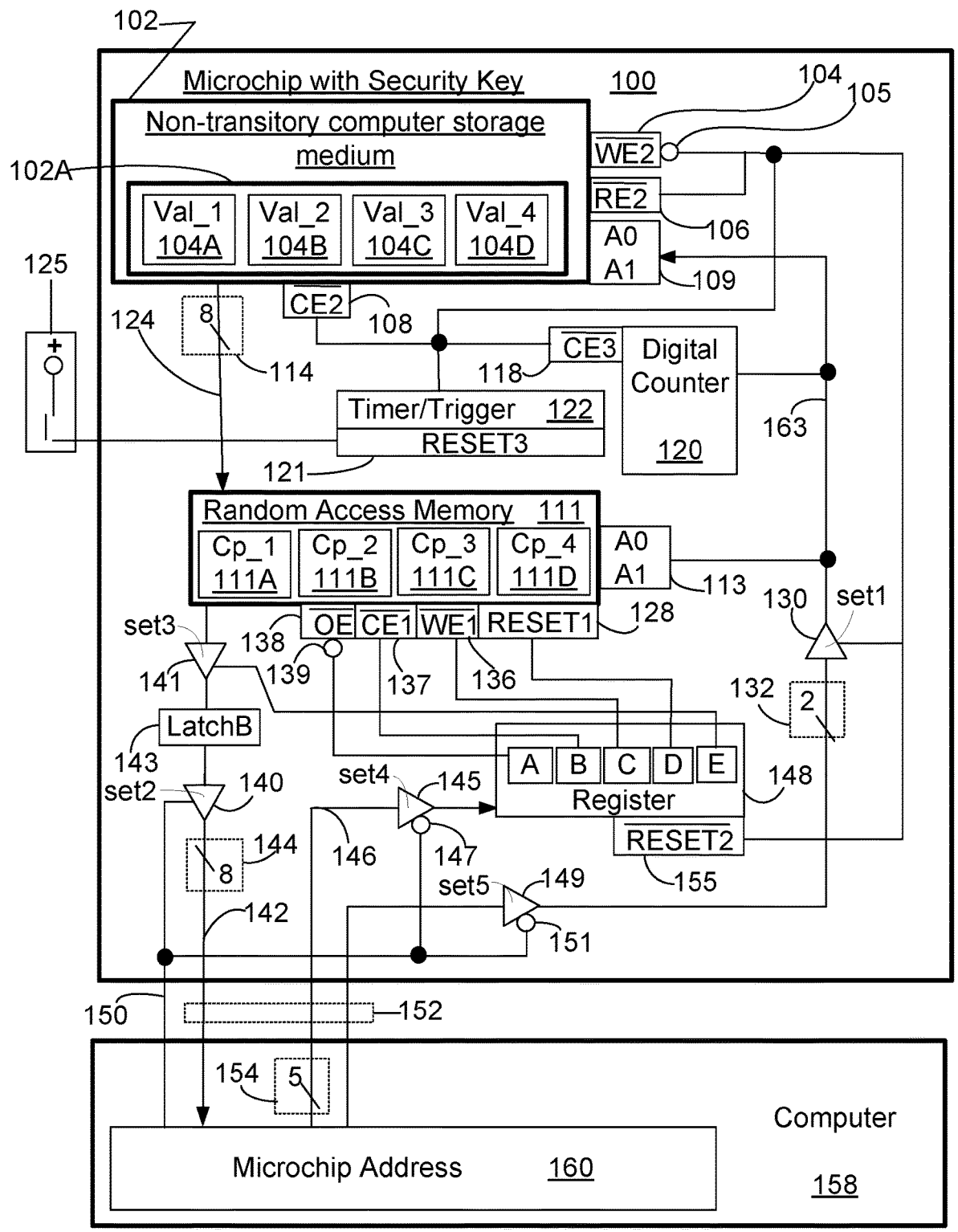
FIG. 1 illustrates the electronic circuitry of a microchip for storing sensitive data.
Figure 1A:
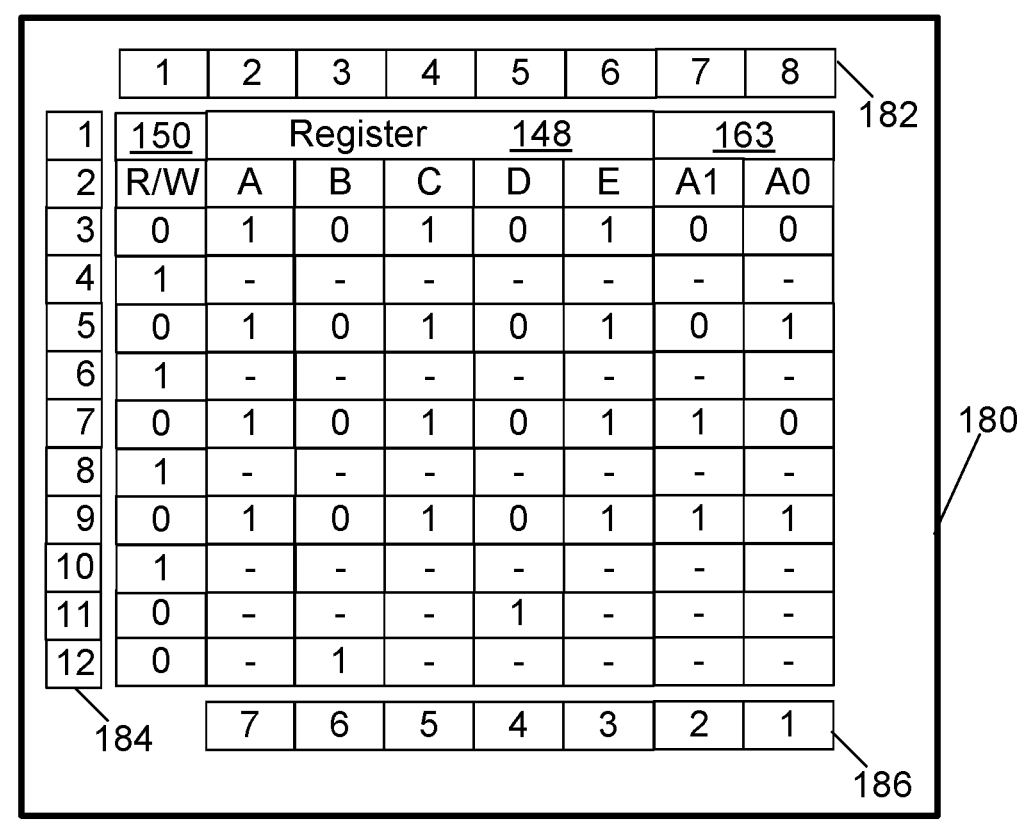
Figure 1B:
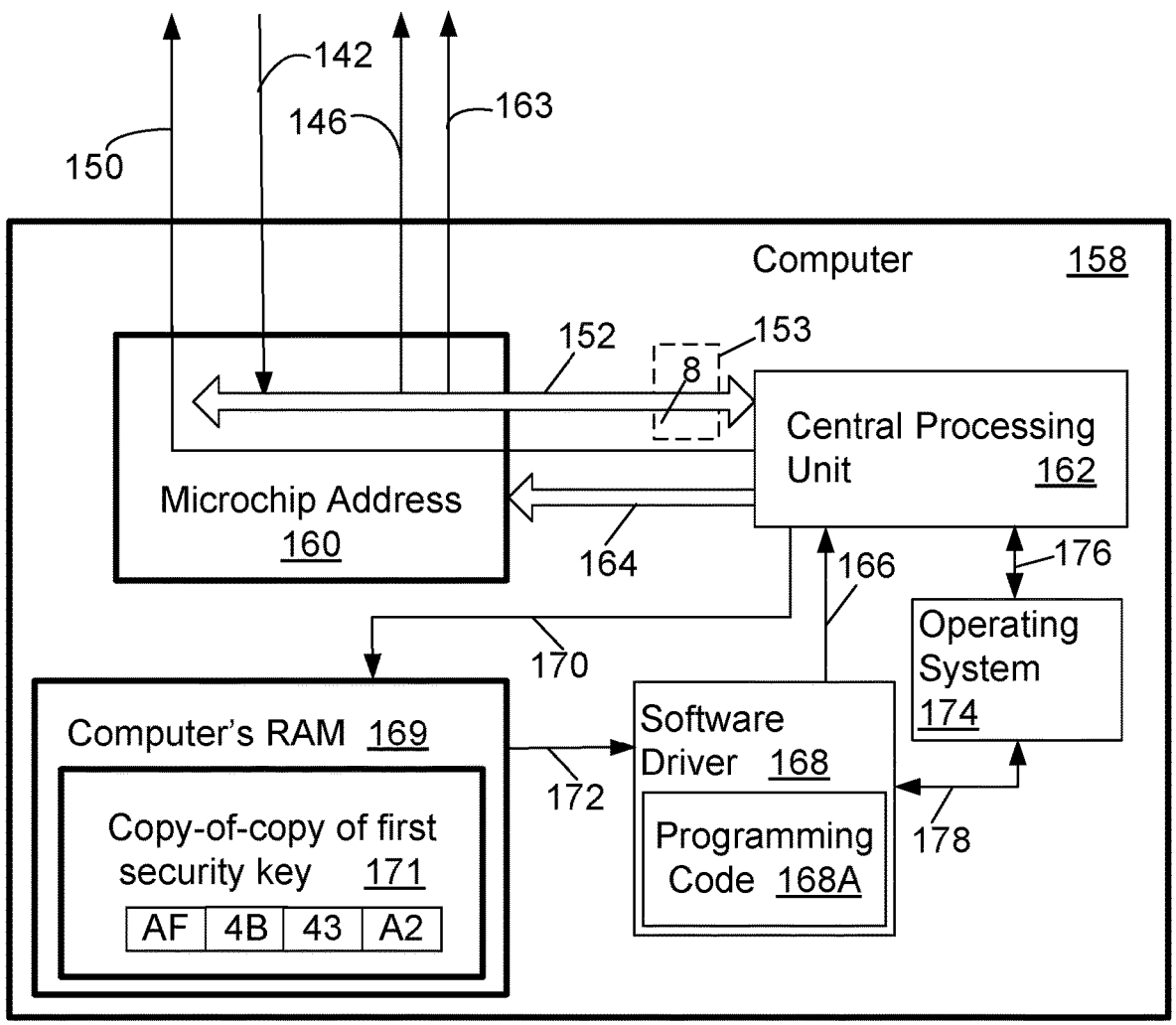
FIG. 1B illustrates the electronic circuitry of the microchip interfacing with the central processing unit and a software driver used to program the microchip through the central processing unit of the computer.

Once a request to execute a file arrives at the Operating System (174), the Operating System (174) passes the request (see FIG. 1B, second double-headed arrow line (178)) to the Software Driver (168). The Software Driver (168) comprising Programming Code (168A), which once executed by the Central Processing Unit (162) will control the security of the computer, which is exemplified by Computer (158). Next, the Software Driver (168) using the computer security key, the Copy-of-copy of first security key (171) decrypts the executable file's metadata deriving a decrypted file's metadata. After the Software Driver (168) verification, if the decrypted file's metadata has a predefined value e.g. 'System', 'Risk', 'Authorized', etc. 'Risk' is a marking in the file's metadata which designates that the program or file is of a non-trusted designation source, and all others markings are designated that the program or file is of a trusted source. The predefined value can be any of the many file's metadata's parameters, or the predefined value can a randomly value generated for the specific computer. And if the predefined value is present, then the Software Driver (168) prepares the executable file to be executed by the Operating System (174). If the predefined value is not present as is in the case of a computer virus, the Software Driver (168) halts the execution of the requested executable file without spending any time to decrypt the executable file.

Figure 6A:
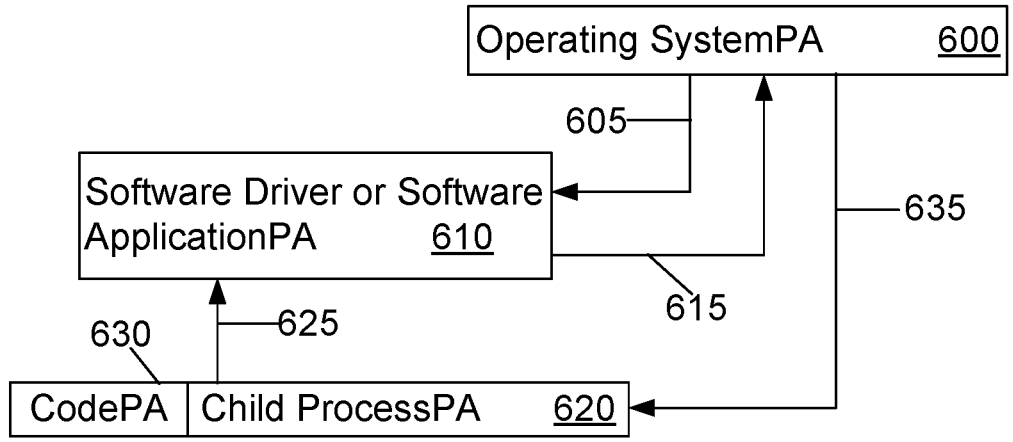
FIG. 6A illustrates the execution of a child process.

FIG. 6A illustrates the running of a child process, as currently done. A child process is a process initiated by another process, which is then termed "the parent process." The child process will typically possess some characteristics of the parent process and the two may communicate as needed. The child process is usually under the control of the parent process. The operating systemPA (600) initiates (sixth single-headed arrow line (605)) the software driver or software applicationPA (610). Then, the software driver or software applicationPA (610) requests (see the fifth single-headed arrow line (615)) the operating systemPA (600) to load a program. Then the operating systemPA (600) loads (fourth single-headed arrow line (635)) the program which is considered a child process (namely, child processPA (620)). Then, the operating systemPA (600) loads (see the seventh single-headed arrow line (625)) the child processPA (620) and the child processPA (620) software code, namely CodePA (630), is loaded in the computer's memory and executed by the central processing unit of the computer. Once the execution of the codePA (630) comes to an end, the child processPA (620) communicates back (see the seventh single-headed arrow line (625)) to the parent process, to the software driver or to the software applicationPA (610).

Figure 6B:
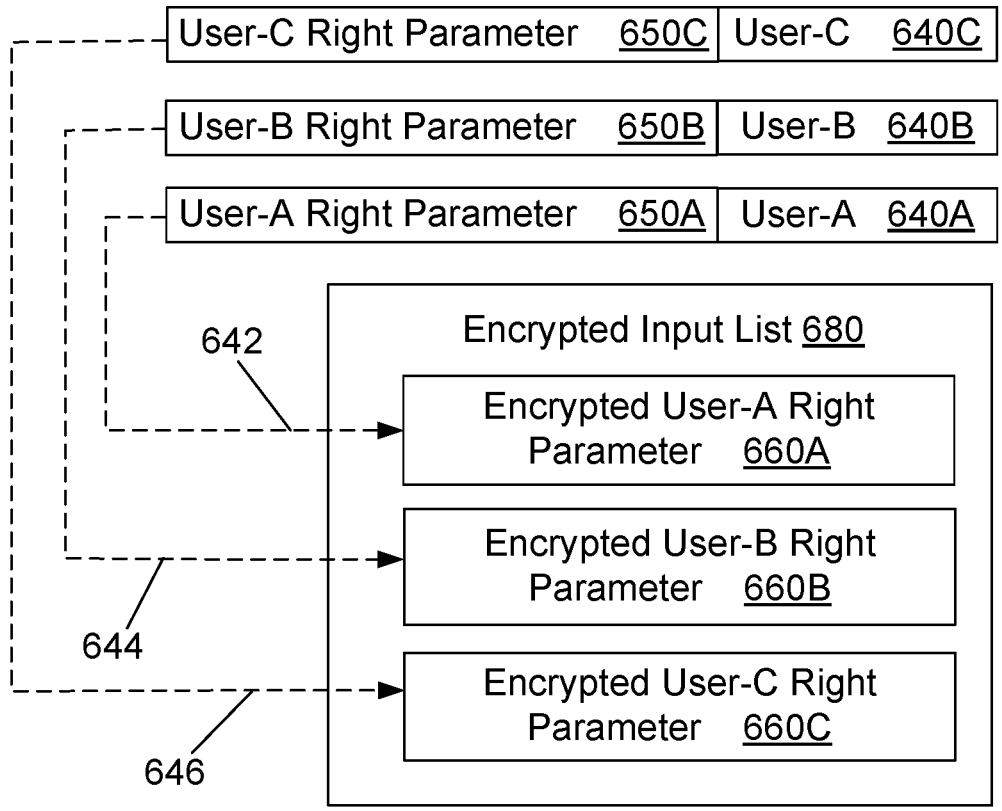
FIG. 6B illustrates users and users' right parameters associated with the encrypted input list.
Figure 7:
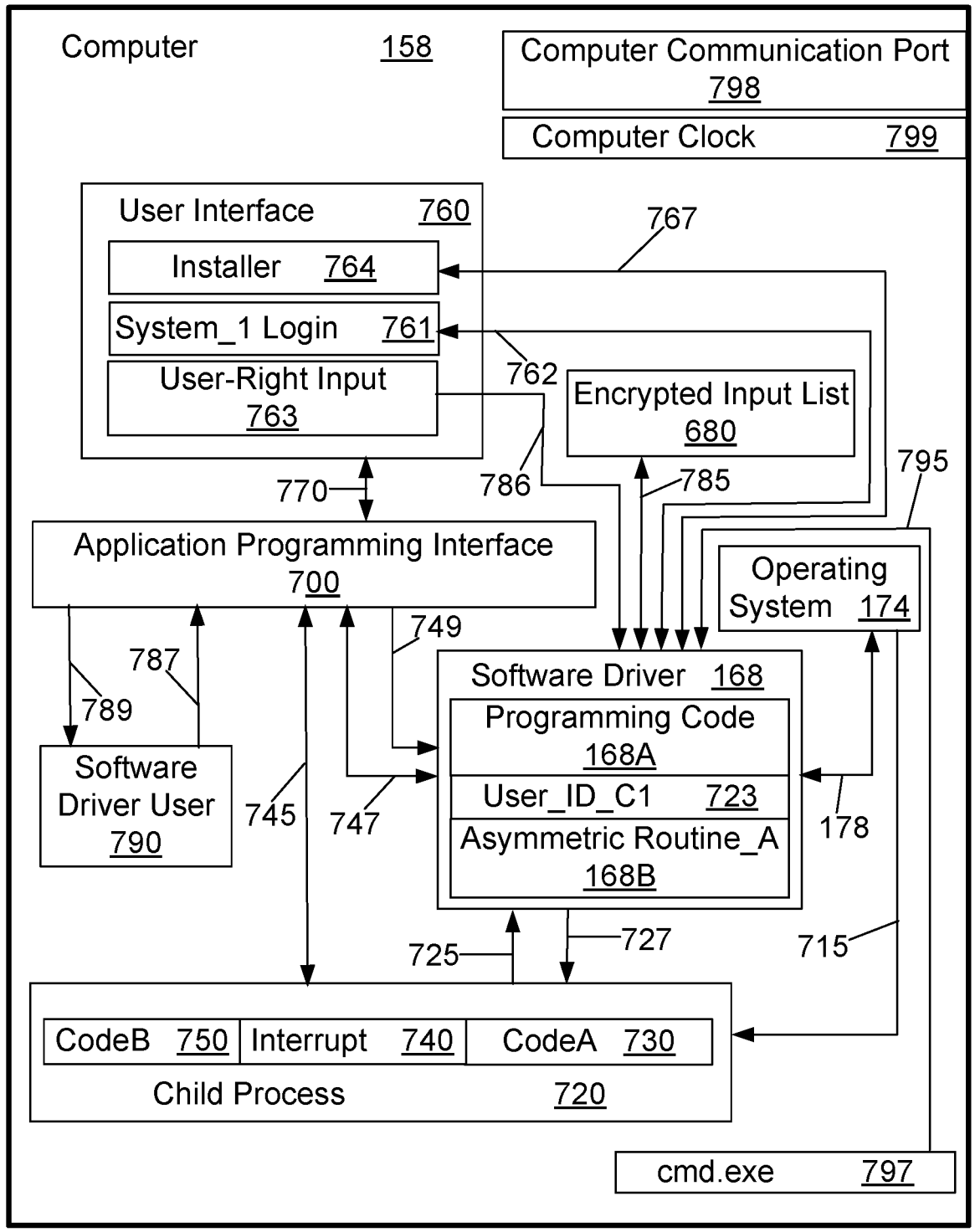
FIG. 7 illustrates the execution of a child process using the microchip with security key of FIG. 1.

FIG. 6B illustrates the Encrypted Input List (680) which is used by the Software Driver (168) of FIG. 7. Users set their user right parameters which then is encrypted by the Software Driver (168) and saved as encrypted user right parameter in the Encrypted Input List (680).

As a user enters user right parameter using a software the User-Right Input (763) module of the User Interface (760) and once the user requests the saving of the user's entered user right parameters, the Software Driver (168) using the copy of copy the computer security key, the Copy-of-copy of first security key (171) the Software Driver (168) encrypts the user's entered user right parameter deriving an encrypted user right parameter then saving the encrypted user right parameter in the Encrypted Input List (680).

FIG. 7 illustrates using a secondary login to enable the execution of software in a computer to prevent code injection hacking from executing program/s in the computer, thus preventing the escalation of a hacking attack, if one happens to occur. The secondary login is an independent login from the login of the Operating System (174) of the computer, Computer (158). The secondary login, System_1 Login (761) is not required for the operation the operating system of the computer to which the secondary login is hosted, e.g. the Operating System (174). Also, the secondary login is not necessary for the operation of the computer to which the secondary login is hosted, the computer, Computer (158). The secondary login is associated with software driver, Software Driver (168). Also, the secondary login is associated with copy of copy of the security key, the copy of copy the computer security key, the Copy-of-copy of first security key (171).

In a computer hosting the invention, all executable files will have their metadata changed and the changed metadata's structure is used specifically to implement the invention and will be present in every executable file of the computer hosting the invention. If the executable files are of authorized software, they will be marked as such: e.g. 'Authorized.' If the executable files are of software already installed in the computer, they will be marked as such: e.g. 'Safe.' If the executable files are of software not already installed in the computer and not authorized, they will be marked as such: e.g. 'Risk.' If the executable files are of software already installed in the computer and associated with the operating system of the computer, they will be marked as such: e.g. 'System.'

An exemplary scenario where code injection, if successful, may compromise the security of the computer hosting the invention occurs when the secondary login is not implemented in the computer. The executable files of the operating system cannot be encrypted because they are signed by the producer of the operating system, in the case of WINDOWS, the WINDOWS operating system's executable files are digitally signed by MICROSOFT. If any executable file deemed part of the operating system is encrypted, then the operating system disables the file, because in the view of the operating system, the file is corrupted.

A hacker can initiate an attack in a computer using many methods, and one of them is code injection techniques. Assuming now that a hacker is able to inject code into a running process (running software in the computer). And if the running process is part of a software which is in the same higher level as the operating system, e.g. webserver. In this scenario, the hacker may be able bypasses all the security in the computer, including the login mechanism part of the operating system and be right inside the operating system's realm and run the executable files/programs of the operating system.

And since the executables of the operating system are not encrypted, and even if they were, it wouldn't matter, because once the code injection hacking happens, the hacker bypasses all the security of the computer. And by having direct access to the operating system of the computer, and since the hacker is not uploading customized executable program files to trigger an alarm by the Software Driver (168), then the hacker can proceed and execute operating system's programs in the computer, thus, propagating the hacking.

Some programs in the computer's operating system allow the hacker to execute the operating system's programs, and in the MICROSOFT WINDOWS, cmd.exe is used for such endeavor. The cmd.exe allows users and also hackers to issues commands to the operating system and also to execute other programs in the computers, and if the cmd.exe is in the hands of a hacker, this can be disastrous to the computer and also to the network where the computer is connected.

Thus, in this exemplary scenario, the hacker will also have access to and be able to execute many other programs which are available to aid the management of the computer's resources and the network the computer is attached thereto: some programs are used to change the firewall (a program to protect access to the computer) and others to manage the network hardware and communication, etc. And as explained here, if a hacker is able to bypass the computer's operating system login, the hacker is able to control the computer and possibly, all computers in a network connected to the computer controlled by the hacker.

With the provided secondary login, if a hacker happens to use code injection and get unauthorized access to a computer, once the hacker initiates the operating system programs (e.g. the cmd.exe (797)), then the Operating System (174) passes the request (see the second double-headed arrow line (178)) to the Software Driver (168), and the Software Driver (168) fetches (see the third single-headed arrow line (172) FIG. 1B) from the random access memory, Computer's RAM (169) the copy of copy of the computer security key, the Copy-of-copy of first security key (171) then the Software Driver (168) retrieves (see the ninth double-headed arrow line (785)) the Encrypted Input List (680). And using the copy of copy of the computer security key, Copy-of-copy of first security key (171), the Software Driver (168) decrypts the Encrypted Input List (680) deriving a decrypted input list.

Then the Software Driver (168) verifies if the name of the requested file for execution is in the first decrypted input list, and in our example, requested file is the cmd.exe (797) and the name 'cmd.exe' is present in the first decrypted input list.

Next, the Software Driver (168) verifies if a user is logged in, and in our example a user is logged in, the user identification, User_ID_C1 (723), then the Software Driver (168) allows the execution of the cmd.exe (797). On the other hand, if a user is not logged in, the Software Driver (168) halts the execution of the cmd.exe (797). Further, the Software Driver (168) notifies the computer's user and/or the network's administrator of the ongoing hacking attempt.

As explained, this method will stop the escalation of code injection attack, if one happens to occur in a computer hosting the invention. And since an operating system's executable program will only be allowed to run in the computer if an authorized user is logged in. Also, the method can be implemented where an authorized user will only be continuously logged in into the computer for a predetermined timeframe, e.g. 5 minutes. And, if a hacker happens to get illegal access to the computer, the hacker will not have enough time to propagate the hacking. And if the attempt hacking happens once an authorized user is not logged in into the computer, the software driver, Software Driver (168)) notifies the computer's user and/or the network administrator as the hacking is ongoing and the hacking is immediately stopped.

Supposing that the computer's user and/or the network's administrator receives a notification of an ongoing hacking attempt, then the secondary login can be implemented to stop all logging attempts for specified timeframe or until a specific user (e.g. vice present of the organizations) logs into the secondary login to enable other users to login into the secondary login. Once implemented as described herein, any hacking attempt is stopped before it can cause any harm to the computer and/or to the organization owning the computer and/or network.

Figure 10:
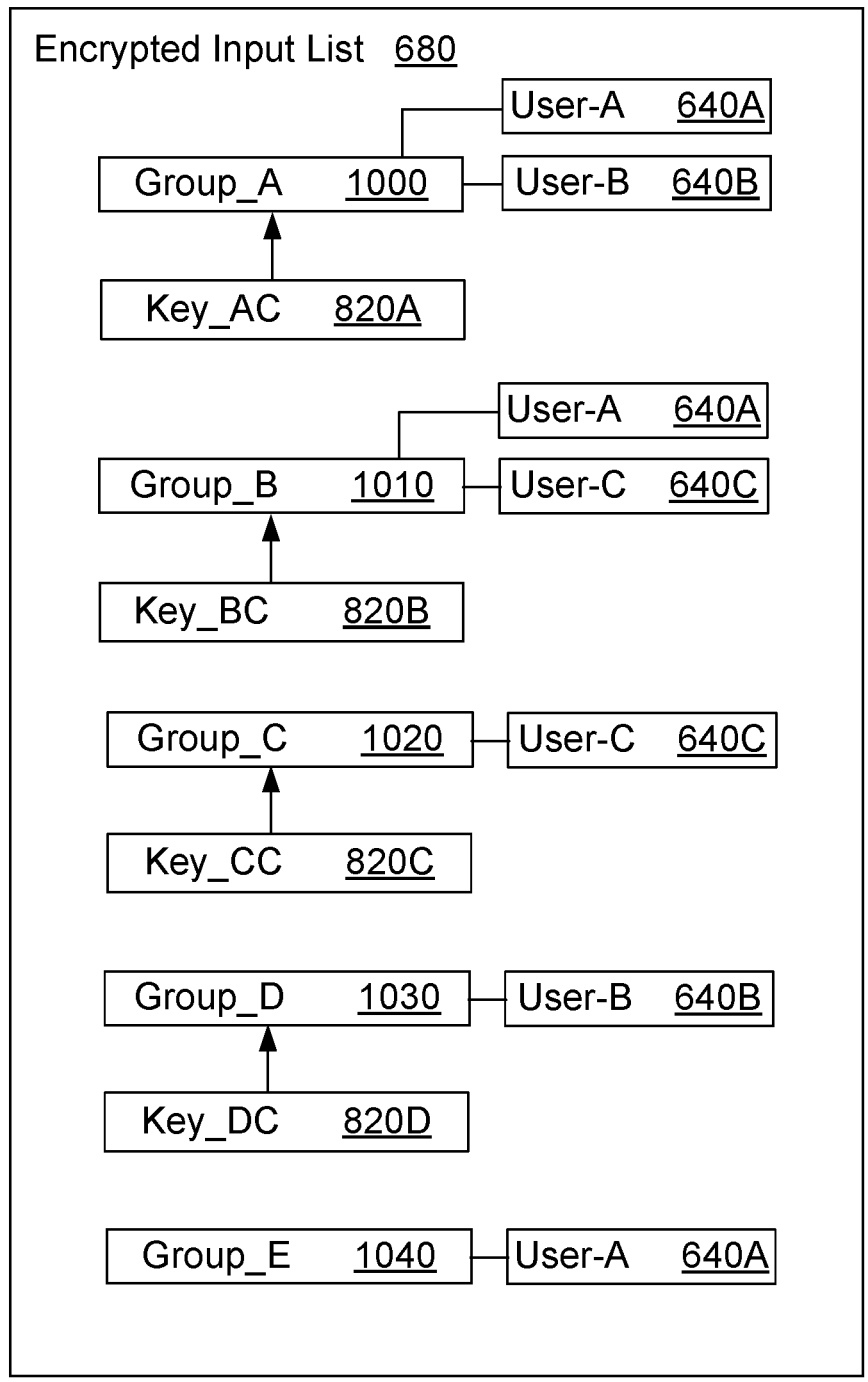
FIG. 10 illustrates the use of the multiple keys of FIG. 9 to associate with users.
Figure 11:
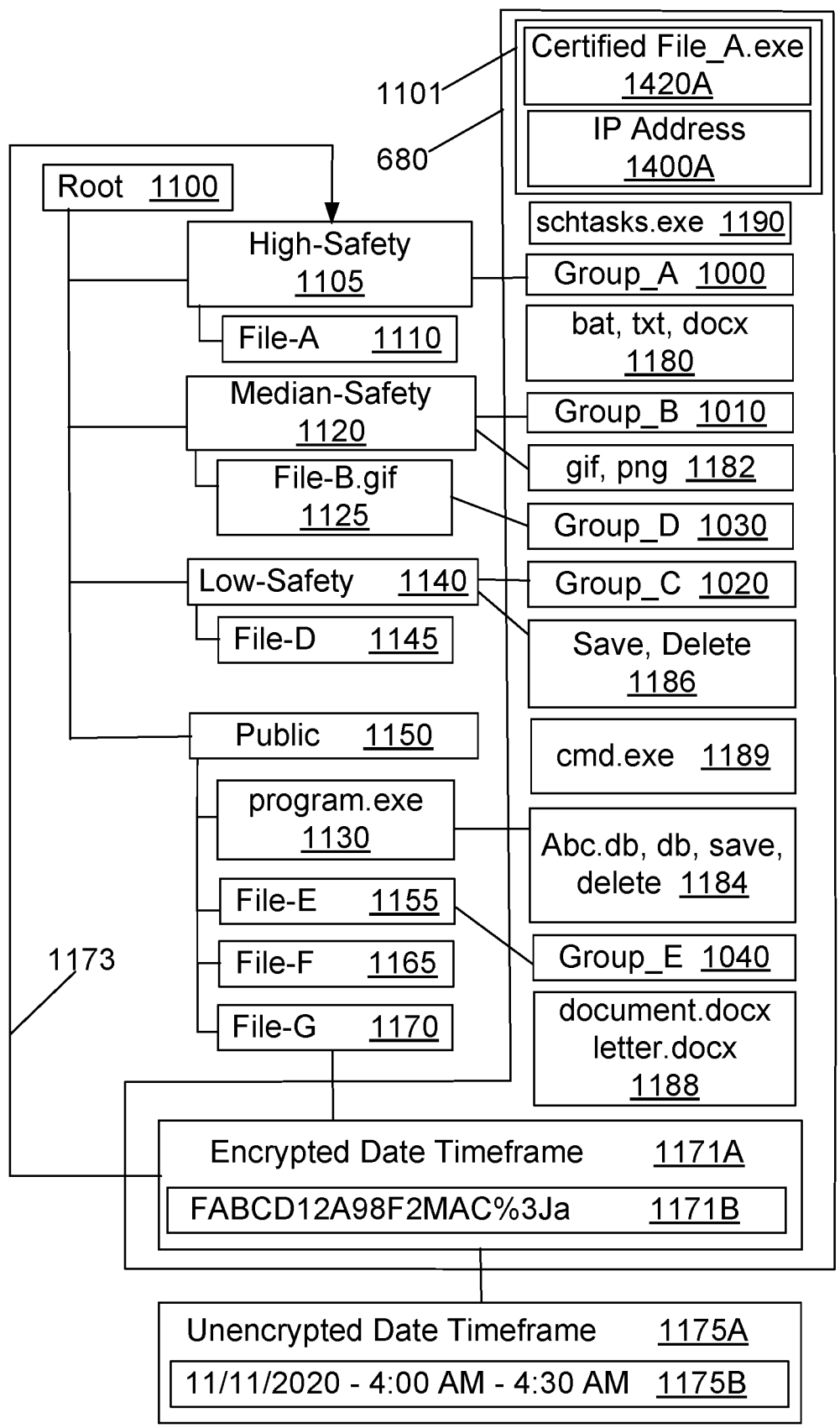
FIG. 11 illustrates the associated multiple keys of FIG. 9 with users of FIG. 10 to protect files of the computer by encrypting file metadata.

FIG. 10 and FIG. 11 illustrate an embodiment to enable the assigning of one or more user rights to interact with files in the computer. These rights are controlled by the software responsible for the security of the computer, in the exemplary scenario this is the first software, Software Driver (168), thus enabling higher security with less complexity, thus lowering costs for the computer's operation.

Currently, the way to assign a user's right (like who can access, edit and delete a file) to a computer's file or folder involves a network administrator assigning said rights to each individual. Once a user, using the computer's operating system provided login mechanism and logs in, the user is allowed to access the file/folder. If a match is not present, access is denied. In some instances, the operating system hides files and folders assigned to one user if another user logs in to the computer.

The just described methodology has one major drawback. If a hacker happens to hack a computer's running process (program running in the computer) by injecting code in the running process, and if the running process happens to be in a higher level, like a webserver, then, the operating system's log in mechanism and the user's assigned rights to each file or folder is of no use, because the hacker is able to access the login user's credentials in the computer (user password and identifications stored in a file in the computer) and have the same right as any user in the computer.

FIG. 10 illustrates a new mechanism where the assigning of user's rights to a file or folder is saved in encrypted form in the Encrypted Input List (680). And FIG. 11 illustrates encrypted metadata parameters for the files and folders. The embodiment's implementation described herein along with other mechanism described throughout this disclosure will prevent any possibility a hacker escalating the hacking in case a hacker happens to hack a computer based on a code injection technique.

Figure 12:
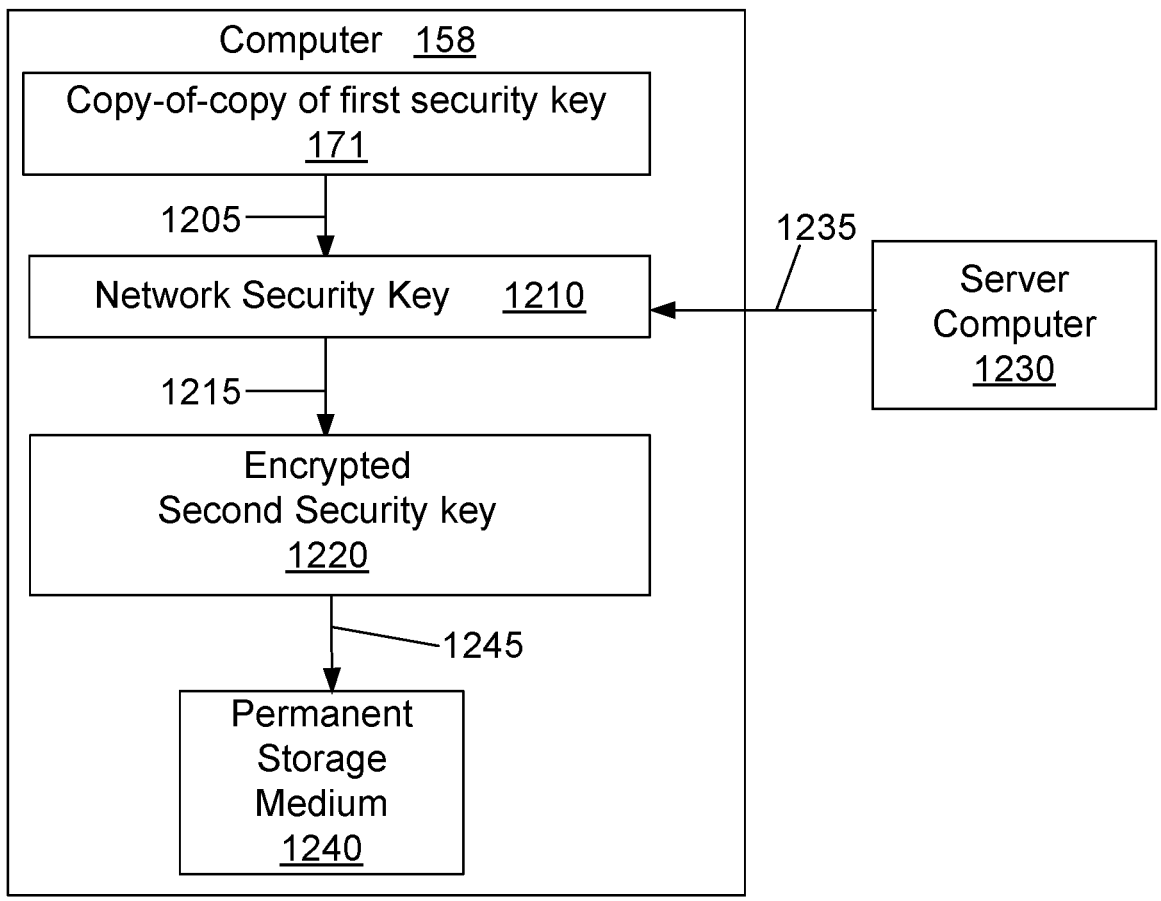
FIG. 12 illustrates a process of receiving a network security key from a computer in a network and using the copy of the computer security key, the Copy-of-copy of the first security key to encrypt the network security key deriving an encrypted security key and saving the encrypted security key in the computer's non-transitory computer storage medium.
Figure 13:
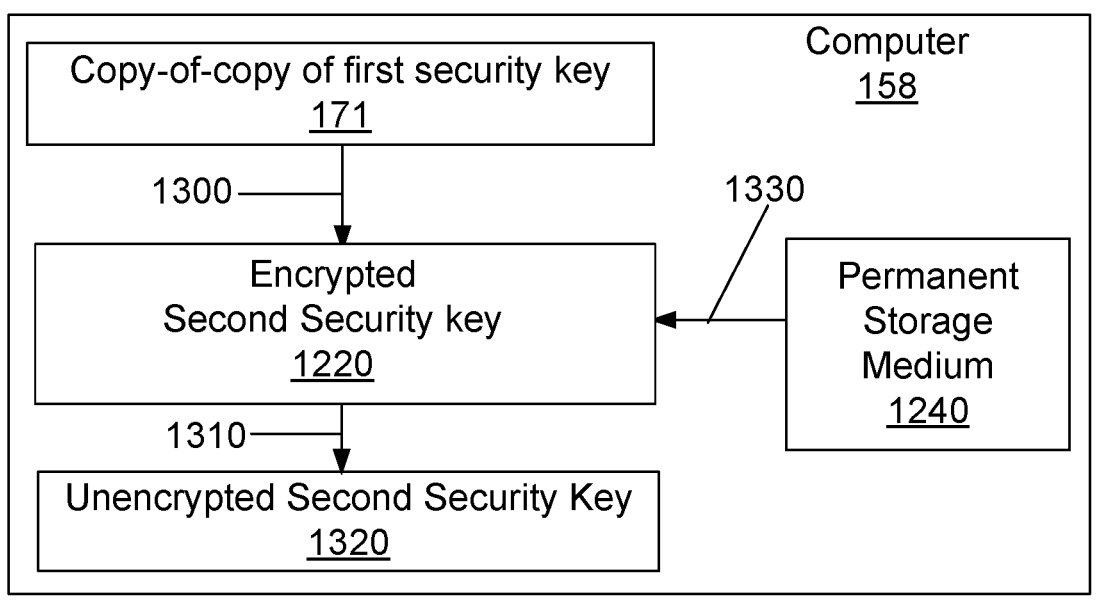
FIG. 13 illustrates a process of retrieving the encrypted key from a computer's non-transitory computer storage medium and using the copy of the computer security key, the Copy-of-copy of the first security key to decrypt the encrypted security key to derive the network security key.

FIG. 12 and FIG. 13 illustrates an embodiment in which a security key is received from a network and the security key from an attached device is used to encrypt the received encryption key deriving an encrypted security key and saving the encrypted security key to the computer's non-transitory computer storage medium. Then as needed, the computer fetching from the non-transitory computer storage medium the encrypted security key and using the security key from the attached device to decrypted the encrypted security key deriving the un-encrypted security key which was received from the network. Then using the decrypted key to encrypt/decrypt software, files, and contents in the computer.

FIG. 13 illustrates a second computer, Server Computer (1230), in communication with the computer, Computer (158), transmits a security key, which, once received by the computer, Computer (158) becomes the permanent security key (the Network Security Key (1210)) which is the second security key of the computer, Computer (158).

First, the computer, Computer (158), receives (see eleventh double-headed arrow line (1235)) the transmitted security key, Network Security Key (1210) from the second computer, Server Computer (1230). Second, the computer, Computer (158) using (see sixteenth single-headed arrow line (1205)) the copy of copy of the computer security key, the Copy-of-copy of first security key (171) encrypts the second security key of the computer, the Network Security Key (1210) deriving (see FIG. 12, seventeenth single-headed arrow line (1215)) the Encrypted Second Security Key (1220). Then the Encrypted Second Security Key (1220) is saved (see FIG. 12, nineteenth single-headed arrow line (1245)) in the first non-transitory computer storage medium, Permanent Storage Medium (1240) of the computer, Computer (158).

At the runtime of the computer, Computer (158), the computer retrieves (see twenty-first single-headed arrow line (1330)) from the first non-transitory computer storage medium, Permanent Storage Medium (1240) the Encrypted Second Security Key (1220) and using (see FIG. 13, twentieth single-headed arrow line (1300)) copy of the computer security key, the Copy-of-copy of first security key (171), the computer, Computer (158) decrypts the Encrypted Second Security Key (1220) deriving (see twentieth single-headed arrow line (1310)) the Unencrypted Second Security Key (1320). Thereafter, the computer, Computer (158) uses the Unencrypted Second Security Key (1320) to encrypt and decrypt data, file and software in the computer, Computer (158) the same way the computer, Computer (158) uses the copy of the computer security key, the Copy-of-copy of first security key (171) to encrypt and decrypt data, file and software as described throughout in this disclosure.

DEFINITIONS

FIG. 1, FIG. 1A, FIG. 1B, FIG. 2 and FIG. 7 help to explain the functionality of the digital elements used in the microchip with security key.

An inverter is sometimes called a "logic invertor or not gate." The inverter inverts the signal which is present in its input. For example, if the input signal is low, the output is high and vice-versa.

An "encrypted input list" is a file that contains a list of data. Data in the encrypted input list may be used as input by a software program while the software program after decrypting the encrypted input list deriving a decrypted input list applies the data from the decrypted input list against the other data in in a file or in the computer's memory.

The circuitry of the microchip with security key can be implemented in a single microchip or it can be implemented in a computer board. If implemented in a single microchip, then all the elements will be part of the single microchip. If implemented in a computer board, then each element can be soldered in the computer board and the grouping of all the elements will enable the same performance as is done by a single microchip. The term microchip is to be broadly interpreted to include the circuitry of the computer board as well and digital logic components connected by the circuitry. If implemented in a microchip or in a computer board, digital logic components and a circuitry where signals flow is involved.

A non-transitory computer storage medium once referred to as part of the Microchip with Security Key (100) is the non-transitory computer storage medium (102) and is a physical device and is capable of permanently storing byte values. Examples include Read Only Memory (ROM), flash memory, Erasable Programmable Read-Only (EPROM) Memory, or any kind of tangible computer storage medium that is not transient.

A non-transitory computer storage medium once referred as part of the Computer (158) is the first non-transitory computer storage medium, Permanent Storage Medium (1240) and is a physical storage unit like a computer hard disk, a flash memory, or any currently available or yet to be invented storage medium capable of storing and holding stored data permanently.

A non-transitory computer storage medium once referred as part of the Certifying Server Computer (1400) is the second non-transitory computer storage medium, Permanent Storage Medium (1470) and is a physical storage unit like a computer hard disk, a flash memory or any currently available or yet to be invented storage medium capable of storing and holding stored data permanently.

The digital counter (120) includes a clock that continuously vacillates from high to low, and from low to high during the time the circuitry of the computer, Computer (158) is on. The digital counter (120) starts from zero and once the clock changes (from a high to a low or a low to a high, depending on the design of the digital counter (120)), the digital counter (120) increments to the next value. Once the digital counter (120) reaches a designated maximum count of the digital counter (120), the digital counter (120) resets and restarts from zero again. The count from zero to the designated value is call a "range." For example, the digital counter (120) has only two lines and is a two bits counter (one line is one bit) and it will count from zero "00" to three "11" then back to zero "00" again.

The timer/trigger (122) is a digital circuitry that is commonly known and usually built using "555" timer and the external circuitry feeding the trigger signal to the "555" designates how long the timer/trigger (122) will take to change state. For example, the external circuitry designates how long it takes for the timer/trigger (122) to go from low to high and then keeps the circuitry high for the duration that the computer, Computer (158) is turned on or until the reset switch/button (125) is pressed. The timer/trigger (122) would stay low, long enough for the digital counter (120) to count from zero "00" to three "11."

The random access memory (111) is transient memory that is used to retain received bytes, (i.e. stored values) while the memory is in a powered-up state, unless the received bytes are changed. The stored values are maintained in their original state for the duration that the computer, Computer (158) is on or until their stored value is changed.

A tri-state gate operates as on/off switches. Five such gates are illustrated: a set1 (130) of two tri-states gates, set2 (140) of eight tri-state gates, set3 (141) of eight tri-state gates, set4 (145) of five tri-state gates and set5 of two tri-state gates (149). Each tri-state gate functions like a mechanical switch, very much like a light bulb wall switch, if the wall switch is turned on, the light bulb lights, if it is turned off, the light bulb is off. With a low signal applied to its control line, the tri-state gate is turned off. If a high signal is applied to its control line, the tri-state switch is turned on.

A latch will hold an input signal in a latched state even after the input signal is removed, that is, it latches the signal. Two similarly functioning latches are disclosed herein: latchA (210) and latchB (143). A good example of a latch is a button placed in signal light poles to notify the signal system of a pedestrian presence. Once a pedestrian presses the button, a latch with the signal system latches onto the signal from the pressed button and retains it even after the pedestrian has released the button. The latchA (210) holds the address signal from the two lines (see second box (132)) of the second internal transport lines (163). It holds the address signals in between changes in the data bus (152), shown in FIG. 1B. The latchB (143) holds the output signals from the random access memory (111) in between signals change happening in the data bus (152), shown in FIG. 1B. Two lines (see second box (132)) are used because, in the example given, only four bytes are stored in the non-transitory computer storage medium (102) and on the random access memory (111). If there were more bytes, there would also be more lines.

The register (148) has cells ""A-E"" and each one is a one bit latch, like, latchA (210) and latchB (143).

The first group of inverters (147), the second group of inverters (151), the first inverter (105), the second inverter (139) inverts the signal before applying the signal to the intended input pin. If the signal is a low ""0"," the low signal is converted to a high signal ""1"," and vice-versa.

The AND gate (200) has two inputs, the first input (top) and the second input (bottom) and an output. The output of the AND gate (200) will be high "1" only if both inputs are high "1," if any of the input is a low "0," the output will be a low "0."

If a line ends with an arrow it means there are multiple lines. For example the first internal transport lines (124) has eight lines (see first box (114)); second internal transport lines (163) has two lines (see second box (132); third internal transport lines (142) have eight lines (see third box (144)); internal register lines (146) has the five lines (see the fourth box (154)).

The acronym "TCP/IP" stands for Transmission Control Protocol/Internet Protocol, which is a set of networking protocols that allows two or more computers to communicate. The Defense Data Network, part of the Department of Defense, developed TCP/IP, and it has been widely adopted as a networking standard.

The term "Raw Sockets" is used by Microsoft Windows Sockets to provide TCP/IP supports for the windows operating system.

The term "Socket" or "Network Socket" is an internal endpoint for sending or receiving data within a node on a computer network.

Kernel software driver, the Software Driver (168), is a software driver that works in the operating system level and effectively, it is part of the operating system. One example is an input and output driver which intercepts calls to read a file from a computer hard disk, to store a file in the computer hard disk and to create a file to the computer hard disk. A kernel driver may be provided by the operating system or be written and integrated into the operating system. The term kernel software driver is to be broadly interpreted to include other programs and or drivers working in sync with the kernel software driver, the Software Driver (168) as an example, an installer program passing files to the kernel software driver, the Software Driver (168), and to be encrypted by the kernel software driver, the Software Driver (168).

Encrypted Input List is a file with encrypted elements and the encrypted elements are decrypted by the kernel software driver, the Software Driver (168) deriving decrypted elements, then the software driver uses the decrypted elements to apply security in the computer.

Symmetric Encryption is the oldest and best-known technique. A secret key, which can be a number, a word, or just a string of random letters, is applied to the text of a message to change the content in a particular way. This might be as simple as shifting each letter by a number of places in the alphabet. As long as both sender and recipient know the secret key, they can encrypt and decrypt all messages that use this key. Any time the copy of the computer security key, the Copy-of-copy of first security key (171) is used in the explanations throughout the disclosure, even if not mentioned, it is to be interpreted that the algorithm in use is the symmetric encryption/decryption algorithm.

Asymmetric Encryption—the problem with secret keys is exchanging them over the Internet or a large network while preventing them from falling into the wrong hands. Anyone who knows the secret key can decrypt the message. One answer is asymmetric encryption, in which there are two related keys—a key pair. A public key is made freely available to anyone who might want to send you a message. A second, private key is kept secret, so that only you know it. Any message (text, binary files, or documents) that are encrypted by using the public key can only be decrypted by applying the same algorithm, but by using the matching private key. Any message that is encrypted by using the private key can only be decrypted by using the matching public key. This means that you do not have to worry about passing public keys over the Internet (the keys are supposed to be public). A problem with asymmetric encryption, however, is that it is slower than symmetric encryption. It requires far more processing power to both encrypt and decrypt the content of the message. Anytime the Asymmetric Encryption key (1410) which includes a Private Key (1410A) that is associated with Public Key (1410B) is used, even if not mentioned, it is to be interpreted that the algorithm in use is the asymmetric encryption/decryption algorithm.

If an element is present in multiple lines, it means that each line will have one of the elements. With references to FIG. 1 and FIG. 2, third internal transport lines (142) have eight lines (see third box (144)) and there is set2 (140) of eight tri-state gates and set3 (141) of eight tri-state gates, one for each line. The latchB (143) will have eight input lines and eight output lines. Internal register lines (146) has five lines (see the fourth box (154)) and set4 (145) of five tri-state gates, one for each line and there are five inverters for the first group of inverters (147), one for each tri-state gate of set4 (145). For the second internal transport lines (163) there are the two lines (see second box (132)) and there are the set5 (149) of two tri-state gates: one for each line. Each tri-state gate of set5 (149) will have one inverter of the second group of inverters (151). Also, there are two tri-state gates of the set1 (130), one for each line.

Figure 2:
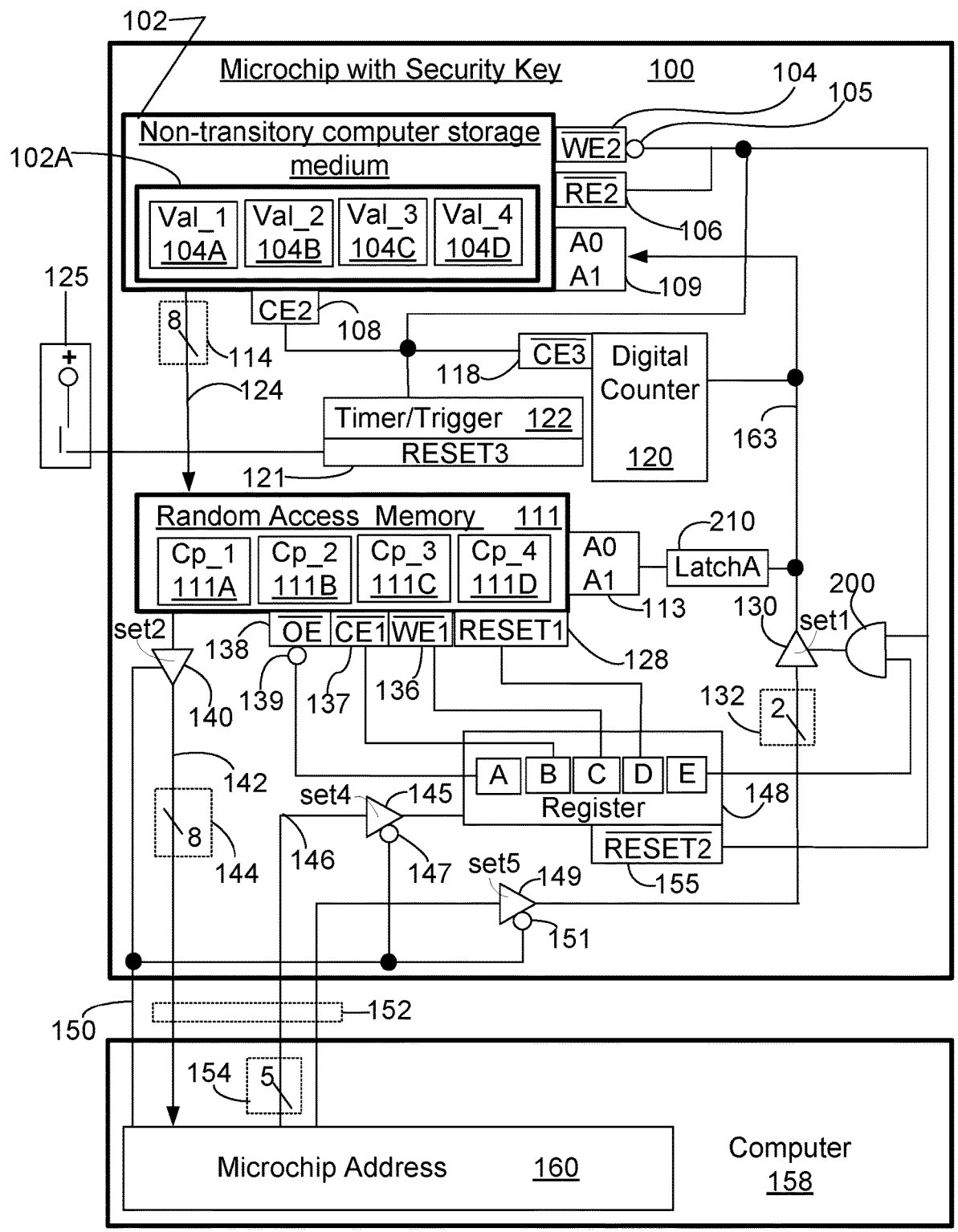
FIG. 2 is an alternative embodiment of the electronic circuitry of the microchip of FIG. 1.

FIG. 2 illustrates an AND gate (200) both inputs (see the first input, the top one and the second input, the bottom one) signals must be high for a high signal to be present at the output of the AND gate (200). If the first or the second input of the AND gate (200) is low, the output of the AND gate (200) is also low. The latchA (210) will have two inputs and two outputs, one for each of the two lines (see second box (132)) of the second internal transport lines (163). Also, the output of the AND gate (200) will be present at each of the two (namely, one for each line of second box (132)) tri-state gates of set1 (130).

If a line crosses another line without a solid sphere at the two intersecting lines it means that the two lines are not connected, if there is a solid sphere in the two intersecting lines it means that the two lines are connected and the same signal flows in the two lines and as an example there is a solid sphere between pin CE2 (108) and pin CE3 (118) and the same signal is present on both pins.

An inverter is a circle before a symbol, which means that the signal, which is applied at the input of the inverter, is reversed at the output of the inverter. As examples: If the signal before the inverter is a low, then a high signal would be present after the inverter; and If the signal before the inverter is high, then a low signal would be present after the inverter.

In FIG. 1, the dashed rectangle means that there are multiple lines being represented by a single line in the diagram. There are eight lines (see third box (144)) for the third internal transport lines (142). Internal register lines (146) and second internal transport lines (163) are part of a single group of lines, and in this example, they are part of the data bus (152) the computer, Computer (158) and the data bus (152) has eight lines (153) (FIG. 1B) but only seven lines (namely, the two lines (see second box (132))) for the second internal transport lines (163) and the five lines (see the fourth box (154)) for the internal register lines (146)) are used by the microchip with security key. And this case, one line from the eight lines (153) of the data bus (152) of the computer, Computer (158) will not be used by the microchip with security key. If dashed rectangle is not present, then it is a single line.

As an example, in FIG. 1B, the data bus (152) has eight lines (153). This may be represented by the following table and in binary representation of the bytes start from right to left. So, the first byte "1" is on the right of the table and the last byte "8" is the last byte on the left. The first row of the table represents the bytes-count and the second row of the table represents the binary signals, in the example, all binaries are of low signal which is represented by zeroes. Each column of the second row represents a line in the data bus (1521

| 8 | 7 | 6 | 5 | 4 | 3 | 2 | 1 |
|---|---|---|---|---|---|---|---|
| 0 | 0 | 0 | 0 | 0 | 0 | 0 | 0 |

In this example as indicated in FIG. 2, since the second internal transport lines (163) has the two lines (see second box (132)), the first two lines under the column "1" and "2" of the table will be used. Since the internal register lines (146) has the five lines (see the fourth box (154)), the lines "3," "4," "5," "6" and "7" under the column of the table will be used. The line under the column "8" of the table will not be used.

In FIG. 1 and FIG. 2, the second internal transport lines (163) are used as address lines for the bytes (Val_1 (104A), Val_2 (140B), Val_3 (104C) and Val_4 (104D)) of the non-transitory computer storage medium (102) and for the bytes (Cp_1 (111A), Cp_2 (111B), Cp_3 (111C) and Cp_4 (111D)) of random access memory (111) and only two lines (see second box (132)) are present, but it is done this way to simplify the explanation of the embodiment, since only four bytes are present on both the non-transitory computer storage medium (102) and the random access memory (111) and only two lines are need to address all the bytes because the two lines will provide four combinations: "00," "01," "10" and "11." The combination of "00" will address the byte Val_1 (104A) and the byte Cp_1 (111A). The combination of "01" will address the byte Val_2 (104B) and the byte Cp_2 (111B). The combination of "10" will address the byte Val_3 (104C) and the byte Cp_3 (111C). The combination of "11" will address the byte Val_4 (104D) and the byte Cp_4 (111D). Any number of lines may be present on the second internal transport lines (163) because the number of lines is dependent on the number of bytes to be addressed.

An acronym with an overbar means that the functionality designated by pin will be activate if a low signal is applied to the pin. The acronym without the overbar explains the pin's functionality is activated with a high signal. As an example, in FIG. 2, the chip labeled, CE2 (108), of the non-transitory computer storage medium (102) has an overbar. This overbar means that once a low signal is applied to the chip enable, CE2 (108), the non-transitory computer storage medium (102) is enabled turning on the internal circuitry of the non-transitory computer storage medium (102) and the non-transitory computer storage medium (102) will function normally.

If an acronym does not have an overbar, it means that the pin is activated with a high signal. In FIG. 2, as an example, the reset pin, RESET3 (121), of the timer/trigger (122) does not have an overbar and a high signal at the reset pin "RESET3" activates the timer/trigger (122) and it is reset. Here again, if there is no express statement that the acronym has an overbar, then this should be understood as intentional and refers to the acronym without the overbar and is activated with a high signal.

The term "microchip," as used herein, is defined broadly to include a single chip or a group of chips working together to accomplish the same or similar functionalities of the single chip. Also, the term "microchip" includes a single chip in the computer board, or a group of chips in the computer board, which accomplishes the same or similar functionality as the single chip.

The term "software driver" is intended to be broadly interpreted to include the "operating system."

File Metadata is descriptive information the operating system saves with the file and is used to identify the file, like: when the file was first created, when the file was last opened, the user who create the file, etc. Any kind of information may be added to a file's metadata.

An Application Programming Interface (API) is a program which other programs call to perform software routines. The Application Programming Interface returns to the calling program the result from the called software routine.

A child process occurs when a program is running and it launches another program, the program doing the launching is called the parent process, the program being launched is called the child process.

A checksum is an algorithm used to calculate all the bytes of a file or transmitted data using a mathematical formula. If a single byte of the file changes, that change will produce a different checksum. A checksum is used to identify if a file has or hasn't been changed after it was saved, or processed before a transmission. If used prior to a transmission, once the received file is checked against the checksum, if there is a match the received file is confirmed as being the same files as was transmitted, if not, a request for the re-transmission of the file is usually generated.

A web platform is a program which controls the execution of program files (executable code) stored in a website.

A binary is a program file (executable code) that has been converted into a binary format understood by the central processor unit.

A cross-site attack is a computer hack that occurs when a malicious website hosting malware, tricks the server of the victim website to download and then execute the malware from the malicious website.

The term "application programming interface" refers to a program which has programming routines accessed by other programs. As an example, the application programming interface (700) is illustrated and the Software Driver (168) is accessing the application programming interface (700) and using the application programming interface (700) programming routines. Any program can access an application programming interface (700).

Figure 9:
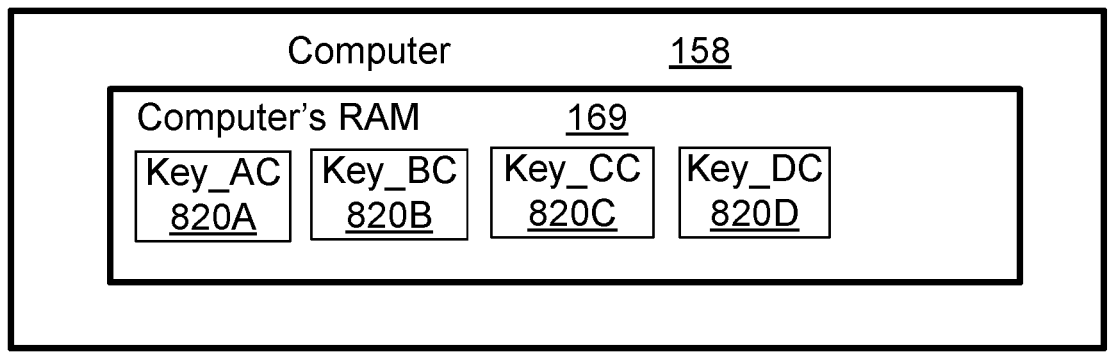
FIG. 9 illustrates the storing of the multiple keys of FIG. 8 in the random access memory of the computer.

The term "security key" includes any combination of one or more byte-values stored in memory. For example, the security key may be any key stored in the random access memory, computer's RAM (169) of the computer, Computer (158), as shown in FIG. 9. An example of a security key is a first security key, namely key_AC (820A), shown in FIG. 9, which may be a copy of val_1 (104A) and val_2 (104B) as shown in FIG. 1 in the non-transitory computer storage medium (102). Another example of a security key is a second security key, namely key_BC (820B), shown in FIG. 9, which may have val_3 (104C) and val_4 (104D), as shown in FIG. 1.

As an example, one of more security key/s may contain the Encrypted Input List (680) or contain input which is part of the Encrypted Input List (680). For instance, assuming that one input of the Encrypted Input List (680) was derived from Key_G (810G). Assuming further that the contents of Key_G (810G) was derived from the Key_7 (800G). The contents may be in the form of rules (e.g. 'AB04C83ADE') code. And the rules may be stored in the Encrypted Input List (680), or the rules may be used directly by the Software Driver (168) or may be used directly by the Operating System (174) to control the insertion of interrupts into the child process (720) or may be used as input to control the time-frame mechanism to enable and disable update to a website folder.

It is important to notice that the Encrypted Input List (680), is saved in the encrypted form. A utility program (not shown) or the Software Driver (168) can be used to manage the Encrypted Input List (680), in our example, the Software Driver (168) is responsible for managing the Encrypted Input List (680). Before the Software Driver (168), saves the Encrypted Input List (680) in the first non-transitory computer storage medium, Permanent Storage Medium (1240) of the computer, Computer (158), the Software Driver (168), using the copy of the computer security key, the Copy-of-copy of first security key (171) (FIG. 1B) encrypts the contents to be saved, then saves the encrypted contents in the Encrypted Input List (680) in the first non-transitory computer storage medium, Permanent Storage Medium (1240), of the computer, Computer (158).

Saving an encrypted input list is important for security reasons so as not to allow a non-authorized user, or a program, or hackers to change the rules/contents of the Encrypted Input List (680).

As an example, assuming that the code "AB" from the rules "AB04C83ADE" can be an instruction which the Software Driver (168), after decrypting the Encrypted Input List (680) deriving a decrypted input list, the Software Driver (168) uses from the decrypted input list to insert the interrupt (740) into the child process (720) before the CodeB (750). The instruction and the actual interrupt may be like: "AB:int 16h" (the insertion of interrupts will be explained later) and it means that the Software Driver (168), uses the instruction "AB" to mean "Insert an interrupt (740)" before the code "int 16h" (codeB (750)) of the child process (720).

Another example stored rule in the Encrypted Input List (680) can be like: "04:FolderNameA:10:00AM-11:00AM" and the Software Driver (168) then interpret it to mean that the "FolderNameA" can only be updated from "10:00AM" to "11:00AM." Once the Software Driver (168) receives from the Operating System (174) a request to update a file, add a file, change a file, etc., in the FolderNameA, the Software Driver (168) then verifies if the time is in between the set time of '10:00AM' to '11:00AM.' If it is, the operation/s are allowed, otherwise, denied. The rule can also be like: "04:FolderNameA:10:00AM-11:00AM:03/03/2020" and in this case, the Software Driver (168) will only do the controlled operations (request to update a file, add a file, change a file, etc.) to the folder between "10:00AM" and "11:00AM" on "03/03/2020." The locking of a file or folder will be explained later.

Figure 3:
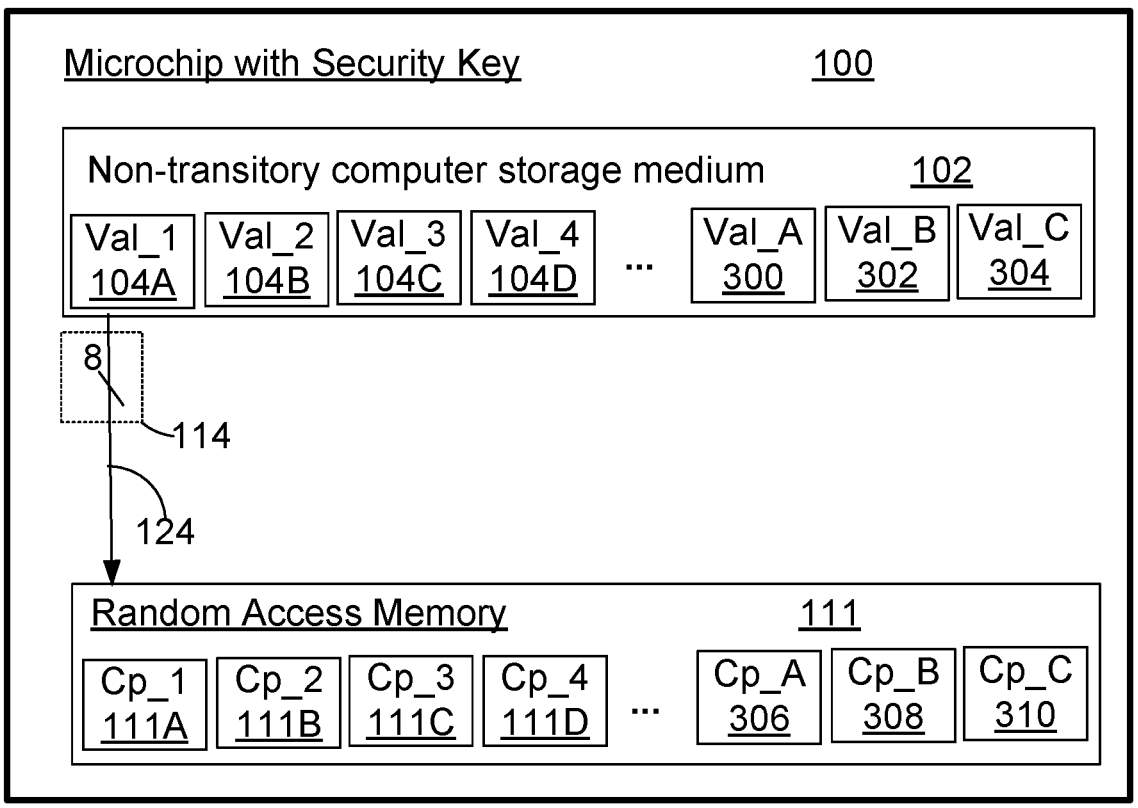
FIG. 3 illustrates multiple secure data stored in the electronic microchip.

As illustrated in FIG. 3, once the values of the cells Cp_1 (111A), Cp_2 (111B), Cp_3 (111C), and Cp_4 (111D) are transferred from the random access memory (111) of the microchip with security key to the random access memory, the computer's RAM (169) of the computer, Computer (158). Once these values are in the random access memory, the computer's RAM (169), the Software Driver (168) could process them into a first security key. The first security key is then stored in the random access memory, the computer's RAM (169) as new values. The new values are then referred to as the copy of the computer security key, the Copy-of-copy of first security key (171) which is the first security key, as shown in FIG. 1B In FIG. 1B, the stored value "AF" was derived from Cp_1 (111A), the stored value "4B" was derived from Cp_2 (111B). Similarly, the stored value "43" came from Cp_3 (111C), and the stored value "A2" came from Cp_4 (111D). The stored values are represented as hexadecimal values, but the actual values are in binary, zeros and ones. A hexadecimal format is a representation used by computer programmers to enable them to represent the binary value stored in the memory of the computer. The binary values from "0-9," are presented as hexadecimal from "0-9," no change. But the binary values from "10-15" are represented by hexadecimal values from "A-F," as in: binary "10" is "A" in hex, binary "11" is "B" in hex, binary "12" is "C" in hex, binary "13" is "D" in hex, binary "14" is "E" in hex, and binary "15" is "F" in hex.

FIG. 3, once the cells Cp_A (306), Cp_B (308) and Cp_C (310) are transferred from the random access memory (111) of the microchip with security key to the random access memory, the computer's RAM (169) and after the Software Driver (168), processes them into a second key, the result would be called copy of copy of the computer second security key, the copy-of-copy of second security key in a manner similar to the designation of the copy of copy of the computer security key, the Copy-of-copy of first security key (171) in FIG. 1B.

It is noted for clarity that there are three computers disclosed herein a: Computer (158), Server Computer (1230) and Certifying Server Computer (1400). The Server Computer (1230) is also referred to herein as the second computer. The Certifying Server Computer (1400) is also referred to herein as the third computer.

It is further noted for clarity that there are three non-transitory computer storage mediums: a non-transitory computer storage medium on the device (100). The device (100) is also referred to as a dongle; a first non-transitory computer storage medium, Permanent Storage Medium (1240), on the Computer (158), which would typically be a hard disk; and a second non-transitory computer storage medium, Certified Server Permanent Storage Medium (1470), which would also typically be a hard disk.

Overview of the Microchip with Security Key

Reference is made to FIG. 1 and FIG. 2 for the following explanation. The circuitry for the microchip with security key is describe herein and the microchip with security key comprises a non-transitory computer storage medium (102) holding a plurality of keys. For example, as shown in FIG. 2, the plurality of keys may be Val_1 (104A), Val_2 (104B), Val_3 (104C) and Val_4 (104D) and each of the values representing one byte of information.

The non-transitory computer storage medium (102) preferably is a flash memory but it could be a ROM (Read Only Memory), EPROM (Electrical Programmable Read Only Memory), or any medium which will store data permanently. In the examples used in this disclosure, such flash memory could be read from and written to.

The non-transitory computer storage medium (102) comprises a chip enable pin (108) represented by the acronym "CE2" with a bar on the top (overbar). The overbar means that the non-transitory computer storage medium (102) is enabled once a low signal (computers only understand a high signal (a value of one), or a low signal (a value of zero)) is applied to a pin and the non-transitory computer storage medium (102) functions normally. And if a high signal is applied to the chip enable pin, CE2 (108), the non-transitory computer storage medium (102) is disabled and for all technical purposes, the non-transitory computer storage medium (102) is turned off and not functional in the circuitry of the microchip with security key.

The non-transitory computer storage medium (102) also comprises a write enable pin, namely WE2 (104), shown by the acronym of "WE2" with an overbar. The overbar means the non-transitory computer storage medium (102) needs low signal to change or write values to the security key bytes, shown as Val_1 (104A), Val_2 (104B), Val_3 (104C) and Val_4 (104D) of the non-transitory computer storage medium (102). The signal values on the first internal transport lines (124), which functions as an internal data bus lines, are written in the bytes of the random access memory (111) (see Cp_1 (111A), Cp_2 (111B), Cp_3 (111C) and Cp_4 (111D) of FIG. 2. These bytes are a copy of the security key.

Preferably, the cells (Val_1 (104A), Val_2 (104B), Val_3 (104C) and Val_4 (104D)) of the non-transitory computer storage medium (102) are never written and never change. As illustrated, the output signal from the timer/trigger (122) is applied to the pin WE2 (104). At first, the output signal from the timer/trigger (122) is low, and after the low signal goes through the first inverter (105) the signal is turned to high. And with a high signal at the pin WE2 (104), nothing happens because as indicated by the overbar, pin WE2 (104) needs a low signal for its operation. The output signal of the timer/trigger is also applied to the CE2 (108). After the timer/trigger (122) time-threshold happens, the timer/trigger (122) signal goes high. And as indicated by the overbar, the pin CE2 (108) needs a low signal for its operation. With a high signal, the functionality of the pin CE2 (108) is disabled, turning off the non-transitory computer storage medium (102). Alternatively, the pin WE2 (104) could technically be tied to a high signal and, then it would function the same say as is shown in FIG. 1 and FIG. 2.

In FIG. 2, the write pin, WE2 (104), is located in the circuit after a circle, which indicates a first inverter (105), means that the signal going to the WE2 (104) is inverted before it is applied to the WE2 (104). Thus, if the signal in line is a low value (zero), then the signal is inverted to a high value (one) and then applied to the WE2 (104). Or, if the signal is of a high value (one), then the signal is inverted to a low value (zero) before being applied to the WE2 (104). Any circle before a symbol, means that the signal is inverted, that is, if the signal has a low value once it arrives at the first inverter (105) (see the circle symbol), then the signal is inverted to a high value after the circle symbol, and vice-versa.

The non-transitory computer storage medium (102) also comprises the read enable pin (106) with the acronym of "RE2" with an overbar and the overbar means that a low signal (zero) applied to the read enable pin (106) will enable the non-transitory computer storage medium (102) to read the stored values in bytes Val_1 (104A), Val_2 (104B), Val_3 (104C) and Val_4 (104D), the security key, one or more at a time, and make them available at an output of the first internal transport lines (124). In FIG. 2, four bytes are illustrated tom a security key, but it could have any number representing one or more security keys, and this will be explained, infra, with the discussion of FIG. 3.

The microchip with security key also comprises a digital counter (120) and the digital counter (120) comprises a chip enable pin, CE3 (118) and an overbar. The overbar means that once a low signal (zero value) is placed on the chip enable pin, CE3 (118), the low signal enables the digital counter (120) to perform as normal, if the signal is high (a value of one) the digital counter (120) is turned off, which means that power is removed from the internals of the digital counter (120). Once a low signal is applied to the chip enable pin CE3 (118), the digital counter (120) turns on and start counting, going from zero to the digital counter (120) full range. The range of the digital counter (120) is used to address each of the bytes of the non-transitory computer storage medium (102) (these bytes designated at Val_1 (104A), Val_2 (104B), Val_3 (104C) and Val_4 (104D) in FIG. 2) and each of the bytes of the random access memory (111) (these bytes designated at Cp_1 (111A), Cp_2 (111B), Cp_3 (111C) and Cp_4 (111D) in FIG. 2).

Assuming a digital counter is eight bits, then it will count from zero to two-hundred fifty-five and back to zero again. A digital counter (120) could have any range. For the digital counter (120) used as an example herein, there are only two bits assumed and this is indicated by the number "2," and referred to as the two bits, (namely, the two lines (see second box (132)) in the second internal transport lines (163)), shown in FIG. 2.

The microchip with security key also includes a random access memory (111). The random access memory (111) includes temporary storage bytes shown in FIG. 2 as Cp_1 (111A), Cp_2 (111B), Cp_3 (111C) and Cp_4 (111D). The temporary storage bytes are used to temporarily store a copy of security key which in the example, include four bytes illustrated in FIG. 2. The temporary storage bytes could have any number of bytes. Preferably, the same number of bytes is present in the non-transitory computer storage medium (102) and the random access memory (111), since each byte of the non-transitory computer storage medium (102) is preferably transferred to the random access memory (111).

As an example, if two signals are present on the second internal transport lines (163) and these two signals represent the binary value of "00" (low, low) (columns "1" and "2" of bottom-row (186) FIG. 1A and illustrated at row "3" of left-column (184)), byte Val_1 (104A) from the non-transitory computer storage medium (102) is transferred to byte Cp_1 (111A) of random access memory (111) via the eight bits of the first internal transport lines (124), also referred to as eight lines (see first box (114)).

If the two signals present on the second internal transport lines (163) represent the binary value of "01" (low, high) (columns "1" and "2" of the FIG. 1A bottom-row (186) and illustrated at row "5" of left-column (184)), byte Val_2 (104B) from the non-transitory computer storage medium (102) is transferred to byte Cp_2 (111B) of random access memory (111) via the eight bits of the first internal transport lines (124), also referred to as eight lines (see first box (114)).

If the two signals present on the second internal transport lines (163) represent the binary value of "10" (high, low)

(columns "1" and "2" of FIG. 1A bottom-row (186) and illustrated at row "7" of left-column (184)), byte Val_3 (104C) from the non-transitory computer storage medium (102) is transferred to byte Cp_3 (111C) of random access memory (111) via the eight bits of the first internal transport lines (124), also referred to as eight lines (see first box (114)).

If the two signals present on the second internal transport lines (163) represent the binary value of "11" (high, high) (columns "1" and "2" of FIG. 1A bottom-row (186) and illustrated at row "9" of left-column (184)), byte Val_4 (104D) from the non-transitory computer storage medium (102) is transferred to byte Cp_4 (111D) of random access memory (111) via the eight bits of the first internal transport lines (124), also referred to as eight lines (see first box (114)).

The random access memory (111) also includes an output enable pin, designated OE (138) with an overbar. The overbar means that once a low signal is applied to OE (138) of the random access memory (111) the signals of the selected byte of the random access memory (111) are transferred to eight lines (see third box (144)) of the third internal transport lines (142). The output enable pin, OE (138), has a second inverter (139) to invert the received signal, if the signal is a low, the low signal is turned into a high then the high signal is applied to the output enable pin, OE (138). If the signal is high, the high signal is turned into low then the low signal is applied to the output enable pin, OE (138).

The random access memory (111) also comprises a write enable pin, WE1 (136) with an overbar, and if a low signal is present in the write enable pin, WE1 (136), the signals present in the eight lines (see first box (114)) of the first internal transport lines (124) are written, that is saved, in the byte of the random access memory (111) addressed by the values in the two lines (see second box (132)) of the second internal transport lines (163). If a high signal is applied at the write enable pin, WE1 (136), the random access memory (111) does not write any signal to the addressed byte.

The random access memory (111) also comprises a chip select pin, designate CE1 (137) with an overbar and it means if a low signal is applied to the chip enable pin, CE1 (137), the random access memory (111) will work normally, if a high signal is applied to the chip enable, CE1 (137), the random access memory (111) will be tuned off and effectively, the random access memory (111) will not present in the microchip with security key.

The random access memory (111) also comprises a reset pin, RESET1 (128), without an overbar, and if a low signal is present in the reset pin, RESET1 (128), the random access memory (111) works normally, but if a high signal is applied at the reset pin, RESET1 (128), then the random access memory (111) will clear the stored values in the bytes Cp_1 (111A), Cp_2 (111B), Cp_3 (111C) and Cp_4 (111D).

The microchip with security key also comprises a register (148) and the register (148) comprise five one-bit cells and they are: "A," "B," "C," "D" and "E." Each cell ("A," "B," "C," "D" and "E") of the register (148) holds the stored signal in a latched state (stay as is until the input signals from the five lines (see the fourth box (154)) change), if the input signals from the five lines (see the fourth box (154)) are removed, the five one-bit cells ("A," "B," "C," "D" and "E") retains their prior signals.

The signal of the cell "A" of the register (148) is supplied to the second inverter (139) of the output enable pin, OE (138). The signal of the cell "B" is supplied to chip enable pin, CE1 (137). The signal of cell "C" is supplied to the write enable pin, WE1 (136). The signal of cell "D" is supplied to the reset pin, RESET1 (128). In the embodiment of FIG. 1, the signal of cell "E" is supplied to a second tri-state gate of the set3 (141) of eight tri-state gates. For the embodiment of FIG. 2, the signal of cell "E" is supplied to the second input (lower input) of the AND gate (200). Each cell stores (latches) on signal, also called a bit.

The register (148) also comprises a reset pin, RESET2 (155), with an overbar. If a low signal is applied to the reset pin, RESET2 (155), then the cells "A," "B," "C," "D" and "E" are cleared, that is, a low signal is stored in each one. If a high signal is present at the reset pin, RESET2 (155), the register (148) functions normally.

Any tri-state gate in the set3 (141), shown in FIG. 1, of eight tri-state gates is digital electronic circuitry which works as a mechanical switch like a light bulb switch. Thus, the switch will either be on or off. If a high signal is applied to the tri-state gate in the set3 (141), the signal will flow though, if a low signal is applied, the signal will not flow. In the exemplary explanation only one tri-state gate is shown, but there is one for each line of the third internal transport lines (142) and in the example, the third internal transport lines (142) have eight lines (see third box (144)), thus, there are set3 (141) of eight tri-state gates acting as switches.

The microchip with security key also comprises a timer/trigger (122), which at the power-up of the computer, Computer (158), supplies a low signal on its output and the low signal is present at chip enable pin, CE2 (108), and the non-transitory computer storage medium (102) is enabled.

The timer/trigger (122) output low signal is present at the read enable pin, RE2 (106), and at the first inverter (105) connected to the write enable pin, WE2 (104), of the non-transitory computer storage medium (102). The low signal at the read enable pin, RE2 (106), enables the byte stored in the non-transitory computer storage medium (102) to be placed in the eight lines (see first box (114)) of the first internal transport lines (124). The low signal at the first inverter (105) is inverted to a high signal and the high signal is applied to the write enable pin, WE2 (104), and it will not affect the operation of the non-transitory computer storage medium (102).

The timer/trigger (122) low signal is present at the chip enable pin, CE3 (118), of the digital counter (120) which enables the digital counter (120) and the digital counter (120) starts counting, going from "00" to the "11" the back to "00," two-bits counter with two lines as indicated by the two lines (see second box (132)) of the second internal transport lines (163).

The timer/trigger (122) low signal is also present at two tri-state gates of the set1 (130), one tri-state gate for each line and there are two lines (see second box (132)) in the second internal transport lines (163). Two tri-state gates of the set1 (130) are turned off and are, effectively, not present in the circuitry of the microchip with security key.

After a preset time-threshold, the timer/trigger (122) output turns high and the high signal is present at chip enable pin, CE2 (108), and non-transitory computer storage medium (102) is disabled and effectively, the non-transitory computer storage medium (102) is not present in the microchip with security key.

The timer/trigger (122) high signal is present at the chip enable pin, CE3 (118), of the digital counter (120) which disables the digital counter (120) and effectively, the digital counter (120) is not present in the microchip with security key.

The timer/trigger (122) high signal is also present at two tri-state gates of the set1 (130). The two tri-state gates of the set1 (130) are enabled. Thus, signals present on the two lines (see second box (132)) of the second internal transport lines (163) will flow through the two tri-state gates of the set1 (130).

If a reset is initiated through a reset switch/button (125), which once closed, a high signal is applied to the reset pin, RESET3 (121), of the timer/trigger (122) and the timer/trigger (122) is re-initialized. The output of the timer/trigger (122) is set to a low signal then the non-transitory computer storage medium (102) and the digital counter (120) are enabled again, and both function normally until the preset time threshold happens and the timer/trigger (122) output is set to high again.

The circuitry of the non-transitory computer storage medium (102), the circuitry of the timer/trigger (122), the circuitry of the random access memory (111), the circuitry of the digital counter (120) and the circuitry of the register (148) are not shown because they are computer chips common in use in the computer industry.

It is important to notice that the microchip with security key of FIG. 1 and FIG. 2 is not necessary for the operation of a computer (e.g. the computer, Computer (158)). Once the device is attached a computer (e.g. the computer, Computer (158)), the computer (e.g. the computer, Computer (158)) will have improved security to stop hacking and the execution of computer malwares and computer virus, which, if the microchip with security key were not present, then such security would not be available to the computer (e.g. the computer, Computer (158)).

Functionality of the Microchip with Security Key

The following explanation of a preferred embodiment applies to FIG. 1, FIG. 1A, FIG. 1B, FIG. 2, and FIG. 3. The circuitry drawings of FIG. 1 and FIG. 2, have a similar explanation, except that minor variations not present on FIG. 1 and present in FIG. 2 are addressed separately for FIG. 2.

In this preferred embodiment, as the computer, Computer (158) is turned on or the reset switch/button (125) is pressed a few things happen.

First: The timer/trigger (122) is initialized and in turns initializes the digital counter (120). As the digital counter (120) counts, going from zero (00) to three (11), the bytes values from the non-transitory computer storage medium (102), one-by-one is transferred to the random access memory (111).

Second: After the time-threshold of the timer/trigger (122) has elapsed, the timer/trigger (122) output goes high (one) turning on the set1 (130) of the two tri-state gates of the set1 (130), one for each line (i.e., each of the two lines (see second box (132)) of the second internal transport lines (163)), enabling signals to flow through.

Third: After the Software Driver (168) is loaded into the random access memory, the computer's RAM (169) of the computer, Computer (158), the central processing unit (162) while executing the code of the Software Driver (168), the central processing unit (162) sends a signal through the address bus (164) to the microchip address (160). The signal at the address bus (164) of the central processing unit (162) is a signal for the address of the microchip address (160). The microchip address (160) is a physical address of the microchip with security key at the motherboard of the computer, Computer (158), or an address of a computer board, if implemented as components soldered in a computer board. The microchip address (160) or the computer board is connected to the central processing unit (162). The address bus (164) could be of any number of lines and each line represents one bit, which is represented as a high signal (the value of one) or a low signal (the value of zero).

Fifth: The central processing unit (162) then places signals on the eight lines (153) data bus (152) to activate the register (148) and to address a memory cell (byte) of the random access memory (111).

Sixth: The central processing unit (162) places a signal at the read/write line (150). If the signal at the read/write line (150) is high (the value of one), then the set2 (140) of eight tri-state gates of the eight lines (see third box (144)) close, which is similar to what happens when a wall switch is flipped to turn off a light bulb. Then, a signal flows from the random access memory (111) to the central processing unit (162) through the set2 (140) of eight tri-state gates in the eight lines (see third box (144)), and further through the microchip address (160) of the microchip with security key.

Assuming that values of the row #3 of the left-column (184) FIG. 1A is placed in the data bus (152), the signals from the byte Cp_1 (111A) is addressed and ready to be transferred to the central processing unit (162).

The central processing unit (162) then receives the byte (a byte is made of eight bits, eight signals or eight values of zero or one) from the random access memory (111)—in this example, the signals are from the byte Cp_1 (111A).

If the signal at the read/write line (150) is a low signal (the value of zero), the set2 (140) of eight tri-state gates turns off to effectively become an open line to stop signal flow from the random access memory (111) to the eight lines (see third box (144)) of the third internal transport lines (142). The third internal transport lines (142) of the microchip with security key could have any number of lines and each line represents a bit value of a low signal (the value of zero) or a high signal (the value of one).

In the explanation of this preferred embodiment, the eight-bits, namely the eight (see third box (144)) lines, of the third internal transport lines (142) of the microchip with security key is of the eight lines (see third box (144)) and a byte value of eight bits are transferred from the random access memory (111) to the central processing unit (162).

Once the first location the random access memory (111) is accessed, the location zero (represented by the binary "00" present on the two (see second box (132)) lines of the second internal transport line (163)), the byte-value stored in the byte Cp_1 (111A) is transferred.

Once the second location is accessed (represented by the binary "01" present on the two (see second box (132)) lines of the second internal transport line (163)), the byte-value stored in the Cp_2 (111B) is transferred.

Once the third location (represented by the binary "10" present on the two (see second box (132)) lines of the second internal transport line (163)), is accessed the byte-value stored in the Cp_3 (111C) is transferred.

Once the fourth location (represented by the binary "11" present on the two (see second box (132)) lines of the second internal transport line (163)), is accessed the byte-value stored in the Cp_4 (111D) is transferred.

In the explanation of this preferred embodiment, there are eight-bits for the third internal transport lines (142) for the microchip with security key and one byte-value (eight bits) is transferred from the byte Cp_1 (111A) from the random access memory (111) to the central processing unit (162).

If the third internal transport lines (142) of the microchip with security key were of sixteen bits, then the bytes Cp_1 (111A) and (Cp_2 (111B) would be transferred at once from the random access memory (111) to the central processing unit (162).

If the third internal transport lines (142) of the microchip with security key were thirty-two bits, then all four bytes Cp_1 (111A), Cp_2 (111B), Cp_3 (111C) and Cp_4 (111D)

would be transferred from the random access memory (111) to the central processing unit (162).

At FIG. 1 and FIG. 2 only four bytes-value bytes Val_1 (104A), Val_2 (104B), Val_3 (104C) and Val_4 (104D) (security key) are illustrated for the non-transitory computer storage medium (102) and four byte-value bytes Cp_1 (111A), Cp_2 (111B), Cp_3 (111C) and Cp_4 (111D) (copy of security key). As illustrated in FIG. 3 any number of bytes could be present for the non-transitory computer storage medium (102) and the random access memory (111).

As an example (FIG. 3), the non-transitory computer storage medium (102) has seven bytes: Val_1 (104A), Val_2 (104B), Val_3 (104C) and Val_4 (104D). These four bytes represent the security key (a first security key). The non-transitory computer storage medium (102) also has the byte Val_A (300), the byte Val_B (302) and the byte Val_C (304) representing another security key (a second security key).

The random access memory (111) has seven bytes: Cp_1 (111A), Cp_2 (111B), Cp_3 (111C) and Cp_4 (111D) representing a copy of the security key (a copy of the first security key). The random access memory (111) also has the bytes Cp_A (306), Cp_B (308) and Cp_C (310) representing copy of another security key (a copy of the second security key).

Once the first security key and the second security key are transferred from random access memory (111) and stored in the random access memory, the computer's RAM (169) they are called the copy of copy of the computer security key, the Copy-of-copy of first security key (171) and the copy of copy of the computer second security key, copy-of-copy of second security key (not shown).

In reference to FIG. 3, the byte-value of each security key byte from the non-transitory computer storage medium (102) is transferred to the corresponding byte of the random access memory (111) through the eight bits (see first box (114)) of the first internal transport lines (124) of the device (100), i.e. of the microchip with the security key.

Byte-value of byte Val_1 (104A) of the non-transitory computer storage medium is transferred to byte Cp_1 (111A) of the random access memory (111).

The byte Val_2 (104B) of the non-transitory computer storage medium (102) is transferred to byte Cp_2 (111B) of the random access memory (111).

The byte Val_3 (104C) of the non-transitory computer storage medium (102) is transferred to byte Cp_3 (111C) of the random access memory (111).

The byte Val_4 (104D) of the non-transitory computer storage medium (102) is transferred to byte Cp_4 (111D) of the random access memory (111).

The byte Val_A (300) of the non-transitory computer storage medium (102) is transferred to byte Cp_A (306) of the random access memory (111).

The byte Val_B (302) of the non-transitory computer storage medium (102) is transferred to byte Cp_B (308) of the random access memory (111).

The byte Val_C (304) of the non-transitory computer storage medium (102) is transferred to byte Cp_C (310) of the random access memory (111).

As illustrated in the embodiment of FIG. 3, two security keys are present. There may be an unlimited number of bytes forming an unlimited number of security keys for the non-transitory computer storage medium (102) and for the random access memory (111). When the central processing unit (162) executes (see the first single-headed arrow line (166)) the Software Driver (168), then the Software Driver (168) requests and receives (see the second single-headed arrow line (170) and the third single-headed arrow line (172)) through the central processing unit (162), the byte-values transferred from the random access memory (111) through the data bus (152) to the central processing unit (162) of the computer, Computer (158).

The central processing unit (162) then makes the received byte signals available (see the second single-headed arrow line (170) and the third single-headed arrow line (172)) to the Software Driver (168) by storing (see the second single-headed arrow line (170)) the received byte-values into the random access memory, the computer's RAM (169).

Then, the Software Driver (168) retrieves (see the third single-headed arrow line (172)) the byte-values from the random access memory, the computer's RAM (169) and then assembles the retrieved byte-values into a key pair according to the preset programming requirements of the Software Driver (168).

The Software Driver (168) assembles (see the third single-headed arrow line (172)) the byte-values of bytes Cp_1 (111A) and Cp_2 (111B) and Cp_3 (111C) and Cp_4 (111D) into the first security key.

The Software Driver (168) also assembles (see the third single-headed arrow line (172)) the bytes Cp_A (306) and Cp_B (308) and Cp_C (310) into the second security key (not shown in the random access memory, the computer's RAM (169)).

After the Software Driver (168) has assembled (see the third single-headed arrow line (172)) the received byte-values into security keys, the Software Driver (168) uses the security keys as need to perform any necessary operation. For example, the Software Driver (168) will use one key for encryption and decryption of data in the computer, Computer (158) and supply the other security key to the Operating System (174) running in the computer, Computer (158). Alternatively, the Software Driver (168) will use the security keys for any purpose whatsoever as need by the computer, Computer (158).

As illustrated at FIG. 1B, the eight bits (see third box (144)) of the third internal transport lines (142) are connected to the data bus (152) of the central processing unit (162) of the computer, Computer (158). Any signal placed on the third internal transport lines (142) will be available to the central processing unit (162) and the central processing unit (162) makes them available (see the second single-headed arrow line (170) and the third single-headed arrow line (172)) to the Software Driver (168).

There are two phases in the functionality of the microchip with security key. The first phase occurs when the microchip with security key is first turned on, or first reset by a reset switch/button (125), or reset by a software running in the computer, Computer (158). In the first phase, the byte-values are transferred from the non-transitory computer storage medium (102) to the random access memory (111) through the eight lines (see first box (114)) of the first internal transport lines (124).

The second phase occurs after the first phase and once the central processing unit (162) executes (see the first single-headed arrow line (166)) the Software Driver (168) in the computer, Computer (158).

The First Phase

The first phase involves the transfer of the signals from bytes (Val_1 (104A), Val_2 (104B), Val_3 (104C) and Val_4 (104D)) from the non-transitory computer storage medium (102) to the bytes (Cp_1 (111A), Cp_2 (111B), Cp_3 (111C) and Cp_4 (111D)) of the random access memory (111). The first phase is best understood with reference to FIG. 1 and FIG. 2. The only change from FIG. 1 to FIG. 2 is that at FIG. 1 the output signal from timer/trigger (122) is applied to two tri-state gates of the set1 (130), one for each line (i.e., each of the two lines (see second box (132)) of the second internal transport lines (163)). And at FIG. 2, the output signal from timer/trigger (122) is applied to the first input (top input) of the AND gate (200). All the other operations for phase one are the same for the embodiment of FIG. 1 and the embodiment of FIG. 2.

If the reset switch/button (125) is pressed a high signal (the value of one) is applied to the reset pin, RESET3 (121), of the timer/trigger (122) and the timer/trigger (122) is initiated, the same process happens at the power-up of the computer, Computer (158).

At the power-up of the computer, Computer (158) the circuitry of the timer/trigger (122) is initiated and the timer/trigger (122) initially places a low signal (the value of zero) at output, and the low signal is also applied to the chip select line, CE2 (108), of the non-transitory computer storage medium (102) and the non-transitory computer storage medium (102) becomes ready for operation, this is indicated by the overbar on the chip select line, CE2 (108). Also, the low signal at the output of timer/trigger (122) is applied to the chip select line, CE3 (118), of the digital counter (120) and the digital counter (120) is enabled and ready for operation, indicated by the overbar over the, CE3 (118).

The low output signal of the timer/trigger (122) is also applied to the inverter, indicated by the circle, which indicates a first inverter (105). The first inverter (105) inverts the low output signal of the timer/trigger (122) to a high signal, and the high signal is applied to the write enable pin, WE2 (104). The high signal disables the functionality of the write enable pin WE2 (104), as indicated by the overbar over the, WE2 (104). In this example, a low signal enables the functionality of write enable pin, WE2 (104), but since a high signal is present, the functionality of write enable pin, WE2 (104), is disabled.

The low output signal of the timer/trigger (122) is also applied to the read enable pin, RE2 (106), of the non-transitory computer storage medium (102). With a low signal applied at the read enable, RE2 (106), the read enable, RE2 (106), as indicated with the overbar over, RE2 (106).

With the write enable, WE2 (104), disabled and the read enable, RE2 (106), enabled, the non-transitory computer storage medium (102) reads the byte-value of the byte addressed by the second internal transport lines (163). That is, the signals of all eight bits (a byte) of the addressed byte will be available to the eight lines (see first box (114)) of the first internal transport lines (124) of the microchip with security key.

As the digital counter (120) counts from zero (00) to three (11), the two output lines of the digital counter (120) are present at the two lines (see second box (132)) of the second internal transport lines (163). And as the digital counter (120) counts from zero (00) to three (11), the bytes (Val_1 (104A), Val_2 (104B), Val_3 (104C) and Val_4 (104D)) of the non-transitory computer storage medium (102) are addressed, and also the bytes (Cp_1 (111A), Cp_2 (111B), Cp_3 (111C) and Cp_4 (111D)) of the random access memory (111) are addressed. And the addressed byte from the non-transitory computer storage medium (102) is transferred from the non-transitory computer storage medium (102) to the random access memory (111) through the eight lines (see first box (114)) of the first internal transport line (124).

Once the output of the digital counter (120) has the value of zero (00) the byte signal-value from Val_1 (104A) is transferred to the byte Cp_1 (111A).

Once the output of the digital counter (120) has the value of one (01) the byte signal-value from Val_2 (104B) is transferred to the byte Cp_2 (111B).

Once the output of the digital counter (120) has the value of two (10) the byte signal-value from Val_3 (104C) is transferred to the byte Cp_3 (111C).

Once the output of the digital counter (120) has the value of three (11) the byte signal-value from Val_4 (104D) is transferred to the byte Cp_4 (111D).

The low output signal from timer/trigger (122) is also present at the first input of the AND gate (200) (the top input) and also present at the reset pin, RESET2 (155), of the register (148). Since the reset pin, RESET2 (155), of the register (148) is functional with a low signal (as indicated by the overbar), the register (148) sets its internal bits cells "A," "B," "C," "D" and "E" to low signal.

For the embodiment of FIG. 2, the low signal present at the cell "E" of the register (148) will be present at the second input (the bottom input) of the AND gate (200). Since the AND gate (200) needs to have the first input and the second input with high signal in each for its output to have a high signal, and since the first input and the second input have a low signal, then the output of the AND gate (200) has a low signal. A low signal from the output of the AND gate (200) is applied to the tri-state gates of the set1 (130) and since the tri-state gates of set1 (130) only functions, that is, closes, with a high signal, the tri-state gates of set1 (130) are disabled and any signal present on the two lines (see second box (132)) of the second internal transport lines (163) of the microchip with security key will not be present on the input of the latchA (210). For all effective purposes, the tri-state gates of the set1 (130) are not present in the circuitry of the microchip with security key.

For the embodiment of FIG. 1, the low signal present at the cell "E" of the register (148) will be present at the tri-state gate of the set3 (141) of eight tri-state gates, one for each of the eight lines (see third box (144)) of the third internal transport lines (142). The low signal disables the tri-state gates of the set3 (141) and for all purposes, the tri-state gates of the set3 (141) are disconnected from the circuitry of the microchip with security key.

The low signal present in the cell "D" of the register (148) is applied to the reset pin, RESET1 (128), of the random access memory (111) but since the reset pin, RESET1 (128), requires a high signal (as indicate by the lack of the overbar), the random access memory (111) does not reset and works normally.

The low signal present in the cell "C" of the register (148) is applied to the write enable pin, WE1 (136) and since the write enable pin, WE1 (136) requires a low signal as indicated by the overbar, the low signal enables the random access memory (111) to write the signals present in the eight lines (see first box (114)) of the first internal transport lines (124) into the byte addressed by the output signals of the digital counter (120) and latched by the latchA (210) of FIG. 2.

The low signal present in the cell "B" of the register (148) is applied to chip an enable pin, CE1 (137), and since the chip enable pin, CE1 (137), is activated by a low signal as indicated by the overbar, the random access memory (111) is enabled and functions normally.

The low signal present in the cell "A" of the register (148) is applied to the second inverter (139) before the output enable pin, OE (138). The low signal at the second inverter (139) and is inverted to a high signal and the high signal is applied to the enable pin, OE (138). And since the output enable pin, namely, OE (138), is activated only with a low signal as indicated by the overbar, the output of the random access memory (111) is disabled and no signal will flow to the eight tri-state gates of the set3 (141) of FIG. 1. And on preferred arrangement of FIG. 2, no signal will flow to the inputs of the eight tri-states gates of set2 (140).

And for the embodiment of FIG. 1 the low signal at the write enable pin, WE1 (136), enables the random access memory (111) to write the signals present in the eight lines (see first box (114)) of the first internal transport lines (124) into the byte addressed by the signal values present at the output of the digital counter (120) which are applied to the second internal transport lines (163) which in turn are present in the memory address pins (109), namely at A0-A1, of the non-transitory computer storage medium (102). With a low signal applied to the read enable pin, RE2 (106), the non-transitory computer storage medium (102) is ready. Then the non-transitory computer storage medium (102) places the byte addressed by the two signals in the two lines (see second box (132)) of the second internal transport lines (163) in the eight lines (see first box (114)) of the first internal transport lines (124).

The low signal from the output of timer/trigger (122) is also present in the chip enable pin, CE3 (118) of the digital counter (120). Since a low signal at the chip enable pin, CE3 (118), enables the digital counter (120) as indicated by the overbar, the digital counter is enabled and starts functioning normally.

The digital counters (120) have a clock signal (not shown) and the clock continually goes from one state to another: For example, from low to high, from high to low, from low to high, from high to low, etc. The clock signal is applied to digital counter (120) and once the signal changes, going from one state to another (a clock cycle), as an example, going from a high to a low, the digital counter increments its output. For instance, at the very beginning the digital counter (120) starts with the first value "00" (zero), as the next cycle happens the digital counter (120) increments to "01" (one)), as the next cycle happens the digital counter (120) increments to "10" (two)), as the next cycle happens the digital counter (120) increments to "11" (three)), as the next cycle happens the digital counter (120) resets to "00" (zero) and the counting proceeds incrementing until the next reset, and on and on.

If the output signals of "00" (zero) from the digital counter (120) present at the input address pins (113), namely at "A0-A1" of the random access memory (111) and present at the memory address pins (109), namely at "A0-A1" of the non-transitory computer storage medium (102), then the signals of the byte Val_1 (104A) of the non-transitory computer storage medium (102) is (transferred) via the eight lines (see first box (114)) of the first internal transport lines (124) into the random access memory (111) and written to Cp_1 (111A).

If the output signals of "01" (one) from the digital counter (120) present at the address pins, A0-A1 (113) of the random access memory (111) and present at the memory address pins (109), namely "A0-A1" of the non-transitory computer storage medium (102), then the signals of the byte Val_2 (104B) of the non-transitory computer storage medium (102) are (transferred) via the eight lines (see first box (114)) of the first internal transport lines (124) into the random access memory (111) and written to Cp_2 (111B).

If the output signals of "10" (two) from the digital counter (120) present at the input address pins (113), namely "A0-A1" of the random access memory (111) and present at the memory address pins (109), namely at "A0-A1" of the non-transitory computer storage medium (102) then the signals of the byte Val_3 (104C) of the non-transitory computer storage medium (102) are (transferred) via the eight lines (see first box (114)) of the first internal transport lines (124) into the random access memory (111) and written to Cp_3 (111C).

If the output signals of "11" (three) from the digital counter (120) present at the input address pins (113), namely at "A0-A1" of the random access memory (111) and present at the memory address pins (109), namely at "A0-A1" of the non-transitory computer storage medium (102) then the signals of the byte Val_4 (104D) of the non-transitory computer storage medium (102) are (transferred) via the eight lines (see first box (114)) of the first internal transport lines (124) into the random access memory (111) and written to Cp_4 (111D).

The output of the timer/trigger (122) stays in the low state for a short period of time while it prepares to shoot and change the output to the rest state, in the provided example, the rest state is high, that is, at the start, the timer/trigger (122) starts with a low signal at the output and the low signal is applied to the chip enable pin, CE2 (108), of the non-transitory computer storage medium (102) and other parts of the microchip with security key. Once the timer/trigger (122) reaches the rest state, the output of the timer/trigger (122) changes from a low signal to a high one. In the provided example, the low signal will be set long enough for all four bytes of the non-transitory computer storage medium (102) to be transferred to the appropriated bytes of the random access memory (111).

Once the output signal of the timer/trigger (122) becomes high and a high signal is applied to the chip enable pin, CE2 (108), of the non-transitory computer storage medium (102), the non-transitory computer storage medium (102) is disabled. The overbar means that a low signal enables, therefore, a high signal disables the non-transitory computer storage medium (102). Once the non-transitory computer storage medium (102) is disabled, it is like the non-transitory computer storage medium (102) is not part of the microchip with security key.

Also, the same high signal from the output of the timer/trigger (122) is applied to the chip enable pin, CE3 (118), of the digital counter (120), and since a low signal as indicated by the overbar enables the digital counter (120), a high signal disables the same, and once disabled, effectively, the digital counter (120) is not present in the circuitry of the microchip with security key.

The high signal at the output of the timer/trigger (122) is also present at two tri-state gates of the set1 (130) (remember that there is one tri-state gate for each of the two lines of the second box (132)) of the second internal transport lines (163). And the high signal from the output of the timer/trigger (122) is also present at the reset pin, RESET2 (155), of the register (148).

A high signal at two tri-state gates of the set1 (130) enable the two tri-state gates of the set1 (130) and both functions normally and signals present on the two lines (see second box (132)) of the second internal transport lines (163) will be also present at the input address pins (113), namely at "A0-A1" of the random access memory (111).

And finally, the high signal applied to the reset pin, RESET2 (155), of the register (148) will not affect the register (148) because only a low signal will reset the register (148), please see the overbar over the reset pin, RESET2 (155).

The Second Phase

The second phase involves the transfer of the signals from the bytes (Cp_1 (111A), Cp_2 (111B), Cp_3 (111C) and Cp_4 (111D)) of the random access memory (111) to the Software Driver (168) running under the control of the central processing unit (162) of the computer, Computer (158).

After the central processing unit (162) of the computer, Computer (158) has loaded (see the first double-headed arrow line (176)) the Operating System (174) and the Operating System (174) has loaded (see the second double-headed arrow line (178) the Software Driver (168) and the central processing unit (162) has initiated execution (see the first single-headed arrow line (166)) of the Software Driver (168). As the instructions code of the Software Driver (168) are executed (see the first single-headed arrow line (166)), the instructions of the Software Driver (168) instructs the central processing unit (162) to place a low signal in the read/write line (150) and the low signal disables the eight tri-states gates of set2 (140). There is one of the tri-state gates (140) for each line of the eight lines (see third box (144)) of the third internal transport lines (142) of the microchip with security key, and the low signal turns off all of the set2 (140) of eight tri-state gates.

The low signal at the read/write line (150) is also applied to the second group of inverters (151) of the set5 (149) of two tri-state gates. The second internal transport lines (163) comprise two lines (see second box (132)) and there are two tri-state gates, namely set5 (149), and each of these two tri-state gates has one inverter of the second group of inverters (151). The second group of inverters (151) inverts the low signal to a high signal before being applied to the pin of each respective tri-state gate in set5 (149). Since a high signal activates these two tri-state gates, they become closed, and the signal present at each of the two lines (see second box (132)) of the second internal transport lines (163) pass through each respective tri-state gate in set5 (149).

The low signal at the read/write line (150) is also applied to the five inverters of the first group of inverters (147). There are the five lines (see the fourth box (154)) connected to the register (148), one line for each cell "A," "B," "C," "D" and "E" of the register (148). The low signal is inverted to a high signal at the output of each of the inverter of the first group of inverters (147) and the five high signals are applied to the five tri-state gates of set4 (145). All of the five tri-state gates of set4 (145) are turned on and the signals at the input of each tri-state gate in set4 (145) will be present at the output of the respective tri-state gate. The signals at the input of such gates is applied to each cell of the register (148): One signal to the cell "A," one signal to the cell "B," one signal to the cell "C," one signal to the cell "D" and one signal for cell "E."

The five lines (see fourth box (154)) of the internal register lines (146) and the two lines (see second box (132)) of the second internal transport lines (163) are connected to the data bus (152) of the computer, Computer (158) which are connected to the central processing unit (162) of the computer, Computer (158). And since there are eight lines (153) in the data bus (152) and in the example given, only seven lines are used (the five lines (see the fourth box (154)) and the two lines (see second box (132)). One line of the data bus (152) is not used for this example.

Referring to FIG. 1, FIG. 1A, FIG. 1B and FIG. 2, FIG. 1A illustrates table (180) for five control signals from the five lines (see the fourth box (154)) applied to the cells of the register (148); applied to the two lines (see second box (132)) of the second internal transport lines (163); and applied to the one line to the set2 (140) of eight tri-state gates one tri-state gate for each for the eight lines (see third box (144)) of the third internal transport lines (142) to the microchip address (160). Any time a dash "-" is present in a cell of the table (180) of FIG. 1A, it means that, the signal on the line represented by the cell is not of any importance, that is, that any signal which may be present will be ignored by the circuitry of the microchip with security key.

The top-row (182) of the table (180) in FIG. 1A illustrates columns from "1" to "8." The left-column (184) represents the number of rows for the table (180) from "1" to "12." The bottom-row (186) represents the seven lines carrying signals in and out of the microchip with security key. Lines "1-2" represent the two lines (see second box (132)) for the second internal transport lines (163). Lines "3-7" represents the five lines (see the fourth box (154)) for the internal register lines (146) for the register (148). The data bus (152) has eight lines (153) (but it could have any number of lines) while then bottom-row (186) of the table (180) uses only seven lines, one line from the data bus (152) of the eight lines (153) is not used by the circuitry of the microchip with security key.

Explaining row "1" of left-column (184). Column "1" of top-row (182) and row "1" of left-column (184) has "150" and it illustrates the read/write line (150) of FIG. 1. FIG. 1B and FIG. 2. Column "2-6" of top-row (182) and row "1" of left-column (184) has the register (148). And columns "7-8" illustrate of top-row (182) and row "1" of left-column (184) has the second internal transport lines (163).

Explaining row "2" of the left-column (184). Under column "1" of top-row (182) and row "2" of left-column (184) there is an "R/W" and it represents the read/write line (150). Under columns "2-6" of top-row (182) and row "2" of left-column (184) have the five cells "A-E" of the register (148). Under columns "7-8" of top-row (182) and row "2" of left-column (184) have the address pin "A1" and address pin "A2" of the second internal transport lines (163).

Explaining the bottom-row (186) of the table (180) and it illustrates the seven lines transporting signals derived from the data bus (152). The lines progress from the right to left and it means that it stars from the lowest to the highest binary value.

Lines "1-2" are the two lines (see second box (132)) (address line "A0" and address line "A1") of the second internal transport lines (163), please look at row "2" of left-column (184) and columns "7-8" of the top-row (182).

Line "3" is the line to the cell "E" of the register (148), please look at the column "6" or top-row (182) and row "2" of left-column (184).

Line "4" is the line to the cell "D" of the register (148), please look at the row "5" of top-row (182) and row "2" of the left-column (184).

Line "5" is the line to the cell "C" of the register (148), please look at the column "4" of top-row (182) and row "2" of left-column (184).

Line "6" is the line to the cell "B" of the register (148), please look at the column "3" of top-row (182) and row "2" of left-column (184).

Line "7" is the line to the cell "A" of the register (148), please look at the column "2" of top-row (182) and row "2" of left-column (184).

Preparing to Transfer a Byte

FIG. 1B illustrates the computer, Computer (158) along with the central processing unit (162), the Software Driver (168), the random access memory, the computer's RAM (169) and the Operating System (174). FIG. 1A rows "3-12" of the left-column (184) of the table (180) relates to the actions taken by the computer, Computer (158) as will be described next.

FIG. 1B, at the power-up of the computer, Computer (158), the central processing unit (162) retrieves (see the first double-headed arrow line (176)) the software code of the Operating System (174) and loads the retrieved software code (see the second single-headed arrow line (170)) of the Operating System (174) into the random access memory, the computer's RAM (169). As the central processing unit (162) executes code (see the first double-headed arrow line (176)) from the Operating System (174) which is stored in the random access memory, the computer's RAM (169) of the computer, Computer (158), then the Operating System (174) retrieves (see the second double-headed arrow line (178)) the code from the Software Driver (168) and passes (see the first double-headed arrow line (176)) the retrieved software code of the Software Driver (168) to the central processing unit (162) and the central processing unit (162) loads (see the second single-headed arrow line (170)) the software code of the Software Driver (168) into the random access memory, the computer's RAM (169).

The central processing unit (162) starts executing the software code of the Software Driver (168) and the instruction of the software code of the Software Driver (168) instructs the central processing unit (162) to place signals in the lines of address bus (164), place a signal in the read/write line (150) and place signals in the lines of the data bus (152). Only one line is shown for the read/write line (150), but it could be two lines, but the microchip with security key could be implemented with a single line, and it could be only the "read line" or only the "write line" of the central processing unit (162), while explaining the preferred embodiments, the term read/write is used, even though a single line is present.

If two lines are used, (namely a read line and a write line), then when reading data from the microchip, the read line is designated "enable." When writing data to the microchip, the write line is designated "set." Both, the "enable" and the "set" lines are connected to the central processing unit (162). In a preferred embodiment, reading is done once the data stored in the random access memory (111) is read into the computer, Computer (158). And writing data is done once the central processing unit (162) sends commands to the register (148) and other components of the device (100), i.e., the microchip with the security key.

The signals at the address bus (164) designate the location of the microchip with security key at the mother board of the computer, Computer (158). The read/write signal in line (150) instructs the input and output signals flow in and out of the microchip with security key. The signals in the data bus (152) instructs the management of the signals stored in the random access memory (111) and the management of the random access memory (111).

The explanation just given for the interaction between the central processing unit (162), the Software Driver (168) and the microchip with security key applies to rows "3-12" of the left-column (184) of the table (180) of FIG. 1A and will not be mentioned again for the sake of avoiding repetition. Only the row number of left-column (184) of the table (180) of FIG. 1A will be mentioned.

The following explanation applies to the rows "3," "5," "7" and "9" of the left-column (184) of table (180) of FIG. 1A. The only thing that changes is the addressing of the bytes to be transferred from the random access memory (111) to the Software Driver (168) and is illustrated in the lines "1-2" of bottom-row (186) and "A1-A0" of row "2" of left-column (184) under the columns "7-8" of top-row (182).

Row "3" of left-column (184) of table (180) of FIG. 1A has "A0=0" and "A1=0" which address the first byte Cp_1 (111A) and the first byte Cp_1 (111A) is transferred from the random access memory (111) to the Software Driver (168) and stored in the random access memory, the computer's RAM (169).

Row "5" of left-column (184) of table (180) of FIG. 1A has "A0=0" and "A1=1" which address the second byte Cp_2 (111B) and the second byte Cp_2 (111B) is transferred from the random access memory (111) to the Software Driver (168) and stored in the random access memory, the computer's RAM (169).

Row "7" of left-column (184) of table (180) of FIG. 1A has "A0=1" and "A1=0" which address the third byte Cp_3 (111C) and the third byte Cp_3 (111C) is transferred from the random access memory (111) to the Software Driver (168) and stored in the random access memory, the computer's RAM (169).

And row "9" of left-column (184) of table (180) of FIG. 1A has "A0=1" and "A1=1" which address the fourth byte Cp_4 (111D) and the fourth byte Cp_4 (111D) is transferred from the random access memory (111) to the Software Driver (168) and stored in the random access memory, the computer's RAM (169).

Since FIG. 1 and FIG. 2 has identical circuitry with minor deviation between the two. The outputting of the signals of the bytes of the random access memory (111) will be first explained using FIG. 1 then the minor differentiation of FIG. 2 will be explained afterwards.

The following explanation applies for row "3" of left-column (184) and lines "A0=0" and "A1=0" for the two lines (see second box (132)) of the second internal transport lines (163), as already mentioned, the same explanation applies to rows "5," "7" and "9" as well.

FIG. 1A, the lines "1-2" (from left to right) of bottom-row (186) and columns "7-8" of top-row (182) illustrate the values of "1" and "2" and they represent the two lines (see second box (132)) of the second internal transport lines (163) and also represent lines "1-2" of the data bus (152). At row "3" of left-column (184) and columns "7" and "8" there are two low signals "00" one for each column. And the low signals are present at the two lines (see second box (132)) of the second internal transport lines (163) and at the input address pins (113), namely at "A0-A1" of the random access memory (111).

Line "3" of bottom-row (186) under column "6," top-row (182) represents the line "3" of the data bus (152) and the first line of the internal register lines (146) and at row "3" of left-column (184) and under column "6" of top-row (182) a high signal "1" is present. And at row "2" of left-column (184) and under column "6" of the top-row (182) the cell "E" of the register (148) is present and the high signal at line "3" is stored in the cell "E" of the register (148).

Line "4" of bottom-row (186) under column "5," top-row (182) represents the line "4" of the data bus (152) and the second line of the internal register lines (146) and at row "3" of left-column (184) and under column "5" of top-row (182) a low signal "0" is present. And at row "2" of left-column (184) and under column "5" of the top-row (182) the cell "D" of the register (148) is present and the low signal at line "4" is stored in the cell "D" of the register (148).

Line "5" of bottom-row (186) under column "4," top-row (182) represents the line "5" of the data bus (152) and the third line of the internal register lines (146) and at row "3" of left-column (184) and under column "4" of top-row (182) a high signal "1" is present. And at row "2" of left-column (184) and under column "4" of the top-row (182) the cell "C" of the register (148) is present and the high signal at line "5" is stored in the cell "C" of the register (148).

Line "6" of bottom-row (186) under column "3," top-row (182) represents the line "6" of the data bus (152) and the fourth line of the internal register lines (146) and at row "3" of left-column (184) and under column "3" of top-row (182) a low signal "0" is present. And at row "2" of left-column (184) and under column "3" of the top-row (182) the cell "B" of the register (148) is present and the low signal at line "6" is stored in the cell "B" of the register (148).

Line "7" of bottom-row (186) under column "2," top-row (182) represents the line "7" of the data bus (152) and the fifth line of the internal register lines (146) and at row "3" of left-column (184) and under column "2" of top-row (182) a high signal "1" is present. And at row "2" of left-column (184) and under column "2" of the top-row (182) the cell "A" of the register (148) is present and the high signal at line "6" is stored in the cell "A" of the register (148).

The cells "A-E" of the register (148) stores the received signals in a latched state, and latched signals stay as received until their values change, or the register (148) is reset or the computer, Computer (158) is powered off.

Explaining cell "E" of the register (148) for the embodiment of FIG. 1. With a high signal "1" stored in the cell "E" of the register (148), the latched high signal is present at the set3 (141) of eight tri-state gates, one tri-state gate for each of the eight lines (see third box (144)) of the third internal transport lines (142). With a high signal at each of the set3 (141) of eight tri-state gates, each one will be turned on and any signal present at the output of the random access memory (111) will flow through the set3 (141) of eight tri-state gates into the latchB (143) and the latchB (143) latches the eight signals of the eight lines (see third box (144)) present on the third internal transport lines (142) and the latched signals are present at the output of the latchB (143).

What differentiates FIG. 1 from FIG. 2 is the signal stored in the cell "E" of the register (148) and the digital elements interfacing the input and the output circuitry of the random access memory (111). These minor differences will be explained next.

Explaining cell "E" of the register (148) for the embodiment of FIG. 1. As already explained, the set1 (130) of two tri-states gates, one for each line (see second box (132)) of the second internal transportation lines (163) are turned on and the two low signals "00" flowing through two tri-state gates of the set1 (130) are present at the input address pins (113), namely at "A0=1 and A1=0," and the first byte Cp_1 (111A) is addressed and since the random access memory (111) is output enabled, high signal "1" from cell "A" of the register (148) is inverted into a low "0" by the second inverter (139) and the low signal "0" is applied to the output enable pin, OE (138), then the signals present in the byte Cp_1 (111A) are outputted to the eight lines (see third box (144)) of the third internal transport lines (142) and they are present at the set3 (141) of eight tri-state gates, one tri-state gate per each line of the eight lines (see third box (144)) of the third internal transport lines (142).

The high signal "1" stored (latched) in the cell "E" of the register (148) is also present in the set3 (141) of eight tri-state gates, one tri-state gate for each of the eight lines (see third box (144)) of the third internal transport lines (142). The high signal present at the set3 (141) of eight tri-state gates turns on the set3 (141) of eight tri-state gates and signals present at output of the random access memory (111) flow through the set3 (141) of eight tri-state gates and are stored (latched) by the latchB (143). The stored signals in the latchB (143) are also present at the output of the latchB (143) which are present at the input of the set2 (140) of eight tri-state gates, one tri-state gate for each line of the eight lines (see third box (144)) of the third internal transport lines (142).

Explaining cell "E" of the register (148) for the embodiment of FIG. 2. With a high signal "1" stored in the cell "E" of the register (148), the latched high signal is present at the second input (lower input) of the AND gate (200) and as already explained, the first input (top input) of the AND gate (200) has a high signal. With high signals applied to the two inputs of the AND gate (200), the output of the AND gate (200) becomes a high signal and the high signal is applied to two tri-state gates of the set1 (130) (one tri-state for each line (see second box (132)) of the second internal transport lines (163)).

Then, the two tri-state gates of the set1 (130) become operative and the two low signals in the two lines (see second box (132)) of the second internal transport lines (163) flow through two tri-state gates of the set1 (130) and into the input of the latchA (210), and the latchA (210) latches these two low signals. The two latched low signals present in the latchA (210) are also present at the output of the latchA (210) and available at the two of the input addresses pins (113), namely at "A0=0" and "A1=0" of the random access memory (111). The addressed byte Cp_1 (111A) is outputted and present at the set3 tri-states gates (141).

The two low signals are also present at the two addresses, memory address pins (109), namely at "A0=0" and "A1=0" of the non-transitory computer storage medium (102). However, it will not matter because the non-transitory computer storage medium (102) is deselected, that is, disabled and effectively is not present in the circuitry of the microchip with security key.

The following explanations are made with reference to FIG. 1 and FIG. 2. The low signal "0" at the cell "D" is also present at the reset pin, RESET1 (128), of the random access memory (111) but it will not have any effect because the reset pin "RESET1" (128) requires a high signal (the "RESET1" lacks an overbar) in terms for the random access memory (111) to reset.

The high signal "1" at the cell "C" is present at the write enable pin "WE1" (136) and will not affect the random access memory (111) because the write enable pin (136), namely "WE1," requires a low signal for operation as indicated by the overbar.

The low signal "0" at the cell "B" is present at chip enable pin, CE1 (137) and a low signal at the chip enable (137) enables the random access memory (111) and the random access memory (111) functions normally. The chip enable pin CE1 (137) requires a low signal for operation as indicated by the overbar.

The high signal "1" at the cell "A" is present at the second inverter (139) and the high signal is inverted into a low signal "0" and the low signal is present at output enable pin, OE (138) and of the output enable pin, OE (138) enables (as indicated by the overbar) the output of the random access memory (111).

With the random access memory (111) enabled (low signal "0" at the output enable pin, OE (138)) and with two low signals "00" present at the input address pins (113), namely at "A0=0" and "A1=0," of the random access memory (111). The random access memory (111) selects the first byte Cp_1 (111A) which is addressed by the two signals at the input address pins (113), namely at "A0=0" and "A1=0," and the signals present in the first byte (address zero "00") Cp_1 (111A) are output to the eight lines (see third box (144)) of the third internal transport lines (142).

But with a low signal "0" present at the read/write line (150), the set2 (140) of eight tri-state gates are disabled and the eight (one line per bit of the eight bits byte Cp_1 (111A)) output signals of the random access memory (111) don't flow through the set2 (140) of eight tri-state gates, one tri-state gate per line of the eight lines (see third box (144)) of the third internal transport lines (142).

Transferring the Byte

The explanation provided here applies to rows "4," "6," "8" and "10" of left-column (184) of a table (180) of FIG. 1A.

As the central processing unit (162) of the computer, Computer (158) executes (see the first single-headed arrow line (166)) the next set of instruction of the Software Driver (168), the central processing unit (162) is instructed to read a byte from the microchip address (160). The central processing unit (162) sets the read/write line (150) to a high signal. This high signal is present at the first group of inverters (147). The high signal gets inverted to a low signal turning off the set4 (145) of five tri-state gates, one for each of the five lines (see the fourth box (154)) of the internal register lines (146). Thus, there is no signal flow through the set4 (145) of five tri-state gates to the register (148) and the signals at the cells "A-E" of the register (148) remains unchanged, keeping the prior functionality of the random access memory (111) as it was set prior.

The high signal is also applied to the two inverters the second group of inverters (151). This high signal gets inverted to a low signal turning off the two tri-state gates of set5 (149): namely the one tri-state gate for each of the two lines (see second box (132)) of the second internal transport lines (163). No signal flows on the second internal transport lines (163). The high signal at the read/write line (150) is also present in the set2 (140) of eight tri-state gates, one tri-state gate per each line of the eight lines (see third box (144)). The set2 (140) of eight tri-state gates are enabled and the signal present in each of the eight lines (see third box (144)) of the third internal transport lines (142) flow through the set2 (140) of eight tri-state gates to the data bus (152) of the computer, Computer (158) and into the central processing unit (162). The central processing unit (162) then makes the received eight signals available (see the second single-headed arrow line (170) and the third single-headed arrow line (172)) to the Software Driver (168) by placing (see the second single-headed arrow line (170)) the signals into the random access memory, the computer's RAM (169) of the computer, Computer (158)

Clearing the Random Access Memory

FIG. 1A under column 1 of top-row (182) and row 11 of left-column (184). The central processing unit (162) of the computer, Computer (158) sets the read/write line (150) to a low signal. The low signal turns off the set2 (140) of eight tri-state gates. No signal flows out. The low signal is also applied to the five inverters of the first group of inverters (147) and the low signal is inverted to a high signal and the high signal turns on the set4 (145) of five tri-state gates. The low signal is also applied to the two inverters of the second group of inverters (151) and the low signal is inverted to a high signal and the high signals turn on the set5 (149) of two tri-state gates.

The only signals of interest are the signals applied to the register (148) through the set4 (145) of five tri-state gates. And out of all the signals applied to the register (148) which is of interest is the high signal stored in the cell "D" (row "11" of left-column (184) of the table (180) and column "5" of the top-row (182) of the table (180)) of the register (148). Once the high signal is stored in the cell "D" of the register (148), the high signal will be present at the reset pin, RESET1 (128). Since a high signal is applied to the reset pin, RESET1 (128), this resets (the "RESET1" lacks the overbar) the random access memory (111). Once the random access memory (111) is reset, all the bits of all bytes are seta low signal. Thus, Cp_1 (111A), Cp_2 (111B), Cp_3 (111C) and Cp_4 (111D) will be cleared and the prior signals representing a copy of the security key which were present are cleared for as long as the computer, Computer (158) is turned on and the reset switch/button (125) is not activated.

Disabling the Random Access Memory.

The only change that happened from row "11" to row "12" is the storing of a high signal in the cell "B" of the register (148). Once the high signal is stored in the cell "B" (row "12" of left-column (184) of the table (180) and column "3" of the top-row (182) of the table (180)) of the register (148), the high signal is present in the chip enable pin CE1 (137) and since a low signal at the chip enable pin CE1 (137) activates (denoted by the overbar) and a high deactivates. Then, the random access memory (111) is deactivated, that is, the random access memory (111) gets turned off and for technical purposes, the random access memory (111) is not any longer attached to the microchip with security key.

Uses of the Microchip with Security Key

FIG. 6B illustrates the Encrypted Input List (680) which is used by the embodiment of FIG. 7. As a user enters user right parameter using the User-Right Input (763) module of the User Interface (760). And once the user requests (see FIG. 7, eighth single-headed arrow line (786)) the saving of the user's entered user right parameters. After the Software Driver (168) receiving the user's entered user right parameters, the Software Driver (168), using the copy of copy of the computer security key or the Copy-of-copy of first security key (171), encrypts the user's entered user right parameter deriving an encrypted user right parameter then saving (ninth double-headed arrow line (785)) the encrypted user right parameter in the Encrypted Input List (680).

There are three users in our exemplary illustration at FIG. 6B. User-A (640A) has User-A Right Parameter (650A), User-B (640B) has User-B Right Parameter (650B) and User-C (640C) has User-C Right Parameter (650C). Once User-A (640A) using the User Interface (760) enters the User-A Right Parameter (650A) into the User-Right Input (763) module, and once the User-A (640A) initiates (see FIG. 7, eighth single-headed arrow line (786)) the saving of the User-A Right Parameter (650A), after the Software Driver (168) receives (eighth single-headed arrow line (786)) the User-A (640A) entered User-A Right Parameter (650A), then the Software Driver (168) using the copy of copy of the computer security key, the Copy-of-copy of first security key (171) encrypts the received User-A Right Parameter (650A) deriving the Encrypted User-A Right Parameter (660A), and last, the Software Driver (168) saves (ninth double-headed arrow line (785)) the Encrypted User-A Right Parameter (660A) in the Encrypted Input List (680). And this process is illustrated at FIG. 6B as the first dashed single-headed arrow line (642).

The same explanation for User-A (640A) applies to User-B (640B) and for User-C (640C). Once User-B (640B) using the User Interface (760) enters the User-B Right Parameter (650B) into the User-Right Input (763) module, and once the User-B (640B) initiates (see FIG. 7, eighth single-headed arrow line (786)) the saving of the User-A Right Parameter (650A), After the Software Driver (168) receives (eighth single-headed arrow line (786)) the User-B (640B) entered User-B Right Parameter (650B), then the Software Driver (168), after the Software Driver (168) receives (eighth single-headed arrow line (786)) the User-B (640B) entered User-B Right Parameter (650B), then the Software Driver (168) using the copy of copy of the computer security key, the Copy-of-copy of first security key (171) encrypts the User-B Right Parameter (650B) deriving the Encrypted User-B Right Parameter (660B), and last, the Software Driver (168) saves (ninth double-headed arrow line (785)) the Encrypted User-B Right Parameter (660B) in the Encrypted Input List (680). And this process is illustrated at FIG. 6B as the second dashed single-headed arrow line (644).

Once User-C (640C) using the User Interface (760) enters the User-C Right Parameter (650C) into the User-Right Input (763) module, and once the User-C (640C) initiates (see FIG. 7, eighth single-headed arrow line (786)) the saving of the User-C Right Parameter (650C), after the Software Driver (168) receives (eighth single-headed arrow line (786)) the User-C (640C) entered User-C Right Parameter (650C), then the Software Driver (168) using the copy of copy of the computer security key, the Copy-of-copy of first security key (171) encrypts the User-C Right Parameter (650C) deriving the Encrypted User-C Right Parameter (660C), and last, the Software Driver (168) saves (ninth double-headed arrow line (785)) the Encrypted User-C Right Parameter (660C) in the Encrypted Input List (680). And this process is illustrated at FIG. 6B as the third dashed single-headed arrow line (646).

FIG. 7 illustrates another preferred embodiment. The Software Driver (168) works in synchrony with the Operating System (174). The software driver, in the example, is a kernel software driver, the Software Driver (168). A kernel software driver works with the operating system and it part of the operating system. The Software Driver (168) while working with the Operating System (174) intercepts input and output calls from the Operating System (174). Calls to read a file, to create a file, to edit a file, to save a file into the first non-transitory computer storage medium, Permanent Storage Medium (1240) of the computer, Computer (158). Anti-virus software drivers fall in the kernel driver's category.

The Software Driver (168) also communicates (see the eighth double-headed arrow line (747)) with the application programming interface (700) and the application programming interface (700) receives instructions from the Software Driver (168). The application programming interface (700) and also responds to requests from (see the eighth double-headed arrow line (747)) the Software Driver (168) or initiates requests (see the ninth single-headed arrow line (749)) to the Software Driver (168).

Once the application programming interface (700) receives (see the eighth double-headed arrow line (747)) requests from the Software Driver (168), if the request requires a user's attention, the application programming interface (700) initiates communication (see the sixth double-headed arrow line (770)) with the User Interface (760) and any user's response at the User Interface (760), the User Interface (760) returns (see the sixth double-headed arrow line (770)) the user's response to the application programming interface (700). And the application programming interface (700) returns (see the eighth double-head arrow line (747)) the user's response to the Software Driver (168) and the Software Driver (168) proceeds and process the received user's response.

The Software Driver (168) also reads (ninth double-headed arrow line (785)) the data of the Encrypted Input List (680) which is stored in the first non-transitory computer storage medium, Permanent Storage Medium (1240) of the computer, Computer (158). After reading the data from the Encrypted Input List (680), the Software Driver (168) uses the data amongst other things to check against the code of the child process (720) before the child process (720) is stored for execution in the random access memory, the computer's RAM (169) of the computer, Computer (158).

The copy of copy of the computer security key, the Copy-of-copy of first security key (171), as shown in FIG. 1B, comprises copy of the bytes: Cp_1 (111A), Cp_2 (111B), Cp_3 (111C) and Cp_4 (111D) from the random access memory (111). The copy of the bytes: Cp_1 (111A), Cp_2 (111B), Cp_3 (111C) and Cp_4 (111D) are already stored in the random access memory, the computer's RAM (169) as the values "AF," "4B," "43," and "A2." The copy of the bytes: Cp_1 (111A), Cp_2 (111B), Cp_3 (111C) and Cp_4 (111D) are under the control (see the third single-headed arrow line (172)) of the Software Driver (168). The Software Driver (168) works in conjunction (see the second double-headed arrow line (178)) with the Operating System (174). The Software Driver (168) uses the copy of copy of the computer security key, the Copy-of-copy of first security key (171) to encrypt files before installation in the computer, Computer (158). The Software Driver (168) also uses the copy of copy of the computer security key, the Copy-of-copy of first security key (171) to decrypt installed encrypted files before execution in the random access memory, the computer's RAM (169). The Software Driver (168) also uses the copy of copy of the computer security key, the Copy-of-copy of first security key (171) to encrypt/decrypt metadata of installed files.

The Software Driver (168) also classifies the files being installed in the computer, Computer (158) as "safe," if the software is of a known good source, or will mark the software as "risk," if from unknown source.

Also, at installation time, the Software Driver (168) creates an identification of the group of files being installed. The identification helps the Software Driver (168) to identify the files being handled by a child process in more than one way. If the file of the child process is marked as "risk," the Software Driver (168) handles the files and child process with the same identification one way. If the file of the child process is marked as "safe," the Software Driver (168) handles the files and child process with the same identification differently that those marked as "risk."

Installed software marked as "risk" may or may not be encrypted. For simplicity of this explanation, installed software marked as "risk" is assumed to be non-encrypted. Installed software marked as "safe" may or may not be encrypted. For simplicity of this explanation, installed software marked as "safe" is assumed to be encrypted.

FIG. 5A illustrates the computer, Computer (158) and the Software Driver (168) retrieving (see the third single-headed arrow line (172)) the copy of copy of the computer security key, the Copy-of-copy of first security key (171) from the random access memory, the computer's RAM (169) (FIG. 1B) then using the copy of copy of the computer security key, the Copy-of-copy of first security key (171) that was retrieved to encrypt a software module being installed in the computer, Computer (158). This use derives (third double-head arrow line (502)) the encrypted module (512). The encrypted module (512) includes a First Metadata (514). The encrypted module (512) is deemed "safe" (FIG. 56). Also present in the computer, Computer (158) under the control (fourth double-head arrow line (500)) of the Software Driver (168) is a non-encrypted module (508), which also has a second metadata (510). The non-encrypted module (508) is deemed "risk" (FIG. 5C).

As indicated by the first line (504) and by the second line (506), First Metadata (514), and second metadata (510), are derived from the metadata template (526). The encrypted module (512) and the non-encrypted module (508) could be any kind of file, a software file containing software instructions or an audio file, for instance.

The Software Driver (168) uses the metadata template (526) while working on the files stored in the computer, Computer (158). And as illustrated, the metadata template (526) has a module name (516), a class (518), the Encrypted Installation Identification (520), encrypted checksum (522), encrypted non-encrypted flag (524) and confirmatory predefined encrypted value (525).

FIG. 5B illustrates two metadata derived from the metadata template (526): They are: First Metadata (514), related to the encrypted module (512) and the encrypted module (512) is a software program file containing software instructions. And a Third Metadata (550) which is related to a first file.

FIG. 5C illustrates two metadata derived from the metadata template (526) as well. Second metadata (510), is related to the non-encrypted module (508) and the non-encrypted module (508) is a software program file containing software instructions. And a template for the Fourth Metadata (560) which is related to a second file.

The First Metadata (514), has the following information: The module name (516) is programA (see entry1 (516A)), which is the name for the program name of the encrypted module (512), first program. The class (518) is labeled as "Safe" (see entry2 (518A)). The Encrypted Installation Identification (520) is "12345" ((see entry3 (520A)). The value "12345" is an encrypted result and the actual unencrypted result is different, for the sake of explanation, it is assumed the unencrypted result is "xyz". The encrypted checksum (522) is "123876" (see entry4 (522A)). The encrypted non-encrypted flag (524) is labeled "Yes" (see entry5 (524A)). And the confirmatory predefined encrypted value (525) is a value which is known to the Software Driver (168) and the value can be any value, in our exemplary explanation we're using the value of 'yes' which once the Software Driver (168) using the copy of copy of the computer security key, the Copy-of-copy of first security key (171) encrypts the value of 'yes' then the assumed encrypted value is 'AB7ZTB' (see entry6 (525A)). The confirmatory predefined encrypted value (525) can be an encrypted value stored in the Encrypted Input List (680). Or the confirmatory predefined encrypted value (525) can be a value that changes for every group of installed program in a single installation session. But, any way it the confirmatory predefined encrypted value (525) is implemented, the confirmatory predefined encrypted value (525) is known to the Software Driver (168) while the Software Driver (168) is ready or is accessing the file.

The Third Metadata (550) has the following information: The module name (516) is the first file, namely fileA (see entry7 (516B)), which is the name for a non-executable file. The class (518) is labeled as "Safe" (see entry8 (518B)). The Encrypted Installation Identification (520) is "12345" ((see entry9 (520B)). The encrypted checksum (522) is "1236" (see entry10 (522B)). The encrypted non-encrypted flag (524) is labeled "Yes" (see entry11 (524B)). And the confirmatory predefined encrypted value (525) is a value which is known to the Software Driver (168) and the value can be any value, in our exemplary explanation we're using the value of 'yes' which once the Software Driver (168) using the copy of copy of the computer security key, the Copy-of-copy of first security key (171) encrypts the value of 'yes' then the assumed encrypted value is 'AB7ZTB' (see entry12 (525B)).

The second metadata (510) has the following information: The module name (516) is the second program, namely programB (see entry13 (516C)), which is the name for the program name of the non-encrypted module (508). The class (518) is labeled as "Risk" (see entry13 (518C)). The Encrypted Installation Identification (520) which has the value of "ABCDE" ((see entry15 (520C)). The value "ABCDE" is an encrypted result and the actual unencrypted result is different, for the sake of explanation, it is assumed the unencrypted result is "123" The encrypted checksum (522) is "876" (see entry16 (522C)). The encrypted non-encrypted flag (524) is labeled "No" (see entry17 (524C)). And the confirmatory predefined encrypted value (525) is a value which is known to the Software Driver (168) and the value can be any value, in our exemplary explanation we're using the value of 'yes' which once the Software Driver (168) using the copy of copy of the computer security key, the Copy-of-copy of first security key (171) encrypts the value of 'yes' then the assumed encrypted value is 'AB7ZTB' (see entry18 (525C)).

The Fourth Metadata (560) has the following information: The module name (516) is the second file, namely fileB (see entry19 (516D)), which is the name for a non-executable file. The class (518) is labeled as "Risk" (see entry20 (518D)). The Encrypted Installation Identification (520) is "ABCDE" ((see entry21 (520D)). The encrypted checksum (522) is "1786" (see entry22 (522D)). The encrypted non-encrypted flag (524) is labeled "No" (see entry23 (524D)). And the confirmatory predefined encrypted value (525) is a value which is known to the Software Driver (168) and the value can be any value, in our exemplary explanation we're using the value of 'yes' which once the Software Driver (168) using the copy of copy of the computer security key, the Copy-of-copy of first security key (171) encrypts the value of 'yes' then the assumed encrypted value is 'AB7ZTB' (see entry24 (525D)).

Each of the elements or entries within a template for metadata of a file has a utility. As the Software Driver (168) installs software, like the First Metadata (514), the Software Driver (168) adds to the metadata of each installed file the name of the file and a common identification to all files of the installation session. The common identification helps the Software Driver (168) at the execution time of the installed software to limit the execution of the installed software if the software is marked as "risk."

A template for the First Metadata (514) and a template for the Third Metadata (550) (FIG. 5B) are part of two files taking part of a single installation session, and both files are marked as "Safe," in class (518) as illustrated by the entries: entry2 (518A) and entry8 (518B). Also, both files have the same Encrypted Installation Identification (520) which is "12345," as illustrated by two entries in FIG. 5B, namely, entry3 (520A) and entry9 (520B).

The second metadata (510) and the Fourth Metadata (560) (FIG. 5C) are two files taking part of a single installation session, which has the value of "ABCDE" as illustrated by the entries: entry13 (520C) and entry18 (520D). Both files are marked as "Risk" in class (518) entries: entry15 (518C) and entry20 (518D).

In FIG. 5B, the first program, namely programA at entry1 (516A) is the name of the encrypted module (512) in FIG. 5A. The "Safe" label (518A) at entry2 means that the encrypted module (512) is safe and it can be trusted. The value "12345" (the same value as in entry3 (520A) and in entry9 (520B)) is an identification assigned by the Software Driver (168) at the time the Software Driver (168) encrypts the first program named "programA" which is being installed to derive the encrypted module (512). Once the Software Driver (168) installs the first program, namely programA at entry1 (516A), it will be the only installed version of the first program in the computer, Computer (158) in the first non-transitory computer storage medium, Permanent Storage Medium (1240).

The Software Driver (168) also creates the entry3 (520A) in FIG. 5B, namely the value "12345," (the value is the same value as entry8 (520B)) for the Encrypted Installation Identification (520) as a means to identify all files being installed in the same installation session. The same identification value in entry3 (520A) and in entry9 (520B), means that the first program, namely programA at entry1 (516A) and the first file, namely fileA at entry7 (516B), took part of a single installation and they were installed at the time and in the same installation session.

The Software Driver (168) also marks both files as "Safe" and this is illustrated in the First Metadata (514) at the entry2 (518A) in FIG. 5B. Entry2 (518A) is "Safe" for the first program, namely programA at entry1 (516A). Entry8 (518B) in the Third Metadata (550) is also "Safe" for the first file, namely fileA at entry8 (518B). The "Safe" entry for class (518) means that the source of the file is known to be safe. And the first file, namely fileA at entry7 (516B) and the first program, namely programA at entry1 (516A) of the First Metadata (514) may or may not be automatically encrypted, in this example, however, both are encrypted.

The Software Driver (168) also creates a checksum and the checksum has the sum of the information for the data in the file before encryption, if a single byte of the file changes, the checksum changes as well. After the Software Driver (168) creates the checksum for the file being installed, the Software Driver (168) encrypts the checksum deriving the encrypted checksum (522). Then the Software Driver (168) saves the value of the encrypted checksum (522). The encrypted checksum (522) for the programA in the First Metadata (514), as shown in FIG. 5B at entry4 (522A), is "123876." Similarly, the encrypted checksum (522) for fileA in the Third Metadata (550), as shown in FIG. 5B at entry10 (522B) is "1236." The value "123876" in entry4 (522A) and the value "1236" in entry10 (522B)) are the encrypted values, which means that the actual un-encrypted values are different.

The encrypted non-encrypted flag (524) values for both the First Metadata (514) and the Third Metadata (550) for the programA (516A) entry1 and the fileA (516B) entry7, respectively is "Yes" (see entry5 (524A) for programA and entry11 (524B) for fileA (516B).

And finally, the confirmatory predefined encrypted value (525) is a value which is known to the Software Driver (168) and the value can be any value, in our exemplary explanation we're using the value of 'yes' which once the Software Driver (168) using the copy of copy of the computer security key, the Copy-of-copy of first security key (171) encrypts the value of 'yes' then the assumed encrypted value is 'AB7ZTB', (see entry6 (525A), entry12 (525B), entry18 (515C) and entry24 (525D)).

The "Yes" value for the encrypted non-encrypted flag (524), in the example given, means that the installed first program, namely programA at entry1 (516A) and the installed the first file, namely fileA at entry7 (516B) are saved in the encrypted form in the first non-transitory computer storage medium, Permanent Storage Medium (1240) of the Computer (158). At the installation time, the Software Driver (168) using the copy of copy of the computer security key, the Copy-of-copy of first security key (171) stored in the random access memory, the computer's RAM (169) of the computer, Computer (158) (FIG. 1B), the Software Driver (168) encrypts the program, namely ProgramA (516A) entry1, and the file, namely FileA (516B) entry7. Then the Software Driver (168) saves on the first non-transitory computer storage medium, Permanent Storage Medium (1240) of the computer, Computer (158) the encrypted program, namely ProgramA (516A) entry1, and the file, namely FileA (516B) entry7 as the only encrypted version of the ProgramA and FileA.

If the encrypted non-encrypted flag (524) is set to "Yes" for a software program, at the runtime of the software program the Software Driver (168) decrypts the encrypted software program deriving the decrypted software program then stores the decrypted software program in the random access memory, the computer's RAM (169).

If the encrypted non-encrypted flag (524) is set to "Yes" for a file, at the opening of the file, then the Software Driver (168) decrypts the encrypted file deriving the decrypted file then passes the decrypted file to the Operating System (174).

If the encrypted non-encrypted flag (524) is set to "Yes" for a file, then at the saving of the file, the Software Driver (168) encrypts the file deriving an encrypted file. Then, the Software Driver (168) saves the encrypted file in the computer's non-transitory computer storage medium.

The confirmatory predefined encrypted value (525) is used in every installed file and it is a form for the Software Driver (168) to identify if a file (software program or data) is a valid installed file in the computer, computer (158). We'll explain the confirmatory predefined encrypted value (525) for the First Metadata (514) ProgramA (516A) at entry1, but the same explanation applies to entry12 (525B) for the Third Metadata (550), for the entry18 (525C) for Second Metadata (510) and entry24 (525D) for the Fourth Metadata (560).

The confirmatory predefined encrypted value (525) has the same encrypted value stored in every file, and for our explanatory explanation, we're assuming that the value of 'yes' has been encrypted and the derived encrypted value is 'AB7ZTB' (525A) entry6. At the installation time of a program or a file, the Software Driver (168) retrieves (see FIG. 1B, third single-headed arrow line (172)) the computer security key, the Copy-of-copy of first security key (171) and encrypts our assumed value 'yes' (but it can be any value) deriving the encrypted value of 'AB7ZTB'. Then the Software Driver (168) creates the confirmatory predefined encrypted value (525) at the First Metadata (514) and saves the encrypted value 'AB7ZTB' at the entry6 (525A).

As the program is requested by the Operating System (174), the Software Driver (168) reads the confirmatory predefined encrypted value (525) retrieving the encrypted value 'AB7ZTB' (525A) at entry6 for the First Metadata (514). Then the Software Driver (168) using the computer security key, the Copy-of-copy of first security key (171) decrypts the retrieved value 'AB7ZTB' deriving the Confirmatory Predefined Decrypted Value, which in our exemplary is the value of 'yes'. And since the Confirmatory Predefined Decrypted Value is the correct value, the Software Driver (168) allows the execution of the ProgramA (516A) entry1.

The embodiment can also be implemented where after the Software Driver (168) has verified that the Confirmatory Predefined Decrypted Value is the correct value, then the Software Driver (168), using the computer security key, the Copy-of-copy of first security key (171) decrypts the file for the ProgramA (516A) entry1 deriving a decrypted programA. The Software Driver (168) then applies a checksum algorithm to the decrypted programA deriving the first decrypted checksum of the decrypted programA. The Software Driver (168) using the computer security key, the Copy-of-copy of first security key (171) decrypts the Encrypted Checksum (522) deriving a second decrypted checksum. The Software Driver (168) then compares the first decrypted checksum with the second decrypted checksum and if there is a match, the Software Driver (168) then loads the decrypted programA into the Computer's RAM (169) of the computer, Computer (158) to be executed by the Central Processing Unit (162) of the computer, Computer (158).

If the Confirmatory Predefined Decrypted Value is not the correct value of 'yes', or if the program lacks the entry of the confirmatory predefined encrypted value (525), then the Software Driver (168) knows beforehand that the program is an illegal program and stops the program's execution without proceeding any further, like decrypting the program to check the Encrypted Checksum (522).

FIG. 5C illustrates a template for the second metadata (510) for second program, namely programB (see entry13 (516C)). It also illustrates a template for the Fourth Metadata (560) for the second file, namely fileB, (see entry19 (516D)).

The second program, namely programB (see entry13 (516C)) is the name of the non-encrypted module (508) of FIG. 5A. In the example Illustrated by FIG. 5C, both the second program, namely programB (see entry13 (516C)) and the second file, namely fileB (see entry19 (516D)), were installed at the same time and part of the same installation session and this is indicated by an Encrypted Installation Identification (520) with the identical entry value of "ABCDE" (see entry15 (520C) and entry21 (520D)).

For the second metadata (510), the second program, namely "programB," at entry13 (516C), the encrypted checksum (522) at entry16 (522C) with a value of "876."

For the Fourth Metadata (560), the entry value for the encrypted checksum (522) at entry22 (522D) is "1876." Both the second program, namely programB (see entry13 (516C)) and the second file, namely fileB (see entry19 (516D)), are not encrypted and, therefore, this is indicated at the encrypted non-encrypted flag (524) with an entry of "No" (see entry17 (524C) and entry23 (524D)).

The second metadata (510) and for the Fourth Metadata (560) are classified as "Risk" (see entry14 (518C) and entry20 (518D)), indicating that the installed files may or may not be safe. The second program, namely programB (see entry13 (516C)) may as well be a malware since the origin of the second program, namely programB (see entry13 (516C)) could not be verified.

The files at the First Metadata (514) and the Third Metadata (550) of FIG. 5B are encrypted, but they might not have been. Also, the second metadata (510) and the Fourth Metadata (560) are not encrypted but they might have been. Both scenarios are discussed below.

Stopping Computer Malware

Preferred embodiments of FIG. 1, FIG. 2 and FIG. 7 are used to stop infection and spread of computer malware. There is more than one way of stopping a computer malware as described in the following exemplary embodiments.

In a first exemplary embodiment, at the installation time, the Software Driver (168) classified the two files, namely second program, namely programB (see entry13 (516C)) and second file, namely fileB (see entry19 (516D)), as first Risk (see entry14 (518C)) and second Risk (see entry20 (518D)). Also, both are part of the same installation session, both files were installed at the same time and they form a single group and it is illustrated at the Encrypted Installation Identification "ABCDE" (see entry15 (520C)) and entry21 (520D).

Assuming that the stored second program, namely programB (see entry13 (516C)) of FIG. 5C, is a malware and once the malware program, second program, namely programB (see entry13 (516C)), is executed, the malware program infects the good program, first program, programA at entry1 (516A). One way for second program, namely programB (see entry13 (516C)) to infect the first program, programA is by the second program, namely programB injecting executable code into the first program, namely programA at entry1 (516A), which could be code of itself (e.g., the second program, namely programB (see entry13 (516C))) or a code from second file, namely fileB (see entry19 (516D)).

In either scenario, the virus will be disabled without harming the computer, Computer (158). The good program, first program, programA at entry1 (516A), is encrypted as indicated by the "Yes" (see entry5 (524A)) in the encrypted non-encrypted flag (524). The programA at entry1 (516A) is encrypted but the central processing unit (162) of the computer, Computer (158) only executes non-encrypted software instruction. So, once the execution of the first program, namely programA at entry1 (516A) is requested, the Software Driver (168) using the copy of copy of the computer security key, the Copy-of-copy of first security key (171), decrypts the first program, namely programA at entry1 (516A). But the computer malware program second program, namely programB (see entry13 (516C)), or the second file, namely FileB at entry19 (516D), attached to the good first program, programA at entry1 (516A), is not encrypted. Once the Software Driver (168) decrypts the good first program, programA at entry1 (516A), the attached computer malware second program, namely programB (see entry13 (516C)) or the second file, namely FileB at entry19 (516D), becomes garbled and will not be executed by the central processing unit (162) of the computer, Computer (158).

A second exemplary embodiment illustrates an even easier way to disable the computer malware second program, namely programB (see entry13 (516C)), attached to the good first program, programA at entry1 (516A). This embodiment uses the Software Driver (168) to read the First Metadata (514) for the first program, namely programA at entry1 (516A) and extract the value "123876" (see entry4 (522A)) of the encrypted checksum (522) and using the copy of copy of the computer security key, the Copy-of-copy of first security key (171) decrypt "123876" (see entry4 (522A)) deriving the decrypted checksum. Also using the copy of copy of the computer security key, the Copy-of-copy of first security key (171) to decrypt the first program, namely programA at entry1 (516A) which is encrypted, deriving a "decrypted first program," programA.

Then producing a checksum of the "decrypted the first program," namely programA deriving "the checksum of the unencrypted first program," programA. And checking "the checksum of the unencrypted first program," programA with the "decrypted checksum." But the two checksums will not match because the computer malware second program, namely programB (see entry13 (516C)) or the second file, namely FileB at entry19 (516D), is attached to the good first program, namely programA at entry1 (516A). Since the check sum was taken from the original first program, namely programA at entry1 (516A) before encryption and without the presence of the malware program, second program, namely programB (see entry13 (516C)) or the second file, namely FileB at entry19 (516D).

Thus, the Software Driver (168) communicates (see the eighth double-headed arrow line (747)) with the application programming interface (700) notifying it that first program, programA at entry1 (516A) is contaminated and the application programming interface (700) notifies (see the sixth double-headed arrow line (770)) the user at the User Interface (760) where the infected file is located. And the Software Driver (168) stops the execution of the contaminated first program, namely programA at entry1 (516A).

The files and programs using the embodiments described herein could be encrypted or all files and programs using these embodiments cannot be encrypted. It won't matter one way of the other. When the file or program checksum are encrypted and stored in the file's metadata, security is ensured by having the Software Driver (168) check the decrypted checksum against a checksum of the decrypted program or file. When there is no match, then the software driver stops the execution of the infected program, or if it is a file, the software driver marks the file as compromised, and then notifies the user at the user interface.

Using the checksum in this manner will also be successful in stopping the execution of computer malware that had previously been unwittingly introduced into the computer, Computer (158). As an example, assuming that a user unwittingly downloads a file and the file is computer malware. The downloaded malware will lack the encrypted checksum and other information which the Software Driver (168) expects to be present in the metadata of the downloaded program. The Software Driver (168) then halts the execution of the malware. The Software Driver (168) then notifies the application programming interface (700) of the failure to match what was expected, and the application programming interface (700) then notifies the user at user interface, User Interface (760).

The best way to ensure computer security is to prevent a program file from being infected in the first place. This is possible with preferred embodiments disclosed herein. Assuming that the second program, namely programB (see entry13 (516C)) is a computer malware. Further assuming that the second program, namely programB (see entry13 (516C)) and the second file, namely fileB (see entry19 (516D)) were installed at the same time being part of the same installation session, then both have the same Encrypted Installation Identification "ABCDE" (see FIG. 5C, entry15 (520C)) and entry11 (520D). Also, these are respectively marked as first Risk (see entry14 (518C)) and second Risk (see entry20 (518D)).

As explained, the Software Driver (168) is at a kernel level of the Operating System (174) and the Software Driver (168) intercepts input/output requests from the Operating System (174). At the runtime of the second program, namely programB (see entry13 (516C)), the Software Driver (168) uses the information present in the second metadata (510) for the second program, namely programB (see entry13 (516C)) and Fourth Metadata (560) for the second file, namely fileB (see entry19 (516D)) to determine how to control the behavior of the second program, namely programB (see entry13 (516C)).

The Software Driver (168) treats any software program and any file marked as "Risk" differently than those marked as "Safe." Programs and files marked as "Risk" may or may not be used for a malicious purpose, but since they are marked as "Risk," it is better that they run in a controlled environment, and this is exactly what the Software Driver (168) does.

When the Operating System (174) receives a request for a program execution, the Operating System (174) passes the request to the Software Driver (168). As part of the request, information about the program, which is to be executed, is revealed to the Software Driver (168). As the program is being executed, and the actions of the executed program to read, write, open and create a file are also revealed (exposed) to the Software Driver (168). For example, assuming that the second program, namely programB (see entry13 (516C)) is running and the second program, namely programB (see entry31 (516C)) initiates a request to open, or read, or write to the second file, namely fileB (see entry19 (516D)), these actions are made available to the Software Driver (168). Assuming that second program, namely programB (see entry13 (516C)) is opening the second file, namely fileB (see entry19 (516D)). The open request from second program, namely programB (see entry13 (516C)) to open the second file, namely fileB (see entry19 (516D)) is passed to the Software Driver (168) so that the Software Driver (168) could perform checking operations prior to implementing the open request.

Assuming that the Software Driver (168) receives a request from the Operating System (174) to prepare the second program, namely programB (see entry13 (516C)) for execution, and once the Software Driver (168) reads the second metadata (510) of the second program, namely programB (see entry13 (516C)) and verifies that the second program, namely programB (see entry13 (516C)) is marked as "Risk" (see entry14 (518C)), the Software Driver (168) then controls the actions of the second program, namely programB (see entry13 (516C)). Also, assuming that the second program, namely programB (see entry13 (516C)) initiates a request to open the second file, namely fileB (see entry19 (516D)), and once the Software Driver (168) using the copy of copy of the computer security key, the Copy-of-copy of first security key (171) decrypts the Encrypted Installation Identification (520) which has the value of "ABCDE" (see entry21 (520D)) deriving an unencrypted installation identification, in our explanation the derived unencrypted installation identification has the value of "123". Then the Software Driver (168) then verifies that the second file, namely fileB (see entry19 (516D)) is part of the same installation session as the second program, namely programB (see entry13 (516C)) by verifying that the Encrypted Installation Identification (520) with the value of "ABCDE" and once decrypted the decrypted value is "123" for both, then the Software Driver (168) opens the second file, namely fileB (see entry19 (516D)).

Again, assuming that the risk program, the second program, namely programB (see entry13 (516C)), tries to open the first file, namely fileA at entry7 (516B) (or tries to open the first program, namely programA at entry1 (516A)), or tries to execute programA at entry1 (516A)), and after the Software Driver (168) using the copy of copy of the computer security key, the Copy-of-copy of first security key (171) decrypts the Encrypted Installation Identification (520) which has the value of "12345" (see entry9 (520B)), then deriving an unencrypted installation identification, in our explanation the derived unencrypted installation identification has the value of "xyz". Then the Software Driver (168) verifies that the first file, namely fileA at entry7 (516B) has at the decrypted value of "xyz", then the Software Driver (168) knows that the second program, namely programB (see entry13 (516C)) is marked "Risk" (entry 14 (518C))

and is trying to open a file which belongs to another group of installed files. The Software Driver (168) then halts or stops the execution of the second program, namely programB (see entry13 (516C)) and communicates (see the eighth double-headed arrow line (747)) with the application programming interface (700) and application programming interface (700) communicates (see the sixth double-headed arrow line (770)) with the User Interface (760) informing the user at the User Interface (760) that the second program, namely programB (see entry13 (516C)) is misbehaving and ask the user for an action to take.

The Encrypted Installation Identification (520) for the First Metadata (514), and for the Third Metadata (550), and for the Second Metadata (510), and for the Fourth Metadata (560) are illustrates as encrypted because if they're not, a malware may be able to copy the entry for Encrypted Installation Identification (520) and write the entry in itself of in the files/programs the malware intends to inject into a valid software.

Basically, the preferred embodiments could be implemented where a program marked as "Risk," referred to as a risk program, is not allowed to perform any input, or output, or read operation in a file which is not part of the files to which the risk program is a member as indicated by the common identification at the Encrypted Installation Identification (520). Also a program marked as "Risk" will not be allowed to execute other programs in the computer (e.g. the computer, Computer (158)).

But, If the second program, namely programB (see entry13 (516C)) marked as "Risk" creates a new file, e.g. "FileBB," the metadata of the FileBB will also have "ABCDE" as an identification at the Encrypted Installation Identification (520) and the second program, namely programB (see entry13 (516C)) is able to perform any input and output operation in the fileBB it created just like the second program, namely programB (see entry13 (516C)) is able to perform any input or output operation in the second file, namely fileB (see entry19 (516D)), which was installed at the same installation session "ABCDE" (see entry15 (520C)). A program marked as "Risk" is able to perform any input output operations in any file which is installed in the same installation session to which the risk program was installed, and also able to perform any input and output operation in any file the risk program creates, and also to perform any operation to specific files or specific type of files which is part of the Encrypted Input List (680), and the Encrypted Input List (680) explicitly stating the operations that the second program, namely programB (see entry13 (516C)) can perform.

The mechanism just presented for dealing with the files deemed "Risk" is but one way of implementing the preferred embodiments. Instead of simply placing limitations where a program classified as "Risk" is only able to perform an input and output in files which the program was part of the installation session or to a file the program created, a new mechanism will be present next which could be used alone or in conjunction to the prior method.

When the Software Driver (168) receives a request (see the second double-headed arrow line (178)) from the Operating System (174) to execute the second program, namely programB (see entry13 (516C)), the Software Driver (168) verifies that the second program, namely programB (see entry13 (516C)) is classified as "Risk" (see entry14 (518C)), the Software Driver (168) reads (ninth double-headed arrow line (785)), the Encrypted Input List (680), and the Encrypted Input List (680) contains amongst other information, the file extensions that programs classified as "Risk" cannot open. The file extension could be any kind of file that if the file is modified or executed by a risk program or by a program name in the input list, then such execution would place the security of the computer, Computer (158) at risk. As an example, for MICROSOFT WINDOWS the file extensions could be: ."bat", ."sys", ."exe,"."asp"," ."aspx", and many other file types that could be executed or interpreted or data or program stored into like a database or a word processing file that could be executed or interpreted.

Assuming that the first file, namely fileA at entry7 (516B) has an extension of ."txt" ("fileA.txt"). Once the Software Driver (168) verifies that the extension ."txt" is not in the Encrypted Input List (680), then the Software Driver (168) allows the second program, namely programB (see entry13 (516C)) to control input and output operations to the first file, namely fileA at entry6 (516B) even though the second program, namely programB (see entry13 (516C)) is classified as "Risk" (see entry14 (518C)) and the first file, namely fileA at entry7 (516B) was not part of the same installation session as the second program, namely programB (see entry13 (516C)) was.

Again, assuming that the first file, namely fileA at entry6 (516B) has an extension of."asp" ("fileA.asp") which is an executable file. Once the Software Driver (168) verifies that the extension ."asp" is in the Encrypted Input List (680), then the Software Driver (168) prevents the second program, namely programB (see entry13 (516C)) from performing any action on the first file, namely fileA at entry7 (516B), and using the mechanisms already described, notifies a user at the User Interface (760).

The metadata of a file may be used for any purpose which will enhance the file's handling by a computer program. In the examples with the use of the software driver, (e.g. Software Driver (168)), the file's metadata is used to enhance the protection of the computer which the software driver is installed thereto (e.g. the computer, Computer (158)). The Software Driver (168) retrieves (see the third single-headed arrow line (172) FIG. 1B) the copy of copy of the computer security key, the Copy-of-copy of first security key (171) FIG. 1B, and uses if for encryption of software installed in the computer, Computer (158) and for decrypting encrypted software of the computer, Computer (158) at the runtime of the encrypted software.

The Software Driver (168) may also use the copy of copy of the computer security key, the Copy-of-copy of first security key (171) FIG. 1B to encrypt/decrypt another network security key and the network security key is used to be encrypt/decrypt software and data in the computer, Computer (158). This method will be explained once FIG. 12 and FIG. 13 are full evaluated.

In the arsenal of computer hacking, malware is one of the most used tool hackers use to gain illegal entry into a computer. And once computer security is breached, the hacker has many ways to use the malware to harm the computer and to cause losses to users of the computer. Such harms include the logging of the computer's key stokes, accessing a network card in the computer, gaining a higher level of access in the computer, and encrypting the computer and ask for a ransom.

Indifferent of the technique used, malware from a hacker uses computer instructions, which once executed by the central processing unit of the computer, take over some aspect of the operation of the computer. This causes the computer to behave in ways not intended by the user of the computer. As an example, an assembly language code for reading a keystroke on an INTEL based computer involves getting the pressed key with the following instruction "int 16h." The same applies to reading or writing to a network board. For each operation in the computer, there is one or more well-known assembly instruction which once executed enables a software program to access the device, be it a computer keyboard, a computer network card, a computer wireless device, a computer hard drive, etc.

As an example, for a program to be able to access a network card, the program needs to first create a mechanism which will allow the program to access TCP/IP Raw Sockets, MICROSOFT WINDOWS calls it Winsock. The application accessing the Winsock would typically: create a socket of type SOCK_RAW; call the socket or WSASocket function with the parameter (address family) set to AF_INET or AF_INET6; the type parameter set to SOCK_RAW; and set the protocol parameter to the protocol number required.

It is possible to offer a deeper protection to the computer, Computer (158) by inserting interrupts into the body of the risk second program, namely programB (see entry13 (516C)), at the time of loading the second program, namely programB (see entry13 (516C)) in the random access memory, the computer's RAM (169) or at a time of saving the second program, namely programB (see entry13 (516C)) at the installation time in the first non-transitory computer storage medium, Permanent Storage Medium (1240) of the computer, Computer (158).

The Operating System (174) or the Software Driver (168) will access the risk second program, namely programB (see entry13 (516C)), when saving this risk program at its installation time or when the Software Driver (168) loads (see the second double-headed arrow line (178)) the second program, namely programB (see entry13 (516C)) in the random access memory, the computer's RAM (169) at runtime. All that the Operating System (174) or the Software Driver (168) will need to do is to scan the risk program, to wit, the second program, namely programB (see entry13 (516C)), for the occurrences of any code that reads a keyboard keystroke, or for the occurrences of code which accesses a network card, or the occurrences of code which accesses any part of the computer which, if accessed by a malicious program, the security of the computer, Computer (158) is compromised.

When the Operating System (174) initiates the execution (see the second double-headed arrow line (178)) of the Software Driver (168), the Software Driver (168) requests (see the second double-headed arrow line (178)) the Operating System (174) to launch a child process. The Operating System (174) then launches (see the fifteenth single-headed arrow line (715)) the child process (720). What is unique in the preferred embodiment is the way that the Operating System (174) of the preferred embodiment works.

Assume that the child process (720) is not a trusted process and is marked as "Risk." Further assume that the Operating System (174) receives a request for the execution of the risk second program, namely programB (see entry13 (516C)). Then, the Operating System (174) passes the request to the Software Driver (168). The Software Driver (168) in turn retrieves the second program, namely programB (see entry13 (516C)) from the non-transitory computer readable medium of the computer, Computer (158). The Software Driver (168) then loads (see the thirteenth single-headed arrow line (727)) the second program, namely programB (see entry13 (516C)) into the random access memory, the computer's RAM (169) as a child process (720), as shown in FIG. 7. The child process (720) has the codeA (730) and it is the actual code of the risk program. Referring to FIG. 7, an interrupt (740) is shown after the codeA (730) and before codeB (750) which also is the actual code of the risk program, programB (see entry13 (516C)). The codeB (750) could be a code to read the keyboard keystroke ("int 16h") of the computer, Computer (158), or the codeB (750) could be code to access a network card (SOCK_RAW, or WSASocket function with the parameter (address family) set to AF_INET or AF_INET6) of the computer, Computer (158).

The exemplary code presented here, e.g. "int 16h" and the others, are in in a programming format, but the actual code in the executable file would normally be in a binary format. Also, the binary format, or if the program is interpreted, the actual code could be in the Encrypted Input List (680) and the Software Driver (168) using the Encrypted Input List (680) as input would scan for the occurrences of the executable code comparing the executable code (binary format) of the risk second program, namely programB (see entry13 (516C)), with the executable code snippet in the Encrypted Input List (680) and once a snippet of the executable code is found, the Operating System (174) or the Software Driver (168) would then insert the interrupt (740) before the occurrence of the snippet executable code in the executable code of the risk program.

The interrupt (740) may invoke a reference to a software routing in the application programming interface (700) or it may call a software routine in the Software Driver (168). In the above example, control is transferred to the application programming interface (700). Once the child process (720) which is the code for the risk second program, namely programB (see entry13 (516C)), is executed by the central processing unit (162) and the central processing unit (162) comes to the interrupt (740), the central processing unit (162) transfers control (see the seventh double-headed arrow line (745)) to the appropriate routine in the application programming interface (700).

The application programming interface (700) then contacts (see the sixth double-headed arrow line (770)) the User Interface (760) and informs the user at the User Interface (760) regarding the action, e.g. an attempt to read the keyboard keystrokes (the codeB (750)), which the risk second program, namely programB (see entry13 (516C)), running as the child process (720) is about to perform, and ask for the user to permit or not to permit the child process (720) to perform the next action, e.g. to read the keyboard keystrokes.

If the user responds with an "okay" to proceed, the application programming interface (700) returns the flow (see the seventh double-headed arrow line (745)) to the interrupt (740) and central processing unit (162) of the computer, Computer (158) proceeds executing the code after the interrupt (740) and the keyboard keystrokes are read, codeB (750). If on the other hand, the user responds with a "not okay," then the application programming interface (700) communicates (see the ninth single-headed arrow line (749)) with the Software Driver (168) to notify the Software Driver (168) about the impending action by the child process (720). Then, the Software Driver (168) terminates (see the thirteenth single-headed arrow line (727)) the child process (720). This termination disables the risk second program, namely programB (see entry13 (516C)), which is running as the child process (720) and precludes causing any harm to the computer, Computer (158).

The preferred embodiment could alternatively be implemented by the Operating System (174) or the Software Driver (168) while scanning the executable code of the risk second program, namely programB (see entry13 (516C)), and when discovering compromising code, namely codeB (750), simply disables the risk second program, namely programB (see entry13 (516C)), from further action in the computer, Computer (158) and then notifies the user at the User Interface (760). This action could be taken before the runtime or at the installation time of the risk second program, namely programB (see entry13 (516C)).

The application programming interface (700) could be accessed by any program which may need to use the security protocols of the preferred embodiments. The User Interface (760) is responsible to interfacing with a user in the preferred embodiment. So, any program could call the application programming interface (700). The software driver user (790) which could be any software, such as, for example: a software driver, a web browser, a database program, etc.

Assuming that the software driver user (790) interfaces with a hardware device, which needs to use the preferred embodiment for encryption and decryption. The software driver user (790) could invoke a driver working in conjunction with web platforms like."NET" or "JAVA." The software driver user (790) would intercept calls for the web platform and using the mechanism taught in this disclosure, encrypt and decrypt website program files and binaries for stopping website malware code execution, such as, for example, a cross-site attack. A cross-site attack happens once an attacker tricks the victim website to download a file with malware code from the attacker's site thus compromising the victim's website, and in many cases altering the website or stealing data.

Assuming that the software driver user (790) is a database driver. Once data is to be stored in the database, the database passes the un-encrypted data to the software driver user (790). Then, the software driver user (790) passes (eleventh single-headed arrow line (787)) to the application programming interface (700) and the application programming interface (700) passes (see the eighth double-headed arrow line (747)) the un-encrypted data to the Software Driver (168). Then, the Software Driver (168) using the copy of copy of the computer security key, the Copy-of-copy of first security key (171) encrypts the un-encrypted data to produce the encrypted data. Then, the Software Driver (168) returns (see the eighth double-head arrow line (747)) the encrypted data to the application programming interface (700). Then, the application programming interface (700) returns (see the twelfth single-headed arrow line (789)) the encrypted data to the software driver user (790) and the software driver user (790) passes the encrypted data to the database. To decrypt the encrypted data, the same process occurs in reverse, except the software driver user (790) passes (eleventh single-headed arrow line (787)) encrypted data to the application programming interface (700) and receives (twelfth single-headed arrow line (789)) unencrypted data.

It is within the scope of the preferred embodiment to encrypt and decrypt files created by a risk second program, namely programB (see entry13 (516C)). Once the risk program creates a file, the Software Driver (168) using the copy of copy of the computer security key, the Copy-of-copy of first security key (171) encrypts the contents of the files under the control of the risk program. Then, the Software Driver (168) saves the encrypted version of the file. When needed, the Software Driver (168) decrypts the encrypted version producing a decrypted version before the risk program uses the file. By doing such implementation, if the risk program, programB (see entry13 (516C)), creates a file to be transmitted at a later time to a malicious computer (the hacker's computer), then the file so transmitted would be encrypted and its contents not known to the receiver. This process would disable a keylogging program's ability to spy on the computer, because such malware logs the keyboard pressed keys in a file then transmits the file to the malicious computer.

One of the many ways a hacker hacks a computer is by finding a flaw in a program running in the computer; or by tricking a user in the computer to click in a malicious program, like a computer virus; or opening a macro (a code part of a document file and is used in the MICROSOFT products); or many other available means the hacker will use to get into the computer. Indifferent the way the hacker uses to get into the computer, many times the hacker will run programs stored in the computer (e.g. script program), or program/s part of the computer's operating system (e.g. a task manager program and others).

In the MICROSOFT WINDOWS operating system, one such program is the cmd.exe (797), also called: Windows Command Processor. The cmd.exe enables a user accessing the computer to run any king of command in the computer, and including initiating the execution of another program in the computer. Programs like cmd.exe are critical for the operation of the computer and the computer's operating system. Once a hacker is able to hack the computer and run the Windows Command Processor, the hacker's computer acts as a remote terminal to the hacked computer.

Since programs like the cmd.exe (797) is part of the operating system, they are not encrypted, and once a hacker using one of the many available means to hack into a computer gets to the operating system level, then the hacker is able to initiate the execution (locally or remotely) of such program and assume control of the operating system and the computer which the operating system is running thereto.

For instance, once a hacker finds a flaw in a program running the in the computer, the hacker remotely injects code into the running program (also called, running process) and in many situations, the hacker will escalate the attack by opening a back door to the hacked computer and remotely execute programs in the hacked computer (e.g. cme.exe) and other hacker supplied programs, e.g. script code. The reason that a hacker is able to take such control of the computer is because the computer doesn't have any way of differentiating who is using the computer, a hacker or a legit user (e.g. an administrator).

As illustrated in the embodiment, at the User Interface (760), there is a login, System_1 Login (761), and the login, System_1 Login (761) is interfaced (see FIG. 7, fifth double-headed arrow line (762)) with the Software Driver (168). The login, System_1 Login (761) is not associated with the Operating System (174), like, the regular login that the Operating System (174) already provides for a user to login.

The login, System_1 Login (761) is a second login mechanism directly associated with the Software Driver (168). The exemplary explanation given herein for FIG. 7 does not include the user's credential, like a user's password stored in the computer, Computer (158), but it is obvious to those skilled in the art that to be able to login in a computer, a user's password is required.

A file, like the Encrypted Input List (680), can be used with a list of files (e.g. document.docx), programs (e.g. the cmd.exe (797)), or program's extensions (e.g. ."exe", ."bat", ."com", etc.). And once a request from the Operating System (174) arrives at the Software Driver (168) to execute a program (e.g. the cmd.exe (797)), the software driver decrypts the Encrypted Input List (680) deriving a decrypted input list, then the Software Driver (168) scans the decrypted input list for a reference of the cmd.exe (797) (e.g. the name 'cmd.exe'), and if the cmd.exe is found. The Software Driver (168) will only allow the cmd.exe (797) to be executed (see FIG. 7, fifteenth single-headed arrow line (715)) if an authorized user is logged in (e.g. User_ID_C1 (723)) into the computer, Computer (158).

If a legit user is logged in through the login, System_1 Login (761), then the Software Driver (168) proceeds and fetches the program (see FIG. 7, fifteenth single-headed arrow line (715)) the cmd.exe (797) and passes (second double-headed arrow line (178)) the of the cmd.exe (797) to the Operating System (174). Then the Operating System (174) loads the received code of the passes cmd.exe (797) into the random access memory, the computer's RAM (169) of the computer, Computer (158). And the program the cmd.exe (797) gets executed by the central processing unit (162) of the computer, Computer (158).

If an authorized user is not logged in, the Software Driver (168) using the User Interface (760), optionally request (see FIG. 7, fifth double-headed arrow line (762)) a user at the login, System_1 Login (761) to login. If the user logs in with the correct credentials, as already described, the Software Driver (168) proceeds with the execution of the cmd.exe (797). If a proper credentials cannot be provided, the Software Driver (168) denies the execution of the program the cmd.exe (797).

If a class of file extensions (e.g. ."bat") is present in the Encrypted Input List (680), then once any file with the extension ."bat" is request for execution, the Software Driver (168) using the just described mechanism will allow or deny the execution of all files with the extension ."bat." If a file name (e.g. 'documenta.docx') is present in the Encrypted Input List (680), then once a request to open the file documenta.docx arrives in the Software Driver (168), the Software Driver (168) using the just described mechanism, opens or denies the opening of the file documenta.docx.

Assuming that a hacker using any of the many methods available, hacks the computer, Computer (158) and tries to run the program the cmd.exe (797). Since a secondary login, the login, System_1 Login (761) exists and is associated with the Software Driver (168), and since a legit user is not logged in into the computer, Computer (158) through the secondary login, the login, System_1 Login (761). The Software Driver (168) requests the hacker for a login credentials, and since the hacker is not able to provide, the Software Driver (168) halts the hacker's access to the computer, Computer (158) and notifies the computer user and/or network administrator of the break in. The invention can be implemented where if a legit user is not logged in, the Software Driver (168) halts execution or access to a file without requesting for a login.

Multiple Security Keys

Figure 8:
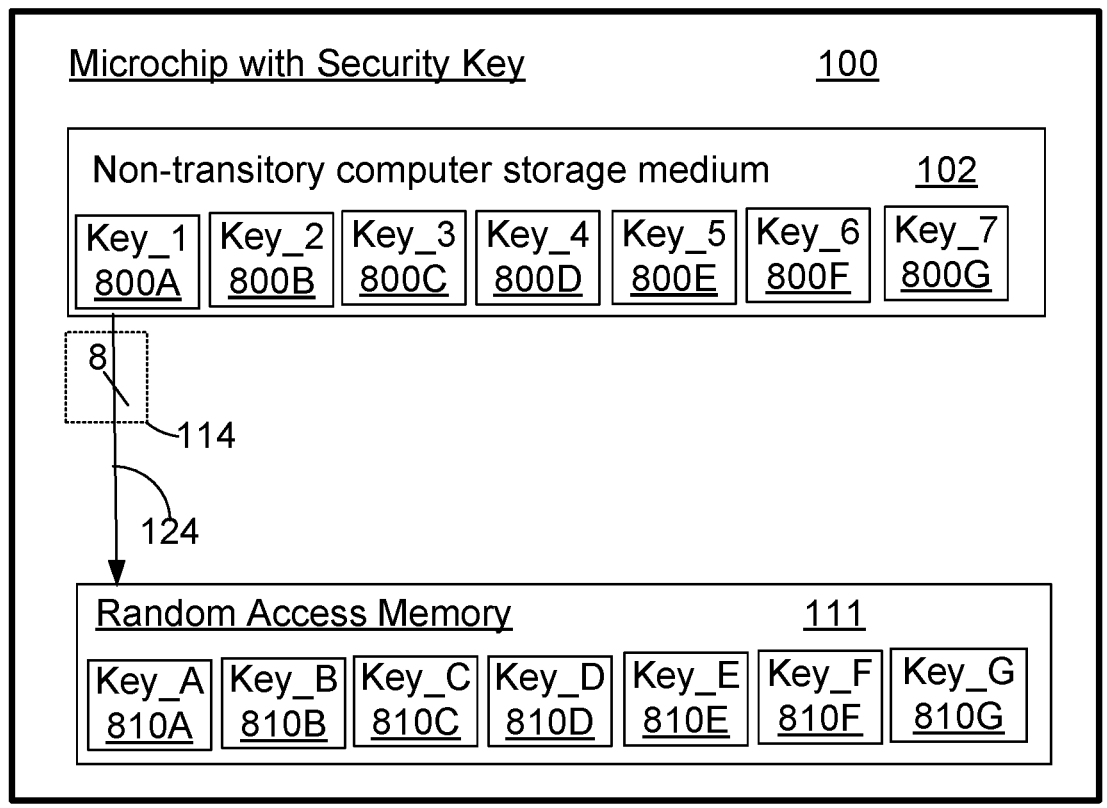
FIG. 8 illustrates the storing of multiple keys in the microchip with security key of FIG. 1 and FIG. 2.

FIG. 8 and FIG. 9 illustrate the microchip storing a plurality of security keys. The number of security keys that could be stored in the device (100), also referred to as the microchip with security key, is practically unlimited. As an example, a first security key, namely key_AC (820A), comprises Key_A (810A) and Key_B (810B). A second security key, namely key_BC (820B), comprises Key_B (810B) and Key_C (810C). A third security key, namely key_CC (820C), comprises Key_D (810D), Key_E (810E), Key_F (810F) and Key_G (810G). These security keys may have other byte-values stored in the non-transitory computer storage medium (102) of the microchip with security key.

FIG. 8 illustrates a group of seven bytes stored in the non-transitory computer storage medium (102): Key_1 (800A), Key_2 (800B), Key_3 (800C), Key_4 (800D), Key_5 (800E), Key_6 (800F) and Key_7 (800G). And seven keys for the random access memory (111): Key_A (810A), Key_B (810B), Key_C (810C), Key_D (810D), Key_E (810E), Key_F (810F) and Key_G (810G). And as explained before, the bytes from the non-transitory computer storage medium (102) are transferred to the random access memory (111) through the eight lines (see first box (114)) of the first internal transport line (124).

Key_1 (800A) is transferred to Key_A (810A); Key_2 (800B) is transferred to Key_B (810B); Key_3 (800C) is transferred to Key_C (810C); Key_4 (800D) is transferred to Key_D (810D); Key_5 (800E) is transferred to Key_E (810E); Key_6 (800F) is transferred to Key_F (810F); and Key_7 (800G) is transferred to Key_G (810G). In the example given, the second internal transport lines (163) (FIG. 1 and FIG. 2) would have three lines in terms to address both chips: the non-transitory computer storage medium (102) and the random access memory (111).

These security keys may be used for any purpose as specified by the Software Driver (168) or an authorized software running in the computer, Computer (158). One or more may be used for encryption while another may be used to identify the device (100), i.e. the microchip to the security key, such as, for example, a serial number or any other means of identification for the computer, Computer (158) where the microchip with security key is hosted.

The same explanation as was given above with respect to FIG. 1 and FIG. 2, applies with respect to FIG. 8 and FIG. 9. The same process for transferring the keys from the non-transitory computer storage medium (102) to random access memory (111) applies, as well as from the random access memory (111) to the random access memory, the computer's RAM (169). Therefore, these explanations are not repeated here.

FIG. 9 illustrates the process wherein copied keys from the microchip with security key are saved to the random access memory, the computer's RAM (169) of the computer, Computer (158). Once each byte is copied and stored in the random access memory, the computer's RAM (169), it is up to the Software Driver (168) to manage how the copied bytes and which ones will be part of one security key and which other ones will be part of another security key. The Software Driver (168) could use the same byte in more than one security key, or the Software Driver (168) could use a byte for only one security key.

Protecting Computer Folders and Files

In a server computer, many different users are authorized to access the server computer's resources, such as files and execute programs. Thus, there is preferably program code that limits each user to specific areas, such as a folder that holds a number of files, otherwise the security of the computer could easily be compromised.

As an example, if any user is allowed to see a file with the passwords and user' identifications stored in the server, the server would become a worthless machine. If one user is allowed to view another user's private documents, the security of the user's files could easily be compromised.

To accommodate such security requirements, a security policy is enforced. Security policy works fine if the organization is small, but once the organization grows, enforcing such security policy could become a costly nightmare. It is preferable to have a security system that is indifferent of the size of the organization, especially when internal security policy in an organization is not able to stop outsiders, like a hacker, from accessing or stealing sensitive files and data. These kinds of successful attacks by outside hackers happen quite often and resulting in large financial and privacy losses and great embarrassment for the hacked organization.

Currently, such policy is enforced by assigned a particular user a right to access a folder or a file by specifically setting the user into the file's or folder's metadata. But this mechanism is hard to implement, since someone within the organization, an administrator for instance, will have to constantly set such security policies to every file or folder in the computer. Further, the currently in use mechanism doesn't allow specific right or rights to be assigned to a group of users, it has to be assigned to individual user to all files and/or folders the user is allowed to access.

An easier, better and safer way of protecting folders and files in an organization is by having the security implemented at the operating system level, and with the use of preferred embodiment of FIG. 1, FIG. 2, FIG. 8 and FIG. 9, such implementation is done automatically by the Software Driver (168). Once a request to open, or to execute, or to save a file arrives at the Operating System (174), then the Operating System (174) passes the request to the Software Driver (168). The Software Driver (168) then loads the Encrypted Input List (680), or any other file containing the user-group and encryption keys (will be explained shortly), or any file for the same purpose. Then, the Software Driver (168) automatically, responding to commands, encrypts and decrypts files as per a pre-set organizational security policy.

While the Software Driver (168) applies the organization's rules which are found in the Encrypted Input List (680) or another file, the Software Driver (168) using the copy of copy of the computer security key, the Copy-of-copy of first security key (171), encrypts the rules, deriving encrypted rules, then saves the encrypted rules, or a group of encrypted rules in the Encrypted Input List (680). It is important that the Encrypted Input List (680) rules be saved as encrypted rule/s to prevent a non-authorized user, or a hacker, or a non-authorized program from changing the rules in the Encrypted Input List (680).

FIG. 10 illustrates a preferred embodiment where one or more user is assigned to a group and the group is assigned a security key. As an example, five groups are illustrated. Group_A (1000), Group_B (1010), Group_C (1020), Group_D (1030) and Group_E (1040).

Group_A (1000) has two assigned users: user-A (640A) and user-B (640B) and a first security key key_AC (820A) (FIG. 9) is assigned to the Group_A (1000).

Group_B (1010) has two assigned users as well: user-A (640A) and user-C (640C) and a second security key key_BC (820B) (FIG. 9) is assigned to the Group_B (1010).

Group_C (1020) has one assigned user: user-C (640C) and a third security key key_CC (820C) (FIG. 9) is assigned to the Group_C (1020).

Group_D (1030) has one assigned user: user-B (640B) and a fourth security key key_DC (820D) (FIG. 9) is assigned to the Group_D (1030).

Group_E (1040) has one assigned user: user-A (640A) and no key is assigned to the Group_E (1040).

FIG. 11 illustrates a file system used in a computer, such as for example, the computer, Computer (158). The file system starts with the root folder (1100). The root folder (1100) holds four other folders: High-Safety (1105), Median-Safety (1120), Low-Safety (1140) and Public (1150).

The High-Safety (1105) folder has file-A (1110) and is associated with Group_A (1000). The Group_A (1000) association with the High-Safety (1105) folder means that the file-A (1110) is encrypted with a security key, namely key_AC (820A), and that the only authorized users are allowed to access the High-Safety (1105) folder and the file-A (1110). These authorized users are user-A (640A) and user-B (640B).

When a request to open file-A (1110) arrives at the Operating System (174), the Operating System (174) passes the request to the Software Driver (168) along with the identification of the logged in user. If the identification is for user-A (640A) or user-B (640B), the Software Driver (168) uses the security key, key_AC (820A), to decrypt file-A (1110), deriving a decrypted file-A. The Software Driver (168) then passes the decrypted file-A to the Operating System (174). Any other user trying to access the file-A (1110) would be denied permission to access it.

With the just described mechanism and with the use of the secondary login, the login, System_1 Login (761), even if a file (e.g. the File-A (1110)) is not encrypted, the Software Driver (168) will still halts an access to the file (e.g. File-A (1110)) and the High-Safely (1105) folder from a non-authorized user. The encrypting of a file (e.g. File-A (1110)) with a security key (e.g. security Key_AC (820A)) is optional, but, for enhanced security, it is preferred that it be encrypted.

If the request received from the Operating System (174) is for saving file-A (1110), then the Software Driver (168) uses the security key, key_AC (820A), to encrypt file-A (1110), deriving an encrypted file-A. The Software Driver (168) then saves the encrypted file-A (1110). If a new file is added to the High-Safety (1105) folder, the same rules applies: The new added file would be encrypted with the security key, namely key_AC (820A), and only Group_A (1000) users: user-A (640A) and user-B (640B) would be authorized to access and make changes to the new file under the High-Safety (1105) folder.

The Median-Safety (1120) folder has two files: a File-B (1125) and a File-C (1130). The Median-Safety (1120) folder has Group_B (1010) assigned to itself and to all of its files, namely File-B (1125) and File-C (1130). But File-B (1125) has an extra group assigned to, namely Group_D (1030). File-B (1125) retains the user group, namely Group_D (1030) and the user group Group_B (1010) assigned to the Median-Safety (1120) folder. File-C (1130) and any other files which are created in the Median-Safety (1120) folder are subject to the rules that apply to Group_B (1010) only. This may be the case that File-B (1125) was in a different folder which the Group_D (1030) was assigned there to, or it may have been that the Group_D (1030) was assigned to File-B (1125) in addition to Group_B (1010). One or more groups can be assigned to a folder as well.

File-B (1125) is encoded with the use of an encryption key, namely Key_DC (820D). File-C (1130) is encoded with the use of another encryption key, namely Key_BC (820B). Again, the encrypting of the files within a folder is optional, but for enhanced security, is best that be encrypted.

When directed to read a file, the Software Driver (168) first reads the file's metadata and uses the group in the file metadata to apply the proper security key to encrypt and decrypt the file. When creating a new file, the Software Driver (168) uses the rules for the folder and saves the group information in the created file's metadata.

The same rules apply to folders: High-Safety (1105), Median-Safety (1120) folder and the Low-Safety (1140) folder. As for the Low-Safety (1140) folder and File-D (1145) only the rules for Group_C (1020) applies, and security Key_CC (820B) is used for encryption/decryption of File-D (1145).

The Public (1150) folder does not have a group associated with it, then it is available and could be accessed by any user and any user will be able to add, change of delete files in it. There is one exception to this rule for the Public (1150) folder: The file-E (1155) is associated with the Group_E (1040) and even though it is in the Public (1150) folder, it is subject to the rules for Group_E (1050).

File-F (1165) is public and any user can access it and perform any operation to it. File-G (1170) also can be accessed by any user but only in between the set date and time range, set by the Unencrypted Date Timeframe (1175A) which is the date and time range "11/11/2020-4:00AM-4: 30AM" (1175B). And once the date and time range "11/11/2020-4:00AM-4:30AM" (1175B) is saved in the first non-transitory computer storage medium, Permanent Storage Medium (1240) of the computer, Computer (158), the Software Driver (168) uses the copy of copy of the computer security key, the Copy-of-copy of first security key (171) and encrypts the date and time range or value "11/11/2020-4:00AM-4:30AM" (1175B) deriving the Encrypted Date Timeframe (1171A) having an encrypted date and time value (1171B).

As required for validation of a computer file or folder, the Software Driver (168) uses the copy of copy of the computer security key, also referred to as the Copy-of-copy of first security key (171), and decrypts the encrypted date and time value (1171B) of the Encrypted Date Timeframe (1171A) deriving an unencrypted date and timeframe value (1175B) "11/11/2020-4:00AM-4:30AM" of the Unencrypted Date Timeframe (1175A). Then the Software Driver (168) uses the unencrypted date and timeframe value (1175B), which is shown in FIG. 11 as "11/11/2020-4:00AM-4:30 AM" for the validation of the file or folder.

As illustrated, once the encrypted date and time value (1171B) is applied (see fortieth single-headed arrow line (1173)) to the High-Safety (1105) folder, all the rules for the Group_A (1000) are applied and also the encrypted date and time value (1171B). But authorized users: User-A (640A) and User-B (640B) only have access the High-Safety (1105) folder as set by the Unencrypted Date Timeframe (1175A), and it is, date: '11/11/2020' and in between the time: '4:00AM' and '4:30AM.' Any access at any other date and time would not be within the set Unencrypted Date Timeframe (1175A) and would be denied.

As seen in FIG. 10, Group_E (1040) does not have a security key associated with it and encryption/decryption will not be applied to Group_E (1040). So, the Software Driver (168) enforces the rights associated with Group_E (1040) but without doing any encryption/decryption. Thus, File-E (1155) is only available to User-A (640A). Other user rights may be assigned by the computer owner or by the network administrator. For example, such user rights might include: right to open and view the file, but not change it; right to view and change the file; right to view, change and delete the file; move the file to another folder; right to initiate the execution of the file, if the file is an executable program; copy the file to another folder; or any other right which may be needed to protect the file.

If any non-authorized user requests to access or alter the file, the Software Driver (168) intercepts the user's action and denies that non-authorized user such request, returning an error. This mechanism, which is an integral part of the Software Driver (168), enables an easy way of applying any applicable access right to any file or folder in the network or in a shared computer. The rules applied to a folder could be such that it could propagate to all sub-folders (child folders) or be confined to apply only in the parent folder.

Based on the group's rights stored, the login, System_1 Login (761), the Encrypted Input List (680) and the file metadata, the Software Driver (168) is available to enforce any rights to a file or a folder. For example, these rights might include rights relating to encryption/decryption of a file or folder, enforcement of which user has access to a file or folder, and which user may use the file or folder. This mechanism is very important to prevent the planting/installing of malware in the computer, remote hacking, and to inhibiting theft of proprietary data. As an example, a hacker overcomes a firewall and tries to install a malware in the computer enabled with a preferred embodiment. Since the hacker is not an authorized user, the Software Driver (168) automatically blocks the malware installation. In another example, if an authorized user tries to copy a file for which the user does not have a right to do so, the Software Driver (168) blocks such an attempt, preventing the copying of sensitive documents, thus preventing corporate spying.

A multiplicity of security keys having different purposes could be used to enhance security, since multiple security keys might enable the implementation of company's policies in addition to encryption/decryption of data, files, and authorized software programs. One good example, for instance, a security key is used to protect a database file, while another security key is used to protect specific database's record, or specific table, or specific database's column, or specific user's data, or specific user's file, etc. Also, the rules could be implemented where one security key used alone or associated with a group is used to encrypt specific file type (e.g. file with file extension ."docx") in specific folder, or group of specific files in specific group of folders, or specific file type in every folder, or specific for a user, etc. But it is within the scope of the disclosed invention that a single encryption/decryption key be used to encrypt/decrypt all files in the computer instead of multiple encryption/decryption keys.

As an example, assuming that the Group_A (1000) has only "read" authority assigned to it and the since Group_A (1000) is assigned to the High-Safety (1105) folder, then the only activity allowed with the file-A (1110) is to view the file, e.g. "read" and all other activities are forbidden. However, if user-A (640A) is a super user and had the right to "read," "move," "delete," and "save," the rights of the user-A (640A) override the "read" only authority of Group_A (1000) and the user-A (640A) is able to perform "read," "move," "delete," and "save" to a folder designated as High-Safety (1105) and all its folders, even though the Group_A (1000) only allows "read." A folder and a file can have none, one or more groups assigned to.

The rules can be combined with the rules described elsewhere for the cmd.exe (797), and they include the right to execute the cmd.exe (797), and only logged in and authorized users are able to initiate the execution of the program. Any other user initiating the execution of such program like the cmd.exe (797) even if they have assigned rights to the file, if not logged in, such rights are denied. For instance, assuming that the File-E (1155), which has Group_E (1040) assigned to, is cmd.exe (797). And Group_E (1040) has User-A (640A). Further assuming that User-A (640A) has rights to initiate execution of the File-E (1155), but if User-A (640A) is not logged in, the Software Driver (168) will deny the right for User-A (640A) to execute the File-E (1155) (e.g. cmd.exe (797)).

The rules could be set in any conceivable way and are not limited to the examples given herein. A rule may be specified to be applied to a parent-folder and all of its child-sub-folders, or just to the parent-folder. But, a child folder could also have its own set of rules, which would be specified to take precedence over the parent-folder's set of rules. Or, the rules could be applied to a parent-folder and all of its children-folders and a child-folder could add more rules to itself in addition to the rules of its parent-folders. For example, a rule could be applied to the root folder (1100) to be enforced on all of its children-folders, but then a child folder could add its own rules in addition to the root folder (1100).

It is important to notice that the rules of FIG. 10 is stored in the Encrypted Input List (680). The rules can be any of the described rules herein and including the rules already described using the login associated with the Software Driver (168) and the Encrypted Input List (680).

A rule could be based on date and time, such as, a website's folder or any folder or file in a computer may only be updated at specific time of the day and at specific day of the week or specific day and time of a month, etc. As illustrated in the Unencrypted Date Timeframe (1175A) applied to the file, File-G (1170). But again, the Unencrypted Date Timeframe (1175A) can be applied to any folder and as illustrated it is applied (see fortieth single-headed arrow line (1173) to the High-Safety (1105) folder. The Unencrypted Date Timeframe (1175A) will be one more way to protect the High-Safety (1105) folder in addition to the Group_A (1000) set of rules.

And as an example, if a website administrator needs to update a live website, then the website administrator may set the rules for the website folder setting a specific timeframe (date and start and end time) that the website will be updated and then the software driver using the security encryption/decryption key available encryption key in the computer, the software driver encrypts the timeframe deriving an encrypted timeframe. Then the software driver saves the encrypted timeframe in the encrypted input list.

Once the update arrives in the computer, the software driver using the security encryption/decryption decrypts the encrypted timeframe stored in the encrypted input list deriving a decrypted timeframe. Next, the software driver reads the date and time stored in the computer clock, and if the update is within the specified decrypted timeframe, then the software driver allows the update, if not, the software driver doesn't allow the update to take place.

With the just described mechanism, even if the website administrator does not change the rules and even if a hacker or an unauthorized person requests to perform any administrative task on the website, such requests would be denied, and the network administrator would be notified of such unauthorized request.

The example above would stop a cross-site hacker's attack and a remote code injection attack without increasing the website's security complexities. A cross-site attack happens when a flaw exists in the website's server which allows hacker to inject code into the website transport mechanism, like in the web-browser's bar or any other of the many forms. Once the hacker's injected code is processed by the website server, the code instructs the website server to download an executable file from the hacker's website or from the hacker's server, which upon such download would then infect the target website. Once completed, the hacker might then proceed to inject more code, which for example could instruct the website server to execute the hacker's file containing the harmful code at the infected website, and cause other harm to the infected website such as defacing the infected website, or stealing data, or wiping clean the website.

The explained mechanism of adding and removing and changing rules and enabling protection down to a user, folder, file, and file type level enables an organization to easily implement security to where it is needed most, namely in its permanent storage medium. The permanent storage medium of an organization is where most, if not all, of the organization's sensitive information is permanently stored, and in many cases, without the necessary protection. The preferred embodiment would enable security to be devised and be available at a higher level than is currently available without increasing complexities and costs.

The Software Driver (168) offers an additional security layer for a computer which currently is not available. For instance, a database program, a web-browser or any program would be able to communicate with the Software Driver (168) and pass data to be encrypted/decrypted and even specify which security key to user is acting. For instance, the Software Driver (168) could assign a specific security key to specific program and create a checksum of the key. Then, the Software Driver (168) could deliver the checksum to the program. Then, once the program needs data to be encrypted/decrypted, the program would send the checksum and the Software Driver (168) using the checksum would retrieve the correct security key and implement the needed encryption/decryption Network Encryption Key FIG. 12 and FIG. 13 illustrate a security key received from a network and the security key from the attached device is used to encrypt the received encryption key, then deriving an encrypted security key, and lastly, saving the encrypted key to the computer's non-transitory computer storage medium. Then, as needed. The computer fetching from the non-transitory computer storage medium the encrypted security key. And using the security key from the attached device decrypts the encrypted security key, deriving the un-encrypted key which is the original encryption key which was received from the network. Then using the decrypted key to encrypt/decrypt software, files, and contents in the computer.

FIG. 12 illustrates a second computer, Server Computer (1230) in communication with the computer, Computer (158), transmits a security key (see eleventh double-headed arrow line (1235)), which, once received by the computer, Computer (158), becomes the second security key, the Network Security Key (1210) of the computer, Computer (158).

Once the computer, the computer, Computer (158) receives the transmitted security key, Network Security Key (1210), the Software Driver (168) of the computer, the computer, Computer (158) uses the copy of copy of the computer security key, the Copy-of-copy of first security key (171) and encrypts (see sixteenth single-headed arrow line (1205)) the second security key of the computer, the Network Security Key (1210) deriving (see FIG. 12, seventeenth single-headed arrow line (1215)) the Encrypted Second Security Key (1220). Then, the Software Driver (168) saves (see FIG. 12, eighteenth single-headed arrow line (1245)) the Encrypted Second Security Key (1220) in the first non-transitory computer storage medium, which is also referred to in FIG. 12, as the Permanent Storage Medium (1240) of the computer, Computer (158).

At the runtime of the computer, Computer (158), the Software Driver (168) of the computer, Computer (158) retrieves (see twenty-first single-headed arrow line (1330)) from the first non-transitory computer storage medium, Permanent Storage Medium (1240) the Encrypted Second Security Key (1220), and using (see the nineteenth single-headed arrow line (1300)) the Copy-of-copy of first security key (171), the Software Driver (168) of the computer, Computer (158) decrypts the Encrypted Second Security Key (1220) deriving the Unencrypted Second Security Key (1320) (see twentieth single-headed arrow line (1310)). Thereafter, the Software Driver (168) of the computer, Computer (158) uses the Unencrypted Second Security Key (1320) to encrypt and decrypt data, file and software in the computer, Computer (158) the same ways the Software Driver (168) of the computer, Computer (158) uses the copy of copy of the computer security key, the Copy-of-copy of first security key (171) to encrypt and decrypt data, file and software as described throughout in this disclosure.

The Installation of Certified Software

The arrangements of FIG. 5A, FIG. 5B, FIG. 5C, FIG. 7, FIG. 12, FIG. 13, FIG. 14 and FIG. 15 can be used to implement software certification and it will be described now, please keep these figures handy.

As indicated by the first dashed double-headed arrow line (1465) the third computer, Certifying Server Computer (1400) may already have the computer security key, the Copy-of-copy of first security key (171) stored therein, or the third computer, Certifying Server Computer (1400) may request and receive through a secure connection (see twelfth double-headed arrow line (1460)) the computer security key, the Copy-of-copy of first security key (171) from the computer, Computer (158).

Once a software module or a file is ready for certification, then the third computer, Certifying Server Computer (1400) running (see twentieth-third single-headed arrow line (1431)) specialized software, Certifying Software (1433), then the Certifying Software (1433) uses an asymmetric encryption/decryption algorithm, Asymmetric Routine (1433A) to produce an Asymmetric Encryption key (1410) which includes a Private Key (1410A) that is associated with Public Key (1410B).

The Certifying Software (1433) retrieves (see twentieth-fourth single-headed arrow line (1425)) the file to be certified, File_A (1420) which is assumed to be saved on the second non-transitory computer storage medium, Certified Server Permanent Storage Medium (1470). Next, the Certifying Software (1433) executes a symmetric encryption/decryption algorithm, Asymmetric Routine which uses (see twentieth-second single-headed arrow line (1415)) the Private Key (1410A) to perform a checksum in the File_A (1420) deriving (see twentieth-fifth single-headed arrow arrow line (1430)) an Encrypted Certified File_A Checksum (1435), which is equivalent to the Encrypted Checksum (522).

The Certifying Software (1433) then saves (see twentieth-sixth single-headed arrow line (1440)) the Encrypted Certified File_A Checksum (1435) as metadata of the File_A (1420) deriving (see twentieth-seventh single-headed arrow line (1445)) a Certified File_A (1420A). Then the Certifying Software (1433) saves (see twentieth-eighth single-headed arrow line (1475)) the newly certified file, Certified File_A (1420A) which has the Encrypted Certified File_A Checksum (1435) in the metadata in the second non-transitory computer storage medium, Certified Server Permanent Storage Medium (1470). The Certifying Software (1433) also saves the Public Key (1410B) in the second non-transitory computer storage medium, Certified Server Permanent Storage Medium (1470). The Private Key (1410A) should not be stored anywhere, for security reasons it should be discarded.

Since to decrypt the encrypted checksum stored as metadata of the certified file was encrypted with the Private Key (1410A), only the Public Key (1410B) is needed, thus is best that the Private Key (1410A) is not saved to prevent it to be used at a later time to decrypted the encrypted checksum, change the certified file's content (inject a computer virus), then deriving a new checksum with a computer virus inserted into the certified file, then using the Private Key (1410A) to encrypt the newly derived checksum and save it into the newly certified file, which is not the original file, then saving the new file with the computer virus in the second non-transitory computer storage medium, Certified Server Permanent Storage Medium (1470), defeating the purpose of file/program certification. Thus, is best that the Private Key (1410A) be discarded.

Once, a user at the computer, Computer (158) initiates the installation program, Installer (764) which is part of the User Interface (760) at the computer, Computer (158). After the Installer (764) is initiated, the Installer (764) has programming code which uses the Computer Communication Port (798) of the computer, Computer (158) to open a communication channel (see twelfth double-headed arrow line (1460)) between the computer, Computer (158) and the third computer, Certifying Server Computer (1400). And, as part of the communication, the Installer (764) sends a request for the Certified File_A (1420A).

Once the third computer, Certifying Server Computer (1400) receives (see twelfth double-headed arrow line (1460)) the request from the computer, Computer (158). Then the third computer, Certifying Server Computer (1400) running software code, Programming Code_CS (1433B), and the Programming Code_CS (1433B) uses the computer security key, the Copy-of-copy of first security key (171) (see thirtieth single-headed arrow line (1450)) to encrypt (see thirtieth-first single-headed arrow line (1453)) the Public Key (1410B) deriving an Encrypted Public Key (1455).

Figure 14:
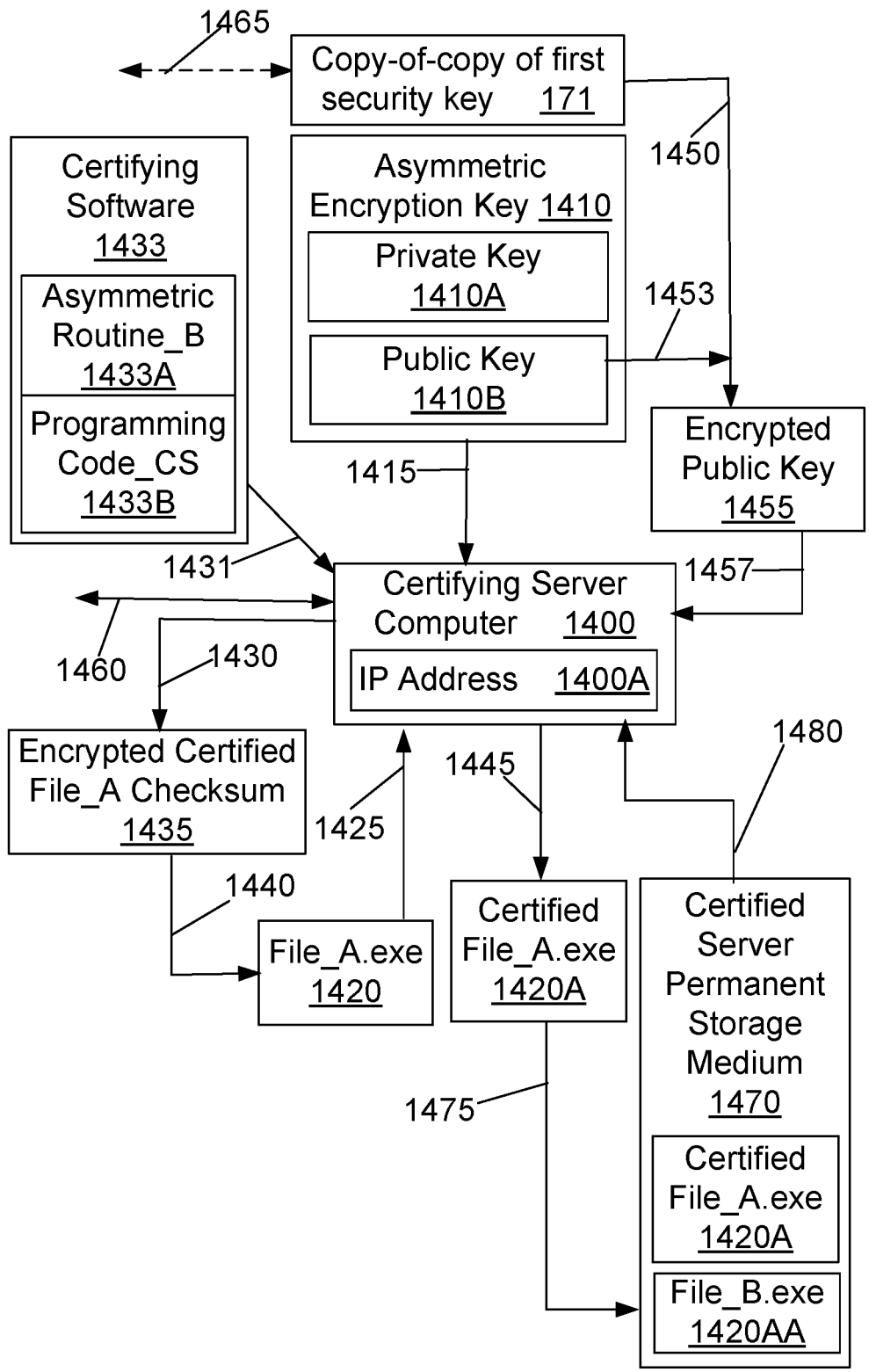
FIG. 14 illustrates the process for certified software.

Next, the Programming Code_CS (1433B) retrieves (see FIG. 14, twentieth-ninth single-headed arrow line (1480)) from the second non-transitory computer storage medium, Certified Server Permanent Storage Medium (1470) of the third computer, Certifying Server Computer (1400) the Certified File_A (1420A), then the Programming Code_CS Computer (1433B) instructs the third computer, Certifying Server Computer (1400) to transmit (see twelfth double-headed arrow line (1460)) the Encrypted Public Key (1455) and the Certified File_A (1420A) with the encrypted Certified File_A Checksum (1435) stored as metadata of the Certified File_A (1420A) to the computer, Computer (158).

Figure 15:
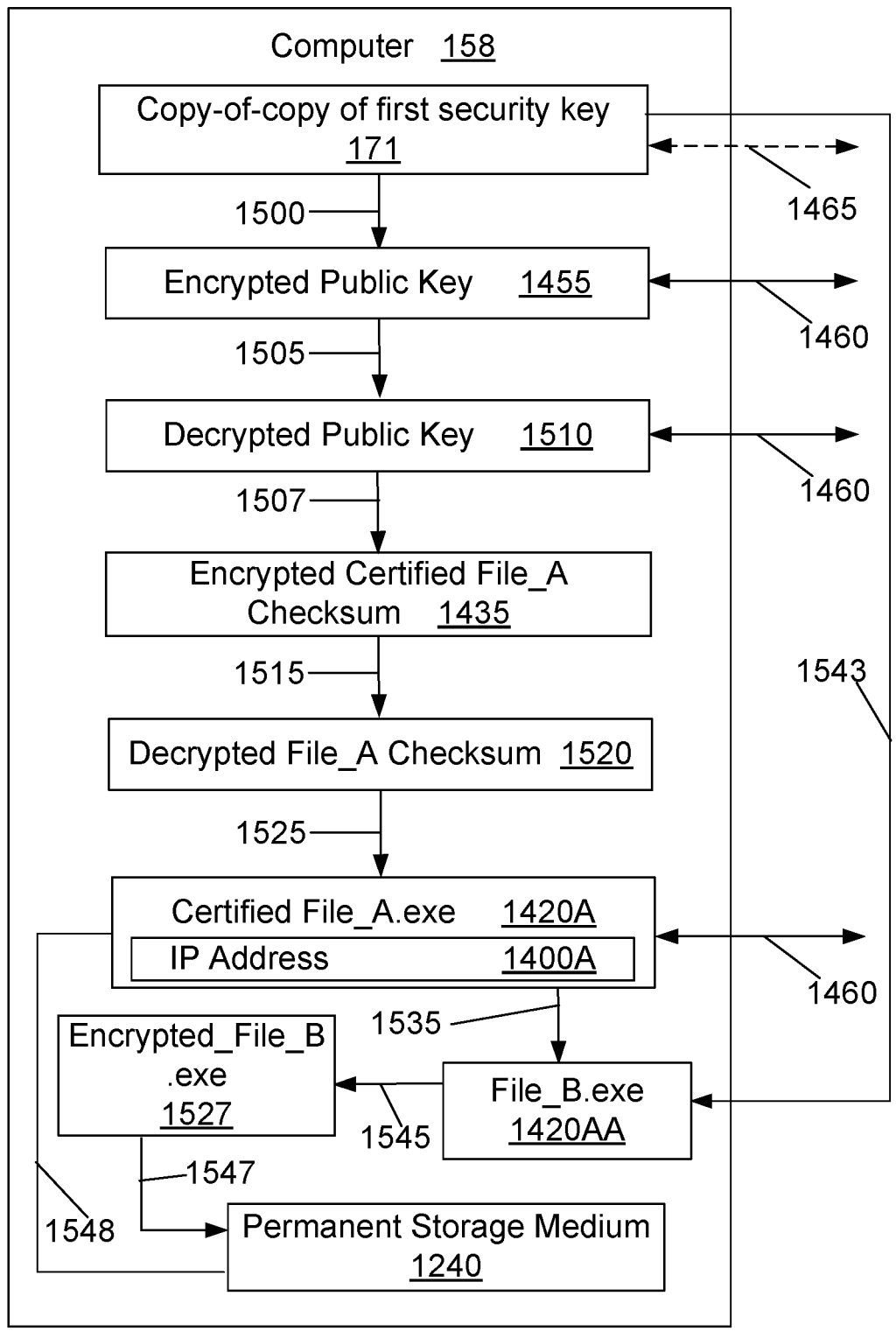
FIG. 15 illustrates the process for installing certified software without compromising the software integrity and without compromising the security of the computer.

Once the computer, Computer (158) receives (see twelfth double-headed arrow line (1460)) the Encrypted Public Key (1455), the computer, Computer (158) passes the received data (see FIG. 15, the Encrypted Public Key (1455), Certified File_A (1420A) and Certified File_A Checksum (1435) stored as metadata of the Certified File_A (1420A)) to the Installer (764).

The Installer (764) in communication (see tenth double-headed arrow line (767)) with the Software Driver (168) passes the received data and the installation request to the Software Driver (168) and the Software Driver (168) while processing the Programming Code (168A) retrieves (see third single-headed arrow line (172)) the computer security key, the Copy-of-copy of first security key (171).

Then the Software Driver (168) uses the computer security key, also referred to as the Copy-of-copy of first security key (171) (see thirtieth-third single-headed arrow line (1500)) to decrypt the Encrypted Public Key (1455) deriving (see thirtieth-fourth single-headed arrow line (1505)) a Decrypted Public Key (1510).

Next, the Software Driver (168) uses (see FIG. 15, thirtieth-fifth single-headed arrow line (1507)) the Decrypted Public Key (1510) and an asymmetric encryption/decryption algorithm's routine, Asymmetric Routine_A (168B) to decrypt the Encrypted Certified File_A Checksum (1435) deriving (see FIG. 15, thirtieth-sixth single-headed arrow line (1515)) a first checksum, Decrypted File_A Checksum (1520). The Software Driver (168) also perform a checksum in the received Certified File_A (1420A) deriving a second checksum, File_A Checksum (not shown).

Then the Software Driver (168) compares the first checksum, Decrypted File_A Checksum (1520) with the second checksum, File_A Checksum (not shown) and if a match is not present, the Software Driver (168) refuses to install the received Certified File_A (1420A). Thus, ending the operation without installing the received certified file.

If a match between the first checksum, Decrypted File_A Checksum (1520) and the second checksum, File_A Checksum (not shown) is present, then Software Driver (168) uses the Copy-of-copy of first security key (171) and encrypts the Decrypted File_A Checksum (1520) deriving (see thirtieth-seventh single-headed arrow line (1525)) the Encrypted Certified File_B Checksum (1530).

Then, the Software Driver (168) saves (see thirtieth-eight single-headed arrow line (1535)) the Encrypted Certified File_B Checksum (1530) in metadata of a new file called: Certified File_B (1540). Finally, the Software Driver (168) stores the Encrypted Certified File_B Checksum (1530) and the Certified File_B (1540) on the first non-transitory computer storage medium, Permanent Storage Medium (1240) of the computer, Computer (158). Thus, completing the process of file certification and the installing/saving of the certified file in the computer's non-transitory computer storage medium.

The Certified File_B (1540) stored/saved on the first non-transitory computer storage medium, Permanent Storage Medium (1240) of the computer, Computer (158) has the same content as the Certified File_A (1420A) stored on the second non-transitory computer storage medium, Certified Server Permanent Storage Medium (1470) of the third computer, Certifying Server Computer (1400). And this is indicated by the second dashed double-headed arrow line (1570).

This mechanism will allow the Software Driver (168) to identify a file's certification that the file is the original file without any possibility that an altered file is installed/stored in the computer, Computer (158), thus, providing a higher security to the Computer (158) than otherwise would've been possible.

Once the embodiment is implemented with the arrangement of FIG. 12 and FIG. 13, the Software Driver (168) instead of using the Copy-of-copy of first security key (171) to encrypt the Decrypted File_A Checksum (1520) to derive the Encrypted Certified File_B Checksum (1530), instead, the Software Driver (168) uses the Network Security Key (1210) to encrypt the Decrypted File_A Checksum (1520) deriving the Encrypted Certified File_B Checksum (1530). And the Encrypted Certified File_B Checksum (1530) would only be decrypted with the Network Security Key (1210). Anyone skilled in the art will be able to use the prior teachings to implement the embodiment using the Network Security Key (1210) and no further explanation will be given here to avoid repetition, not to obscure the teachings of the embodiment of the invention.

The storing the Copy-of-copy of first security key (171) on the second non-transitory computer storage medium, Certified Server Permanent Storage Medium (1470) of the Certifying Server Computer (1400) is optional. And if the Copy-of-copy of first security key (171) is not present in the Certifying Server Computer (1400), then the communication link (see twelfth double-headed arrow line (1460)) between the Certifying Server Computer (1400) and the computer, Computer (158) will be a secure connection and only the Public Key (1410B) is transmitted without any encryption. And on the computer, Computer (158) the steps of using the Copy-of-copy of first security key (171) for the decryption of the Encrypted Public Key (1455) is not necessary.

The System

A microchip with security key has been described, which would enable one or more keys to be stored securely in a computer without the possibility of the stored secure keys being inadvertently made available to unauthorized software running in the computer. The secure key could be any kind of key usable by the central processing unit of the computer to be made available to the authorized software. The key can be used individually or along with input rules to protect user's access to files and folders. The key could be used for encryption and decryption of data, file metadata, files and software stored in the computer or for identifying of the microchip with security key, like a serial number.

One preferred embodiment also enables the insertion of interrupts before suspected code present in a running process in the computer, which could be a parent or a child process, or to stop a questionable child process from being executed, or if the questionable child process is executed, control its actions as not to allow it to harm or compromise the security of the computer. This preferred embodiment further enables the assigning of user rights to protect computer files and facilitate the applying of the organization's policies.

Another embodiment uses a secondary login to enable the execution of software in a computer will prevent code injection hacking from executing programs in the computer, thus prevent the escalation of a hacking attack.

Another embodiment has one or more elements of the file metadata encrypted will enable the identification of computer malware without even performing a decryption of the malware.

Another embodiment only enables the update of certain folders/files at specific timeframe, thus preventing cross-site computer hacking.

Another embodiment enables the assigning of one or more user rights to interact with files in the computer. These rights are controlled by the software responsible for the security of the computer, thus enabling higher security with less complexity and lower costs.

Another embodiment enables the certification of software and the installation of certified software in a computer without the possibility that the file be changed after certification.

Exemplary Methods

The following are seven examples of methods of using the system described above to improve operational performance of a computer, Computer (158) by increasing digital security.

Example 1

The example 1 method improves operational performance of a computer (158) by protecting the computer, Computer (158), from being hacked. The example 1 method uses an Encrypted Input List (680) holding predefined parameters ((see e.g., FIG. 6Bb, Encrypted User-A Right Parameter (660A), Encrypted User-B Right Parameter (660B) and Encrypted User-C Right Parameter (660C)).

The example 1 method includes a step of providing a device (100) holding a digital security key, represented in FIG. 1 as Val_1 (104A), VAL_2 (104B), VAL_3 (104C), and VAL_4 (104C). The digital security key is used and programmed to encrypt and decrypt data ((see e.g. FIG. 5C, ABCDE (520C), 876 (522C), No (524C) and AB7ZTB (525C)) in the computer, Computer (158). The device (100) that holds or stores the digital security key is configured to be unnecessary for operation of the computer, Computer (158). Thus, neither the device (100) nor the security key (102) is necessary for the functioning of the computer, Computer (158). Whenever this condition regarding the functioning of the computer is noted herein, this condition means that the computer still operates if no device (100) is connected to the computer. For example, In the case of the encrypted input list, if the encrypted input list is not present in the computer, the computer will function normally. The only exception is, if the device (100) is not connected to the computer or if the encrypted input list is not present in the computer, then, the computer will not have the protection which the dongle, i.e. the device (100), and the encrypted input list offer.

The example 1 method includes a step of connecting the device to the computer, Computer (158). For example, if the device were a thumb drive with a USB connection, then it would be connected by inserting the thumb drive into a USB port connected to the computer, Computer (158). The computer, Computer (158) comprises a first non-transitory computer storage medium, Permanent Storage Medium (1240).

The example 1 method includes a step of installing an Encrypted Input List (680) on the first non-transitory computer storage medium, Permanent Storage Medium (1240). The Encrypted Input List (680) is a file listing comprising encrypted user's right parameters (see e.g., FIG. 6B, Encrypted User-A Right Parameter (660A), Encrypted User-B Right Parameter (660B) and Encrypted User-C Right Parameter (660C)) The example 1 method includes a step of limiting the Encrypted Input List (680) to one that is not necessary for operation of the computer, Computer (158). The computer, Computer (158) does not need the Encrypted Input List (680) to perform any function related to operating of the computer, Computer (158).

The example 1 method includes a step of integrating into an operating system on the computer, Computer (158), a kernel software driver, such as Software Driver (168), wherein the kernel software driver, the Software Driver (168), is configured to control access to a folder ((see e.g., FIG. 11, High-Safety (1105) folder, Median-Safety (1120) folder, Low-Safety (1140) folder, and Public (1150) folder) and to control input and output access to a computer file ((see e.g., FIG. 11, File-A (1110), File-B (1125), File-C (1130), File-D (1145), File-E (1155), File-F (1165) and File-G (1170)), the folder and the computer file are stored in the first non-transitory computer storage medium, such as e.g., Permanent Storage Medium (1240) of the computer, Computer (158).

The example 1 method includes a step of including Programming Code (168A) in the kernel software driver, such as the Software Driver (168), the Programming Code (168A) operable for implementing steps of: using the digital security key (such as the computer security key and the Copy-of-copy of first security key (171)) to encrypt a user right parameter ((see e.g., FIG. 6B, User-A Right Parameter (650A), User-B Right Parameter (650B) and User-C Right Parameter (650C)) assigned to a user ((see e.g., FIG. 6B, User-A (640A), User-B (640B) and User-C (640C)) and thereby derive an encrypted user right parameter ((see e.g., FIG. 6B, Encrypted User-A Right Parameter (660A), Encrypted User-B Right Parameter (660B) and Encrypted User-C Right Parameter (660C)), the user right parameter (such as, FIG. 6B, User-A Right Parameter (650A), User-B Right Parameter (650B) and User-C Right Parameter (650C))) comprising permission for the user (see e.g., FIG. 6B, User-A (640A), User-B (640B) and User-C (640C)) to access a folder (see e.g., FIG. 11, High-Safety (1105) folder, Median-Safety (1120) folder, Low-Safety (1140) folder, and Public (1150) folder) stored on the computer, Computer (158); storing the encrypted user right parameter ((see e.g., FIG. 6B, Encrypted User-A Right Parameter (660A), Encrypted User-B Right Parameter (660B) and Encrypted User-C Right Parameter (660C)) in the Encrypted Input List (680); saving the Encrypted Input List (680) in the first non-transitory computer storage medium, such as the Permanent Storage Medium (1240) of the computer, Computer (158); receiving each request made on the computer, Computer (158), for access to the computer file or the folder; reading the Encrypted Input List (680) from the first non-transitory computer storage medium, Permanent Storage Medium (1240), of the computer, Computer (158); using the digital security key (such as the computer security key or the Copy-of-copy of first security key (171)) from the Encrypted Input List (680) to derive the user right parameter (see e.g., FIG. 6B, Encrypted User-A Right Parameter (660A), Encrypted User-B Right Parameter (660B) and Encrypted User-C Right Parameter (660C)); and verifying when the user is verified by the kernel software driver, the Software Driver (168), through a login software module (System_1 Login (761)) associated with the kernel software driver, the Software Driver (168).

The example 1 method requires the kernel software driver, the Software Driver (168) allows the user, i.e. permits the user (see e.g., FIG. 6B, User-A (640A), User-B (640B) and User-C (640C)), to access to the computer file or access to the folder when the user right parameter assigned to the user indicates that the user is allowed to access to the computer file (see e.g., FIG. 11, File-A (1110), File-B (1125), File-C (1130), File-D (1145), File-E (1155), File-F (1165) and File-G (1170)) or to access to the folder (see e.g., FIG. 11, High-Safety (1105) folder, Median-Safety (1120) folder, Low-Safety (1140) folder, and Public (1150) folder).

The example 1 method requires the kernel software driver, the Software Driver (168) to prohibit the user from gaining access to the computer file or folder, i.e. the kernel software driver, the Software Driver (168), denies access to the user, when the user right parameter (see e.g., FIG. 6B, User-A Right Parameter (650A), User-B Right Parameter (650B) and User-C Right Parameter (650C)) indicates that the user is not allowed to access the computer file (see e.g., FIG. 11, File-A (1110), File-B (1125), File-C (1130), File-D (1145), File-E (1155), File-F (1165) and File-G (1170)) or folder (see e.g., FIG. 11, High-Safety (1105) folder, Median-Safety (1120) folder, Low-Safety (1140) folder, and Public (1150) folder). Similarly, the kernel software driver, the Software Driver (168), prohibits user access when the user is not logged in to the kernel software driver, the Software Driver (168). The System_1 Login (761) is for the kernel software driver, the Software Driver (168), and is not the computer login or user sign-in to operate the computer, Computer (158), or the Operating System (174) login. However, login to the kernel software driver, the Software Driver (168) may be used to verify the Operating System (174) login mechanism, but the System_1 Login (761) is only associated with the kernel software driver, the Software Driver (168) and not associated with the Operating System (174).

Optional limitations in the example 1 method include enabling the Programming Code (168A) in the kernel software driver, the Software Driver (168) to be operable for implementing steps of: assigning the user (see e.g., FIG. 6B, User-A (640A), User-B (640B) and User-C (640C)) to a group (see e.g., FIG. 10, Group_A (1000), Group_B (1010), Group_C (1020), Group_D (1030) and Group_E (1040)); assigning the group to the computer file (see e.g., FIG. 11, File-A (1110), File-B (1125), File-C (1130), File-D (1145), File-E (1155), File-F (1165) and File-G (1170)) or to the folder (see e.g., FIG. 11, High-Safety (1105) folder, Median-Safety (1120) folder, Low-Safety (1140) folder, and Public (1150) folder); assigning the security key (the computer security key, which is also referred to as the Copy-of-copy of first security key (171)) to the group (see e.g., FIG. 10, Group_A (1000), Group_B (1010), Group_C (1020), Group_D (1030) and Group_E (1040)); and limiting use of the security key (the computer security key, the Copy-of-copy of first security key (171)) for encryption or decryption to the user assigned to the group.

Example 2

The example 2 method improves operational performance of a computer, Computer (158) by protecting the computer, Computer (158), from being hacked. The example 1 method uses a confirmatory predefined encrypted value (see e.g., FIG. 5C, ABCDE (520C), 876 (522C), No (524C) and AB7ZTB (525C)) stored in metadata of a plurality of computer files (see e.g., FIG. 5B, First Metadata (514), and FIG. 5B, Third Metadata (550); FIG. 5C, Second Metadata (510), and Fourth Metadata (560)) stored in the non-transitory computer storage medium of the computer.

The example 2 method includes a step of providing a device holding a digital security key. The same explanation given above relating to example 1 applies to this step. In each of these examples, when the step is worded the same as in a preceding example, then the step has the same explanation as given in the preceding example.

The example 2 method includes a step of configuring the device (100) so that it is not necessary for the operation of the computer to which said device is connected, e.g., the computer, Computer (158)

The example 2 method includes a step of integrating a kernel software driver, e.g., the Software Driver (168), into an operating system on the computer, Computer (158), the kernel software driver, the Software Driver (168) operable to control input and output access to a computer file (see e.g., FIG. 11, File-A (1110), File-B (1125), File-C (1130), File-D (1145), File-E (1155), File-F (1165) and File-G (1170)) stored in the non-transitory computer storage medium, the first non-transitory computer storage medium, e.g., Permanent Storage Medium (1240), of the computer, Computer (158).

The example 2 method includes a step of including in the kernel software driver, the Software Driver (168), the Programming Code (168A) operable for implementing steps of: using the digital security key (such as, the computer security key the Copy-of-copy of first security key (171)) to encrypt a confirmatory predefined value (see e.g., FIG. 6B, User-A Right Parameter (650A), User-B Right Parameter (650B) and User-C Right Parameter (650C)) to produce a confirmatory predefined encrypted value (see e.g., FIG. 6B, Encrypted User-A Right Parameter (660A), Encrypted User-B Right Parameter (660B) and Encrypted User-C Right Parameter (660C)); saving the confirmatory predefined encrypted value as metadata (see e.g., FIG. 5B, First Metadata (514), and FIG. 5B, Third Metadata (550); FIG. 5C, Second Metadata (510), and Fourth Metadata (560)) of the plurality of computer files stored in the first non-transitory computer storage medium, e.g., the Permanent Storage Medium (1240) of the computer, Computer (158); defining as a non-authorized computer file, any computer file that lacks the confirmatory predefined encrypted value, or has an invalid encrypted predefined value; receiving at the kernel software driver, the Software Driver (168) each request received by the computer, Computer (158) to access a computer file; reading the metadata of the computer file to determine the presence or absence of the confirmatory predefined encrypted value; when the confirmatory predefined encrypted value does not exist within the metadata, disallowing access to the computer file; when the confirmatory predefined encrypted value is found in the metadata, using the digital security key (such as, the computer security key or the Copy-of-copy of first security key (171)) to decrypt the confirmatory predefined encrypted value and derive a confirmatory predefined decrypted value; using the kernel software driver to determine whether or not that the confirmatory predefined decrypted value matches a known value; when the confirmatory predefined decrypted value matches a known value, then allowing access pursuant to each such request for access to the computer file; and when the confirmatory predefined decrypted value does not match a known value, then disallowing access to the computer file.

Example 3

The example 3 method improves operational performance of a computer, Computer (158) by protecting the computer, Computer (158), from being hacked. The example 3 method uses a device that is independent of the computer and that stores a digital security key usable for encrypting and decrypting data in the computer, Computer (158).

The example 3 method includes a step of providing a device (100) storing a digital security key used for encrypting and decrypting data in the computer, Computer (158). The device is configured for connection to the computer, Computer (158).

The example 3 method includes a step of configuring the device (100) so that it is not necessary for the operation of the computer to which said device is connected.

The example 3 method includes a step of integrating a kernel software driver, such as the Software Driver (168), into an Operating System (174) on the computer, Computer (158). The kernel software driver, Software Driver (168), is operable to control input and output access to a computer file (see e.g., FIG. 11, File-A (1110), File-B (1125), File-C (1130), File-D (1145), File-E (1155), File-F (1165) and File-G (1170)) stored in the first non-transitory computer storage medium, such as Permanent Storage Medium (1240), of the computer, Computer (158).

The example 3 method includes a step of including in the kernel software driver, the Software Driver (168), Programming Code (168A) operable for implementing steps of: using the digital security key from the device to encrypt a date and timeframe (see e.g., Unencrypted Date Timeframe (1175A)) associated with a computer file, e.g. File-G (1170) or a High-Safety (1105) folder on the computer, Computer (158), to produce an encrypted date and timeframe (see e.g., (1171A) and (1171B)); storing the encrypted date and timeframe in an encrypted input list (780), then saving the encrypted date and timeframe in the non-transitory computer storage medium, which is also referred to as the first non-transitory computer storage medium and as the Permanent Storage Medium (1240)) of the computer, Computer (158); receiving at the kernel software driver, the Software Driver (168), each request received by the computer, Computer (158), to access a computer file or a folder; reading the Encrypted Input List (680) from the non-transitory computer storage medium of the computer, Computer (158); using the digital security key (such as the computer security key or the Copy-of-copy of first security key (171))) to decrypt the encrypted date and timeframe from the Encrypted Input List (680), thereby deriving unencrypted date and timeframe; reading the current date and time provided by a clock (799) in the computer, Computer (158); determining whether or not the current date and time is within a period defined by the Unencrypted Date Timeframe (1175A)): when the current date and time is within the Unencrypted Date Timeframe (1175A), then allowing access to the computer file, e.g. File-G (1170) or access to the High-Safety (1105) folder; and when the current date and time is not within the unencrypted date and timeframe, preventing access to the computer file or access to the folder.

Example 4

The example 4 method improves operational performance of a computer (158) by protecting the computer, Computer (158), from being hacked. The example 4 method uses an encrypted input list holding predefined parameters.

The example 4 method includes a step of providing a device holding or storing a digital security key. The digital security key is configured to encrypt and decrypt data in the computer, e.g., Computer (158). The device is configured to be unnecessary for operation of the computer, Computer (158). This essentially means that the computer can be operated without the device connected to the computer.

The example 4 method includes a step of connecting the device to the computer (158). The computer, Computer (158), includes a first non-transitory computer storage medium which is also referred as Permanent Storage Medium (1240).

The example 4 method includes a step of installing, i.e. storing, an Encrypted Input List (680) on the first non-transitory computer storage medium, Permanent Storage Medium (1240).

The example 4 method includes a step of configuring the Encrypted Input List (680) so that is not necessary for operation of the computer, Computer (158). This is consistent with the device being unnecessary for operation of the computer.

The example 4 method includes a step of storing on the computer, Computer (158), an encrypted security key, which is also referred to herein as the Encrypted Second Security Key (1220).

The example 4 method includes a step of integrating into an operating system on the computer, Computer (158), a kernel software driver, which is also referred to herein as the Software Driver (168). The kernel software driver, the Software Driver (168), is configured to control access to a folder and to control input and output access to a computer file, the folder and the computer file are stored in the first non-transitory computer storage medium, Permanent Storage Medium (1240).

The example 4 method includes a step of including programming code in the kernel software driver, the Software Driver (168), the programming code operable for implementing step of: using the digital security key, which is also referred to as the computer security key or the Copy-of-copy of first security key (171), to decrypt the encrypted security key, which is also referred to as the Encrypted Second Security Key (1220), deriving a decrypted security key, which is also referred to as an Unencrypted Second Security Key (1320)).

The programming code is further operable for implementing the step of using the decrypted security key (also referred to as the Encrypted Second Security Key (1220)) to encrypt a user right parameter, three of which are shown in FIG. 6B as User-A Right Parameter (650A), User-B Right Parameter (650B) and User-C Right Parameter (650C). This encryption derives or produces an encrypted user right parameter, the corresponding three in FIG. 6B being Encrypted User-A Right Parameter (660A), Encrypted User-B Right Parameter (660B) and Encrypted User-C Right Parameter (660C). The user right parameter designates or includes permission for the user to access a computer file or a folder stored on the computer, Computer (158).

The programming code is further operable for implementing the step of storing the encrypted user right parameter in the Encrypted Input List (680) and then saving the encrypted input list in the first non-transitory computer storage medium, Permanent Storage Medium (1240).

The programming code is further operable for implementing the step of receiving each request made on the computer, Computer (158) for access to the computer file or to the folder; then reading the Encrypted Input List (680) from the first non-transitory computer storage medium, Permanent Storage Medium (1240) and then using the decrypted security key (also referred to as the Unencrypted Second Security Key (1320)) to decrypt the encrypted user right (see e.g., FIG. 6B, Encrypted User-A Right Parameter (660A), Encrypted User-B Right Parameter (660B) and Encrypted User-C Right Parameter (660C)) parameter from the Encrypted Input List (680) to derive the user right parameter.

The programming code is further operable for implementing the step of determining whether or not the user is verified by the kernel software driver, the Software Driver (168) through a login software module associated with the kernel software driver, the Software Driver (168).

The programming code may be further operable for implementing the step occurring when the user right parameter assigned to the user allows access to the computer file or access to the folder, and when the user is logged in (723) and then permitting the user to access to the computer file or access to the folder.

Alternatively, the programming code may be further operable for implementing the step occurring when the user right parameter does not allow the user access to the computer file or access to the folder or when the user is not logged in, and then the kernel software driver, the Software Driver (168) disallowing access to the computer file or access to the folder.

An optional limitation in the example 4 method includes making the programming code further operable to implement steps of: assigning the user to a group, as shown in FIG. 10. The user is exemplified in FIG. 6B as any of User-A (640A), User-B (640B) and User-C (640C)). The group is exemplified in FIG. 10 as any of Group_A (1000), Group_B (1010), Group_C (1020), Group_D (1030) and Group_E (1040).

Further optional limitations in the example 4 method include: assigning the group to the computer file or to the folder; assigning the digital security key (102A) to the group; and limiting use of the digital security key (102A), which may include the computer security key and the Copy-of-copy of first security key (171), for encryption or decryption to the user assigned to the group.

Example 5

The example 5 method improves operational performance of a computer, Computer (158) by protecting the computer, Computer (158), from being hacked. The example 5 method uses encrypted predefined parameters stored as metadata of authorized computer files.

The example 5 method includes a step of providing a device (100) holding a digital security key (102A). The device is configured for connection to the computer, Computer (158). The digital security key (102A) once loaded in the Computer's RAM (169) becomes the security key, also referred to as the computer security key or the Copy-of-copy of first security key (171). The digital security key (102A) is configured for encrypting and decrypting data on the computer, Computer (158). The data is exemplified in FIG. 5C as entry15 (520C), entry16 (522C), entry17 (524C) and entry18 (525C)).

The example 5 method includes a step of configuring the device (100) so that it is not necessary for the operation of the computer to which said device is connected The example 5 method includes a step of storing on the computer, Computer (158), an encrypted security key, which is also referred to as the Encrypted Second Security Key (1220).

The example 5 method includes a step of integrating a kernel software driver, also referred to as the Software Driver (168), into an Operating System (174) on the computer, Computer (158). The kernel software driver is operable to control input and output access to a computer file stored in the first non-transitory computer storage medium, Permanent Storage Medium (1240).

The example 5 method includes a step of including, in the kernel software driver, Programming Code (168A) operable for implementing the step of using the security key (also referred to as the computer security key, the Copy-of-copy of first security key (171)) to decrypt the encrypted security key (also referred to as the Encrypted Second Security Key (1220)) deriving a decrypted security key (also referred to as the Unencrypted Second Security Key (1320)).

The example 5 method includes a step of including, in the kernel software driver, Programming Code (168A) operable for implementing the step of using the decrypted security key to encrypt a confirmatory predefined value to produce a confirmatory predefined encrypted value.

The example 5 method includes a step of saving the confirmatory predefined encrypted value as metadata of a plurality of computer files stored in the non-transitory computer storage medium of the computer.

The example 5 method includes a step of defining as a non-authorized computer file, any computer file that lacks the confirmatory predefined encrypted value or has an invalid confirmatory predefined encrypted value.

The example 5 method includes a step of receiving at the kernel software driver each request received by the computer to access a computer file.

The example 5 method includes a step of reading the metadata of the computer file to determine a presence or absence of the confirmatory predefined encrypted value.

The example 5 method includes a step of disallowing access to the computer file when the confirmatory predefined encrypted value does not exist within the metadata.

The example 5 method includes a step of using the decrypted security key to decrypt the confirmatory predefined encrypted value and derive a confirmatory predefined decrypted value when the confirmatory predefined encrypted value is found in the metadata.

The example 5 method includes a step of using the kernel software driver to determine whether or not the confirmatory predefined decrypted value matches a known value.

The example 5 method includes a step of allowing access pursuant to each such request for access to the computer file when the confirmatory predefined decrypted value matches the known value.

The example 5 method includes a step of disallowing access to the computer file when the confirmatory predefined decrypted value does not match the known value.

Example 6

The example 6 method improves operational performance of a computer, Computer (158) by protecting the computer, Computer (158), from being hacked. The example 6 method uses an encrypted date and timeframe stored as metadata of computer files.

The example 6 method includes a step of providing a device (100) holding, i.e. storing, a digital security key (102A). The device is configured for connection to the computer, Computer (158). The digital security key (102A) once loaded in the Computer's RAM (169) becomes the security key, also referred to as the computer security key or the Copy-of-copy of first security key (171). The digital security key (102A) is configured for encrypting and decrypting data on the computer, Computer (158). The data is exemplified in FIG. 5C as entry15 (520C), entry16 (522C), entry17 (524C) and entry18 (525C)).

The example 6 method includes a step of configuring the device (100) so that it is not necessary for the operation of the computer to which said device is connected.

The example 6 method includes a step of storing on the computer, Computer (158), an encrypted security key, which is also referred to as the Encrypted Second Security Key (1220).

The example 6 method includes a step of integrating a kernel software driver, also referred to as the Software Driver (168), into an Operating System (174) on the computer, Computer (158). The kernel software driver is operable to control input and output access to a computer file stored in the first non-transitory computer storage medium, Permanent Storage Medium (1240).

The example 6 method includes a step of including, in the kernel software driver, Programming Code (168A) operable for implementing the step of using the security key (also referred to as the computer security key, the Copy-of-copy of first security key (171)) to decrypt the encrypted security key (also referred to as the Encrypted Second Security Key (1220)) deriving a decrypted security key (also referred to as the Unencrypted Second Security Key (1320)).

The example 6 method includes a step of including, in the kernel software driver, Programming Code (168A) operable for implementing the step of using the decrypted security key (also referred to as the Unencrypted Second Security Key (1320)) to encrypt a date and timeframe value (1175B) associated with a computer file or a folder on the computer, to produce an encrypted date and time value (1171B).

The example 6 method includes a step of including, in the kernel software driver, Programming Code (168A) operable for implementing the step of storing the encrypted date and timeframe in an Encrypted Input List (680), then saving the Encrypted Input List (680) in the first non-transitory computer storage medium, Permanent Storage Medium (1240) of the computer, Computer (158).

The example 6 method includes a step of including, in the kernel software driver, Programming Code (168A) operable for implementing the step of receiving at the kernel software driver, to wit, Software Driver (168), each request received by the computer to access a computer file or a folder.

The example 6 method includes a step of including, in the kernel software driver, Programming Code (168A) operable for implementing the step of reading the Encrypted Input List (680) from the first non-transitory computer storage medium, Permanent Storage Medium (1240) of the computer, Computer (158).

The example 6 method includes a step of including, in the kernel software driver, Programming Code (168A) operable for implementing the step of using the decrypted security key to decrypt the encrypted date and time value (1171B) from the Encrypted Input List (680), thereby deriving a date and timeframe value (1175B).

The example 6 method includes a step of including, in the kernel software driver, Programming Code (168A) operable for implementing the step of reading the current date and time provided by a clock in the computer.

The example 6 method includes a step of including, in the kernel software driver, Programming Code (168A) operable for implementing the step of verifying that a current date and time is within a period defined by the unencrypted date and timeframe.

The example 6 method includes a step of including, in the kernel software driver, Programming Code (168A) operable for implementing the step of allowing access to the computer file or to the folder when the current date and time is within the unencrypted date and timeframe.

The example 6 method includes a step of including, in the kernel software driver, Programming Code (168A) operable for implementing the step of preventing access to the computer file or to the folder when the current date and time is not within the unencrypted date and timeframe.

EXAMPLE

The example 7 method improves operational performance of a computer, Computer (158) by protecting the computer, Computer (158), from being hacked. The example 7 method uses an encrypted checksum stored in metadata of one or more computer files.

The example 7 method includes a step of providing a device (100) holding, i.e. storing, a digital security key (102A). The device is configured for connection to the computer, Computer (158). The digital security key (102A) once loaded in the Computer's RAM (169) becomes the security key, also referred to as the computer security key or the Copy-of-copy of first security key (171). The digital security key (102A) is configured for encrypting and decrypting data on the computer, Computer (158). The data is exemplified in FIG. 5C as entry15 (520C), entry16 (522C), entry17 (524C) and entry18 (525C)).

The example 7 method includes a step of configuring the device (100) so that it is not necessary for operation of the computer to which said device is connected.

The example 7 method includes a step of storing a computer file in a first non-transitory computer storage medium, Permanent Storage Medium (1240) on the computer, Computer (158). Exemplary computer files are illustrated in FIG. 11.

The example 7 method includes a step of integrating a kernel software driver, also referred to as the Software Driver (168), into an Operating System (174) on the computer, Computer (158). The kernel software driver is operable to control input and output access to the computer file stored in the first non-transitory computer storage medium, Permanent Storage Medium (1240).

The example 7 method includes a step of including, in the kernel software driver, Programming Code (168A) operable for implementing step of performing a checksum operation on the computer file deriving a first checksum.

The example 7 method includes a step of including, in the kernel software driver, Programming Code (168A) operable for implementing steps of using the digital security key (102A) to encrypt the first checksum to produce an encrypted first checksum, which is the same as the encrypted checksum (522) shown in FIG. 5B and FIG. 5C; saving the encrypted first checksum as metadata of the computer file stored in the first non-transitory computer storage medium, Permanent Storage Medium (1240) of the computer; receiving at the kernel software driver each request received by the computer to access the computer file; reading the metadata of the computer file to determine a presence or absence of the encrypted first checksum; disallowing access to the computer file when the encrypted first checksum does not exist within the metadata; using the digital security key (102A) to decrypt the encrypted first checksum and derive a first decrypted checksum when the encrypted first checksum is found in the metadata; reading the contents of the computer file and producing a second checksum; verifying that the first decrypted checksum is identical to the second checksum; allowing access pursuant to each such request for access to the computer file when the first decrypted checksum is identical to the second checksum; and disallowing access to the computer file when the first decrypted checksum is not identical to the second checksum.

Example 8

The example 8 method improves operational performance of a computer, Computer (158) by protecting the computer, Computer (158), from being hacked. The example 8 method uses multiple checksums, including an encrypted checksum stored in metadata of one or more computer files.

The example 8 method includes a step of providing a device (100) holding, i.e. storing, a digital security key (102A). The device is configured for connection to the computer, Computer (158). The digital security key (102A) once loaded in the Computer's RAM (169) becomes the security key, also referred to as the computer security key or the Copy-of-copy of first security key (171). The digital security key (102A) is configured for encrypting and decrypting data on the computer, Computer (158). The data is exemplified in FIG. 5C as entry15 (520C), entry16 (522C), entry17 (524C) and entry18 (525C)).

The example 8 method includes a step of configuring the device (100) so that it is not necessary for the operation of the computer to which said device is connected.

The example 8 method includes a step of storing on the computer, Computer (158), an encrypted security key, which is also referred to as the Encrypted Second Security Key (1220).

The example 8 method includes a step of storing a computer file in a non-transitory computer storage medium on the computer.

The example 8 method includes a step of integrating a kernel software driver, also referred to as the Software Driver (168), into an Operating System (174) on the computer, Computer (158). The kernel software driver is operable to control input and output access to a computer file stored in the first non-transitory computer storage medium, Permanent Storage Medium (1240).

The example 8 method includes a step of including, in the kernel software driver, Programming Code (168A) operable for implementing the steps of performing a checksum operation on the computer file deriving a first checksum; using the digital security key (102A) to decrypt the encrypted security key deriving a decrypted security key; using the decrypted security key to encrypt the first checksum to produce an encrypted first checksum; saving the encrypted first checksum as metadata of the computer file stored in the non-transitory computer storage medium of the computer; receiving at the kernel software driver each request received by the computer to access the computer file; reading the metadata of the computer file to determine a presence or absence of the encrypted first checksum; when the encrypted first checksum does not exist within the metadata, disallowing access to the computer file; when the encrypted first checksum is found in the metadata, using the decrypted security key to decrypt the encrypted first checksum and derive a decrypted first checksum; reading the contents of the computer file and producing a second checksum; verifying that the decrypted first checksum is identical to the second checksum; when the first decrypted checksum is identical to the second checksum, then allowing access pursuant to each such request for access to the computer file; and when the decrypted first checksum is not identical to the second checksum, then disallowing access to the computer file.

Example 9

The example 9 method improves operational performance of a computer, Computer (158) by protecting the computer, Computer (158), from being hacked. The example 9 method uses an encrypted installation identification stored in metadata of computer files.

The example 9 method includes a step of providing a device (100) holding, i.e. storing, a digital security key (102A). The device (100) is configured for connection to the computer, Computer (158). The digital security key (102A) once loaded in the Computer's RAM (169) becomes the security key, also referred to as the computer security key or the Copy-of-copy of first security key (171). The digital security key (102A) is configured for encrypting and decrypting data on the computer, Computer (158). The data is exemplified in FIG. 5C as entry15 (520C), entry16 (522C), entry17 (524C) and entry18 (525C)).

The example 9 method includes a step of configuring the device (100) so that it is not necessary for operation of the computer to which said device is connected.

The example 9 method includes a step of integrating a kernel software driver, also referred to as the Software Driver (168), into an Operating System (174) on the computer, Computer (158). The kernel software driver is operable to control input and output access to a plurality of computer files stored in a first non-transitory computer storage medium, Permanent Storage Medium (1240) of the computer, Computer (158).

The example 9 method includes a step of including, in the kernel software driver, Programming Code (168A) operable for implementing the step of including in the kernel software driver, programming code operable for implementing steps of: storing a first computer file in the first non-transitory computer storage medium, Permanent Storage Medium (1240) on the computer, Computer (158). The first computer file includes executable code and in this sense the first computer file is an operable program file.

The example 9 method further comprises steps of including, in the kernel software driver, Programming Code (168A) operable for implementing the steps of creating a first installation identification; using the digital security key (102A) to encrypt the first installation identification to produce a first encrypted installation identification; saving the first encrypted installation identification as metadata of the first computer file stored in the non-transitory computer storage medium of the computer; receiving a request to execute first-computer file code stored in the first computer file; reading the metadata of the first computer file and extracting the encrypted first installation identification; using the digital security key (102A) and decrypting the first encrypted installation identification deriving a decrypted first installation identification; reading executable code from the first computer file and storing the executable code in random access memory of the computer; causing a microprocessor unit of the computer to execute the executable code of the first computer file; at runtime of the executable code, receiving from the executed code a request to access a second computer file for the plurality of computer files stored in the non-transitory computer storage medium of the computer; reading the metadata of the second computer file and extracting an encrypted second installation identification; using the digital security key (102A) and decrypting the encrypted second installation identification deriving a decrypted second installation identification; verifying that the decrypted first installation identification is identical to the decrypted second installation identification; when the decrypted first installation identification is identical to the decrypted second installation identification, then allowing access pursuant to each such request for access to the second computer file; and when the decrypted first installation identification is not identical to the decrypted second installation identification, then disallowing access to the second computer file.

Example 10

The example 10 method improves operational performance of a computer, Computer (158) by protecting the computer, Computer (158), from being hacked. The example 10 method uses an encrypted installation identification stored in metadata of computer files.

The example 10 method includes a step of providing a device (100) holding, i.e. storing, a digital security key (102A). The device (100) is configured for connection to the computer, Computer (158). The digital security key (102A) once loaded in the Computer's RAM (169) becomes the security key, also referred to as the computer security key or the Copy-of-copy of first security key (171). The digital security key (102A) is configured for encrypting and decrypting data on the computer, Computer (158). The data is exemplified in FIG. 5C as entry15 (520C), entry16 (522C), entry17 (524C) and entry18 (525C)).

The example 10 method includes a step of storing on the computer, Computer (158), an encrypted security key, which is also referred to as the Encrypted Second Security Key (1220), FIG. 12.

The example 10 method includes a step of configuring the device (100) so that it is not necessary for operation of the computer to which said device is connected.

The example 10 method includes a step of integrating a kernel software driver, also referred to as the Software Driver (168), into an Operating System (174) on the computer, Computer (158). The kernel software driver is operable to control input and output access to a plurality of computer files stored in a first non-transitory computer storage medium, Permanent Storage Medium (1240) of the computer, Computer (158).

The example 10 method includes a step of including, in the kernel software driver, Programming Code (168A) operable for implementing the step of including in the kernel software driver, programming code operable for implementing steps of: storing a first computer file in the first non-transitory computer storage medium, Permanent Storage Medium (1240) on the computer, Computer (158). The first computer file includes executable code, and in this sense, the first computer file is an operable program file.

The example 9 method further comprises steps of including, in the kernel software driver, Programming Code (168A) operable for implementing the steps of creating a first installation identification; using the digital security key (102A) to decrypt the encrypted security key deriving a decrypted security key; using the decrypted security key to encrypt the first installation identification to produce a first encrypted installation identification; saving the first encrypted installation identification as metadata of the first computer file stored in the non-transitory computer storage medium of the computer; receiving a request to execute first-computer file code stored in the first computer file; reading the metadata of the first computer file and extracting the first encrypted installation identification; using the decrypted security key and decrypting the first encrypted installation identification deriving a decrypted first installation identification; reading executable code from the first computer file and storing the executable code in random access memory of the computer; causing a microprocessor unit of the computer to execute the executable code of the first computer file; at runtime of the executable code, receiving from the executed code a request to access a second computer file from the plurality of computer files stored in the non-transitory computer storage medium of the computer; reading the metadata of the second computer file and extracting an encrypted second installation identification; using the decrypted security key and decrypting the encrypted second installation identification deriving a decrypted second installation identification; verifying that the decrypted first installation identification is identical to the decrypted second installation identification; when the decrypted first installation identification is identical to the decrypted second installation identification, then allowing access pursuant to each such request for access to the second computer file; and when the decrypted first installation identification is not identical to the decrypted second installation identification, then disallowing access to the second computer file.

Example 11

The example 11 method improves operational performance of a computer, Computer (158) by protecting the computer, Computer (158), from installing non-certified software. The example 11 method uses at least three checkums.

The example 11 method includes a step of providing a device (100) holding, i.e. storing, a digital security key (102A). The device (100) is configured for connection to the computer, Computer (158). The digital security key (102A) once loaded in the Computer's RAM (169) becomes the security key, also referred to as the computer security key or the Copy-of-copy of first security key (171). The digital security key (102A) is configured for encrypting and decrypting data on the computer, Computer (158). The data is exemplified in FIG. 5C as entry15 (520C), entry16 (522C), entry17 (524C) and entry18 (525C)).

The example 11 method includes a step of configuring the device (100) so that it is not necessary for operation of the computer to which said device is connected.

The example 11 method includes a step of receiving a public security key on the computer.

The example 11 method includes a step of receiving a computer file on the computer.

The example 11 method includes a step of integrating into an operating system on the computer a kernel software driver, also referred to as the Software Driver (168), into an Operating System (174) on the computer, Computer (158). The kernel software driver is configured to control saving of the computer file in the first non-transitory computer storage medium, Permanent Storage Medium (1240) of the computer, Computer (158).

The example 11 method includes a step of including, in the kernel software driver, Programming Code (168A) operable for implementing the step of including in the kernel software driver, programming code operable for implementing steps of: verifying if a first checksum is stored in a metadata of the computer file; when the first checksum is not present, then not saving the computer file; when the first checksum is present, then reading the metadata and executing an asymmetric encryption algorithm, and the asymmetric encryption algorithm using the public security key to decrypt the first checksum deriving a second checksum; performing a checksum of content of the computer file deriving a third checksum; verifying if the second checksum is identical to the third checksum; when the second checksum is not identical to the third checksum, then not saving the computer file; when the second checksum is identical to the third checksum, then using the digital security key (102A) to encrypt either the second checksum or the third checksum deriving an encrypted checksum; saving the encrypted checksum in the computer file; and saving the computer file in the non-transitory computer storage medium of the computer.

Example 12

The example 12 method improves operational performance of a computer, Computer (158) by preventing the computer, Computer (158), from installing non-certified software.

The example 12 method includes a step of providing a device (100) holding, i.e. storing, a digital security key (102A). The device (100) is configured to encrypt and decrypt data in the computer, Computer (158). The digital security key (102A) once loaded in the Computer's RAM (169) becomes the security key, also referred to as the computer security key or the Copy-of-copy of first security key (171). The digital security key (102A) is configured for encrypting and decrypting data on the computer, Computer (158). The data is exemplified in FIG. 5C as entry15 (520C), entry16 (522C), entry17 (524C) and entry18 (525C)).

The device (100) of example 12 is further configured to be unnecessary for operation of the computer to which said device is connected.

The example 12 method includes a step of connecting the device to the computer, where the computer includes a first non-transitory computer storage medium, Permanent Storage Medium (1240).

The example 12 method includes a step of receiving on the computer a public security key.

The example 12 method includes a step of receiving on the computer a computer file.

The example 12 method includes a step of encrypting the digital security key (102A) to produce an encrypted security key.

The example 12 method includes a step of storing the encrypted security key in the first non-transitory computer storage medium, Permanent Storage Medium (1240) on the computer, Computer (158);

The example 12 method includes a step of integrating a kernel software driver, also referred to as the Software Driver (168), into an Operating System (174) on the computer, Computer (158). The kernel software driver is operable to control saving, i.e., storing, of the computer file in the non-transitory computer storage medium of the computer.

The example 12 method includes a step of integrating a kernel software driver, also referred to as the Software Driver (168), into an Operating System (174) on the computer, Computer (158). The kernel software driver is operable for implementing steps of: verifying if a first checksum is stored in a metadata of the computer file; when the first checksum is not present, then not saving the computer file; using the digital security key (102A) to decrypt the encrypted security key deriving decrypted security key; when the first checksum is present, then reading the metadata and executing an asymmetric encryption algorithm, and the asymmetric encryption algorithm using the public security key to decrypt the first checksum deriving a second checksum; performing a checksum of content of the computer file deriving a third checksum; verifying if the second checksum is identical to the third checksum; when the second checksum is not identical to the third checksum, then not saving the computer file; when the second checksum is identical to the third checksum, then using the decrypted security key to encrypt either the second checksum or the third checksum deriving an encrypted checksum; saving the encrypted checksum in the computer file; and saving the computer file in the first non-transitory computer storage medium, Permanent Storage Medium (1240) of the computer, Computer (158).

The illustrations presented in this disclosure serves only as examples. While encryption/decryption and/or the microchip with security key identification are used, the systems and processes have broader utility. The disclosure herein should be broadly interpreted. Added security could be attained with any program installed on the computer hosting the microchip with security key.

INDUSTRIAL APPLICABILITY

The invention has application to the electronic microchip industry.

What is claimed is:

1. A method of improving operational performance of a computer and protecting the computer, the method comprising:
   providing a device storing a digital security key used for encrypting and decrypting data in the computer, the device configured for connection to the computer;
   configuring the device so that it is not necessary for operation of the computer to which said device is connected;
   integrating a kernel software driver into an operating system on the computer, the kernel software driver operable to control input and output access to a computer file stored in a non-transitory computer storage medium of the computer;
   including in the kernel software driver, programming code operable for implementing steps of:
   using the digital security key from the device to encrypt a date and timeframe associated with a computer file or a folder on the computer, to produce an encrypted date and timeframe;
   storing the encrypted date and timeframe in an encrypted input list, then saving the encrypted input list in the non-transitory computer storage medium of the computer;
   receiving at the kernel software driver each request received by the computer to access a computer file or a folder;
   reading the encrypted input list from the non-transitory computer storage medium of the computer;
   using the digital security key to decrypt the encrypted date and timeframe from the encrypted input list, thereby deriving unencrypted date and timeframe; and
   reading the current date and time provided by a clock in the computer; and
   determining whether or not a current date and time is within a period defined by the unencrypted date and timeframe:
   when the current date and time is within the unencrypted date and timeframe, then allowing access to the computer file or access to the folder; and
   when the current date and time is not within the unencrypted date and timeframe, preventing access to the computer file or access to the folder.

2. A method of improving operational performance of a computer and protecting the computer, the method comprising:
   providing a device storing a digital security key used for encrypting and decrypting data in the computer, the device configured for connection to the computer;
   configuring the device so that it is not necessary for operation of the computer to which said device is connected;
   storing on the computer an encrypted security key;
   integrating a kernel software driver into an operating system on the computer, the kernel software driver operable to perform access to a folder or to control input and output access to a computer file stored in a non-transitory computer storage medium of the computer;
   including in the kernel software driver, programming code operable for implementing steps of:
   using the digital security key from the device to decrypt the encrypted security key deriving a decrypted security key;
   using the decrypted security key to encrypt an unencrypted date and timeframe associated with a computer file or a folder on the computer, to produce an encrypted date and timeframe;
   storing the encrypted date and timeframe in an encrypted input list, then saving the encrypted input list in the non-transitory computer storage medium of the computer;
   receiving at the kernel software driver each request received by the computer to access a computer file or a folder;
   reading the encrypted input list from the non-transitory computer storage medium of the computer;
   using the decrypted security key to decrypt the encrypted date and timeframe from the encrypted input list, thereby deriving unencrypted date and timeframe;
   reading the current date and time provided by a clock in the computer; and verifying that a current date and time is within a period defined by the unencrypted date and timeframe:

when the current date and time is within the unencrypted date and timeframe, then allowing access to the computer file or to the folder; and when the current date and time is not within the unencrypted date and timeframe, preventing access to the computer file or to the folder.

\* \* \* \* \*